US012628187B2

(12) United States Patent
Li et al.

(10) Patent No.: US 12,628,187 B2
(45) Date of Patent: May 12, 2026

(54) MECHANISM OF SCHEDULING FOR BROADCAST AND GROUPCAST ON NEW RADIO UU INTERFACE

(71) Applicant: INTERDIGITAL PATENT HOLDINGS, INC., Wilmington, DE (US)

(72) Inventors: Yifan Li, Conshohocken, PA (US); Patrick Svedman, Stockholm (SE); Mohamed M. Awadin, Plymouth Meeting, PA (US); Guodong Zhang, Woodbury, NY (US); Pascal Adjakple, Great Neck, NY (US); Allan Tsai, Boonton, NJ (US); Kyle Pan, Saint James, NY (US); Zhuo Chen, Claymont, DE (US); Jerome Vogedes, Milwaukee, WI (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 517 days.

(21) Appl. No.: 17/998,362

(22) PCT Filed: May 14, 2021

(86) PCT No.: PCT/US2021/032407
§ 371 (c)(1),
(2) Date: Nov. 10, 2022

(87) PCT Pub. No.: WO2021/231835
PCT Pub. Date: Nov. 18, 2021

(65) Prior Publication Data
US 2023/0180269 A1 Jun. 8, 2023

Related U.S. Application Data

(60) Provisional application No. 63/170,735, filed on Apr. 5, 2021, provisional application No. 63/024,720, filed on May 14, 2020.

(51) Int. Cl.
H04W 72/30 (2023.01)
H04W 72/11 (2023.01)

(52) U.S. Cl.
CPC ........... *H04W 72/30* (2023.01); *H04W 72/11* (2023.01)

(58) Field of Classification Search
CPC ... H04W 72/30; H04W 72/11; H04W 72/121; H04W 4/06
See application file for complete search history.

(56) References Cited

U.S. PATENT DOCUMENTS 11,601,964 B2 * 3/2023 Takeda .............. H04W 72/0466
11,818,713 B2 * 11/2023 Xu .......................... H04L 1/189
(Continued)

FOREIGN PATENT DOCUMENTS

CN 101090525 A 12/2007
CN 101491022 A 7/2009
(Continued)

OTHER PUBLICATIONS

"Summary#1 on mechanisms to support group scheduling for RRC_CONNECTED UEs for Nr Mbs", R1-2101767 Moderator (CMCC), Jan. 25-Feb. 5, 2021, 59 pages.

*Primary Examiner* — Sujoy K Kundu
*Assistant Examiner* — Vladislav Y Agureyev
(74) *Attorney, Agent, or Firm* — Flaster Greenberg P.C.

(57) ABSTRACT

Methods, systems, and apparatuses may assist scheduling for broadcast and groupcast on new radio Uu interface. In an example, there may be broadcast and groupcast transmission scheduling mechanism with: group based scheduling, UE specific based scheduling, or sub-group based scheduling. In another example, there may be a serving cell configuration for broadcast and groupcast transmission with dedicated cell for broadcast and groupcast, or broadcast and groupcast cell (Continued)

which is shared with the cell for unicast. In another example, there may be downlink control related configuration for broadcast and groupcast transmission with details of the BWP configuration, the CORESET configuration, or the search space configuration.

18 Claims, 41 Drawing Sheets

(56)                    References Cited

U.S. PATENT DOCUMENTS

| | | | | |
|---|---|---|---|---|
| 2008/0070581 | A1 | 3/2008 | Charbit et al. | |
| 2009/0149164 | A1 | 6/2009 | Cai | |
| 2016/0183195 | A1* | 6/2016 | Gao | H04W 52/146 |
| | | | | 455/522 |
| 2016/0262176 | A1* | 9/2016 | Moulsley | H04W 72/21 |
| 2018/0026803 | A1 | 1/2018 | Fujishiro et al. | |
| 2018/0042033 | A1 | 2/2018 | Xu et al. | |
| 2018/0262882 | A1* | 9/2018 | You | H04W 72/30 |
| 2018/0309532 | A1* | 10/2018 | Shimezawa | H04J 11/0069 |
| 2019/0045527 | A1* | 2/2019 | Shimezawa | H04W 72/1263 |
| 2019/0182814 | A1* | 6/2019 | Shimezawa | H04L 5/0044 |
| 2019/0191437 | A1* | 6/2019 | Kusashima | H04W 72/04 |
| 2019/0254050 | A1* | 8/2019 | Kusashima | H04W 92/20 |
| 2019/0373630 | A1* | 12/2019 | Gupta | H04W 72/121 |
| 2020/0022174 | A1* | 1/2020 | Karaki | H04W 72/0453 |
| 2020/0053744 | A1* | 2/2020 | Hosseini | H04W 76/18 |
| 2020/0100252 | A1* | 3/2020 | Li | H04W 72/04 |
| 2020/0213978 | A1* | 7/2020 | Iyer | H04L 1/1812 |
| 2020/0221429 | A1* | 7/2020 | Li | H04W 72/23 |
| 2020/0288482 | A1* | 9/2020 | Yi | H04L 5/0037 |
| 2020/0404617 | A1* | 12/2020 | Murray | H04W 16/28 |
| 2021/0076445 | A1* | 3/2021 | Tsai | H04W 76/19 |
| 2021/0105126 | A1* | 4/2021 | Yi | H04W 76/27 |
| 2021/0105851 | A1* | 4/2021 | Kim | H04W 76/27 |
| 2021/0136786 | A1* | 5/2021 | Fong | H04W 72/535 |
| 2021/0136792 | A1* | 5/2021 | Wang | H04W 76/30 |
| 2021/0185718 | A1* | 6/2021 | Ying | H04L 1/0061 |
| 2021/0227570 | A1* | 7/2021 | Park | H04L 1/189 |
| 2021/0243731 | A1* | 8/2021 | Shin | H04L 5/0094 |
| 2021/0243782 | A1* | 8/2021 | Miao | H04L 5/0091 |
| 2021/0274536 | A1* | 9/2021 | Shin | H04W 72/535 |
| 2021/0282114 | A1* | 9/2021 | Liu | H04L 1/1614 |
| 2021/0352707 | A1* | 11/2021 | Maaref | H04L 1/0072 |
| 2021/0385756 | A1* | 12/2021 | Zhang | H04W 52/367 |
| 2022/0116964 | A1* | 4/2022 | Islam | H04L 1/1887 |
| 2022/0141058 | A1* | 5/2022 | Liu | H04L 25/03898 |
| | | | | 370/329 |
| 2022/0312318 | A1* | 9/2022 | Babaei | H04W 52/0229 |
| 2022/0322397 | A1* | 10/2022 | Liu | H04W 72/1273 |
| 2022/0322400 | A1* | 10/2022 | Hu | H04L 27/26025 |
| 2022/0322406 | A1* | 10/2022 | Liu | H04L 1/1861 |
| 2022/0361154 | A1* | 11/2022 | Yoshioka | H04L 1/1671 |
| 2022/0399965 | A1* | 12/2022 | Xu | H04W 4/06 |
| 2022/0400502 | A1* | 12/2022 | Maeder | H04W 72/53 |
| 2023/0009565 | A1* | 1/2023 | Gan | H04W 76/15 |
| 2023/0020443 | A1* | 1/2023 | Wang | H04W 76/10 |
| 2023/0060991 | A1* | 3/2023 | Lyu | H04W 72/23 |
| 2023/0171703 | A1* | 6/2023 | Park | H04W 52/383 |
| | | | | 370/318 |
| 2023/0389125 | A1* | 11/2023 | Islam | H04W 72/535 |
| 2024/0008023 | A1* | 1/2024 | Yoon | H04W 72/0446 |
| 2024/0014971 | A1* | 1/2024 | Zheng | H04L 5/0048 |
| 2024/0106607 | A1* | 3/2024 | Prasad | H04L 5/0053 |

FOREIGN PATENT DOCUMENTS

| | | | | | | |
|---|---|---|---|---|---|---|
| CN | 106303977 | A | * | 1/2017 | | H04W 4/06 |
| CN | 107734543 | A | * | 2/2018 | | H04W 72/51 |
| CN | 104378187 | B | * | 3/2018 | | H04W 72/1273 |
| CN | 113453166 | A | * | 9/2021 | | H04L 5/0053 |
| CN | 113498167 | A | * | 10/2021 | | H04W 72/23 |
| CN | 115280866 | A | * | 11/2022 | | H04W 28/0236 |
| EP | 2728787 | A2 | * | 5/2014 | | H04W 72/30 |
| EP | 3905829 | A1 | * | 11/2021 | | H04L 1/1812 |
| EP | 3958638 | A1 | * | 2/2022 | | H04L 5/0051 |
| EP | 4061076 | A1 | * | 9/2022 | | H04W 72/30 |
| WO | WO-2016127772 | A1 | * | 8/2016 | | H04W 72/30 |
| WO | WO-2019062360 | A1 | * | 4/2019 | | H04L 25/03866 |

* cited by examiner

```
-- ASN1START
-- TAG-SERVINGCELLCONFIG-START

ServingCellConfig ::=                               SEQUENCE {
    tdd-UL-DL-ConfigurationDedicated                    TDD-UL-DL-ConfigDedicated
    OPTIONAL,    -- Cond TDD
    initialDownlinkBWP                                  BWP-DownlinkDedicated
    OPTIONAL,    -- Need M
    downlinkBWP-ToReleaseList                           SEQUENCE (SIZE (1..maxNrofBWPs)) OF BWP-Id
    OPTIONAL,    -- Need N
    downlinkBWP-ToAddModList                            SEQUENCE (SIZE (1..maxNrofBWPs)) OF BWP-Downlink
    OPTIONAL,    -- Need S

--SOME PARTS REMOVED FOR BREVITY casttype-r17                                        ENUMERATED {Unicast, Groupcast}        OPTIONAL

-- TAG-SERVINGCELLCONFIG-STOP
-- ASN1STOP
```

ServingCellConfig information element

FIG. 3

```
-- ASN1START
-- TAG-SERVINGCELLCONFIG-START

ServingCellConfig information element

ServingCellConfig ::=          SEQUENCE {
    tdd-UL-DL-ConfigurationDedicated      TDD-UL-DL-ConfigDedicated
OPTIONAL,    -- Cond TDD
    initialDownlinkBWP                    BWP-DownlinkDedicated
OPTIONAL,    -- Need M
    downlinkBWP-ToReleaseList             SEQUENCE (SIZE (1..maxNrofBWPs)) OF BWP-Id
OPTIONAL,    -- Need N
    downlinkBWP-ToAddModList              SEQUENCE (SIZE (1..maxNrofBWPs)) OF BWP-Downlink
OPTIONAL,    -- Need S

--SOME PARTS REMOVED FOR BREVITY cellforgroupcastservice-r17           ENUMERATED {true}                    OPTIONAL

-- TAG-SERVINGCELLCONFIG-STOP
-- ASN1STOP
```

FIG. 4

```
-- ASN1START
-- TAG-SERVINGCELLCONFIG-START

ServingCellConfig information element

ServingCellConfig ::=                SEQUENCE {
    tdd-UL-DL-ConfigurationDedicated     TDD-UL-DL-ConfigDedicated OPTIONAL,    -- Cond TDD
    initialDownlinkBWP                   BWP-DownlinkDedicated OPTIONAL,    -- Need M
    downlinkBWP-ToReleaseList            SEQUENCE (SIZE (1..maxNrofBWPs)) OF BWP-Id OPTIONAL,    -- Need N
    downlinkBWP-ToAddModList             SEQUENCE (SIZE (1..maxNrofBWPs)) OF BWP-Downlink OPTIONAL,    -- Need S

--SOME PARTS REMOVED FOR BREVITY cellsupportgroupcastservice-r17      ENUMERATED {true}                OPTIONAL

-- TAG-SERVINGCELLCONFIG-STOP
-- ASN1STOP
```

FIG. 6

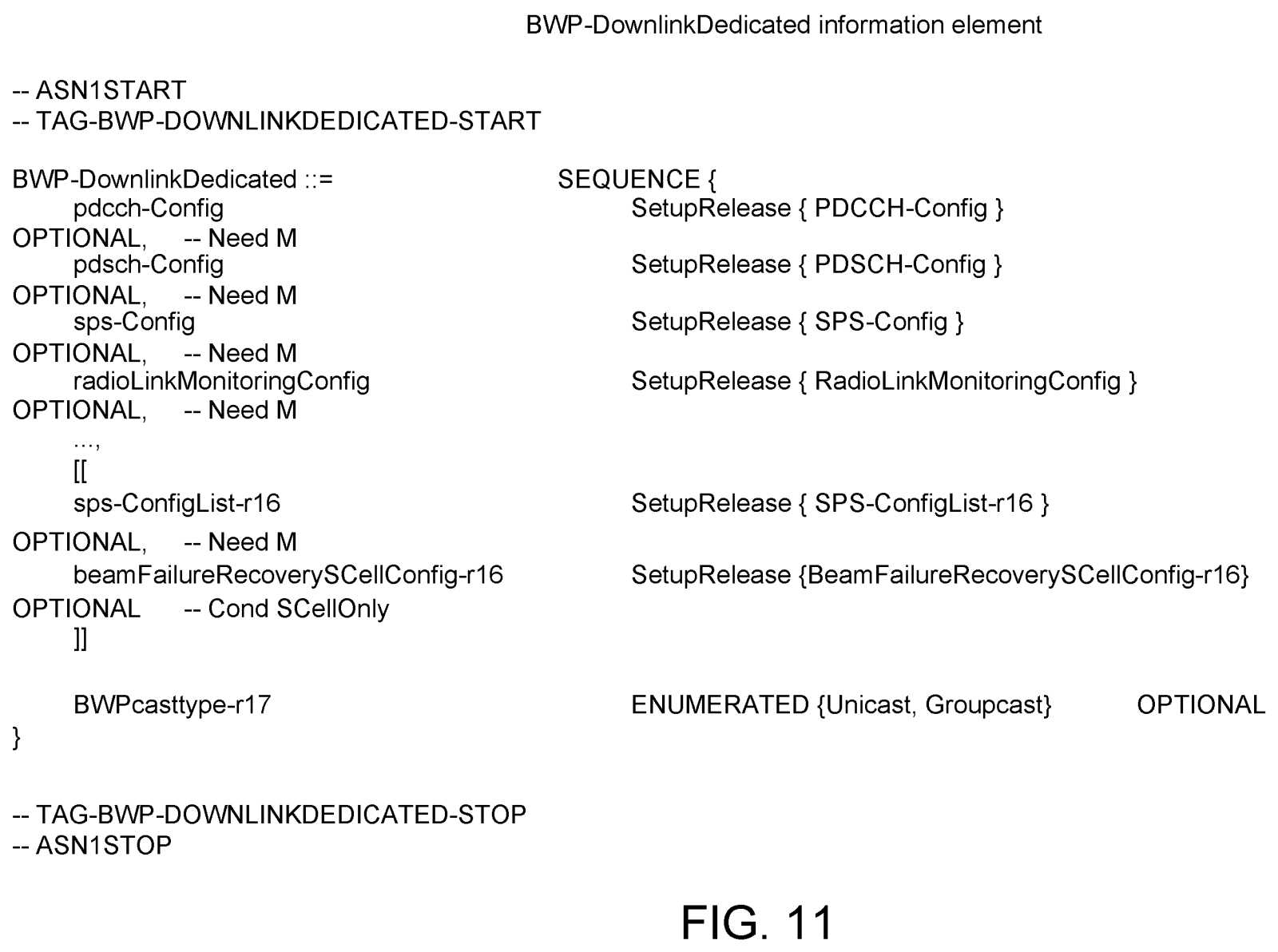

BWP-DownlinkDedicated information element

```
-- ASN1START
-- TAG-BWP-DOWNLINKDEDICATED-START

BWP-DownlinkDedicated ::=        SEQUENCE {
    pdcch-Config                     SetupRelease { PDCCH-Config }
OPTIONAL,    -- Need M
    pdsch-Config                     SetupRelease { PDSCH-Config }
OPTIONAL,    -- Need M
    sps-Config                       SetupRelease { SPS-Config }
OPTIONAL,    -- Need M
    radioLinkMonitoringConfig        SetupRelease { RadioLinkMonitoringConfig }
OPTIONAL,    -- Need M
    ...,
    [[
    sps-ConfigList-r16               SetupRelease { SPS-ConfigList-r16 }
OPTIONAL,    -- Need M
    beamFailureRecoverySCellConfig-r16   SetupRelease {BeamFailureRecoverySCellConfig-r16}
OPTIONAL    -- Cond SCellOnly
    ]]

BWPcasttype-r17                  ENUMERATED {Unicast, Groupcast}        OPTIONAL
}

-- TAG-BWP-DOWNLINKDEDICATED-STOP
-- ASN1STOP
```

FIG. 11

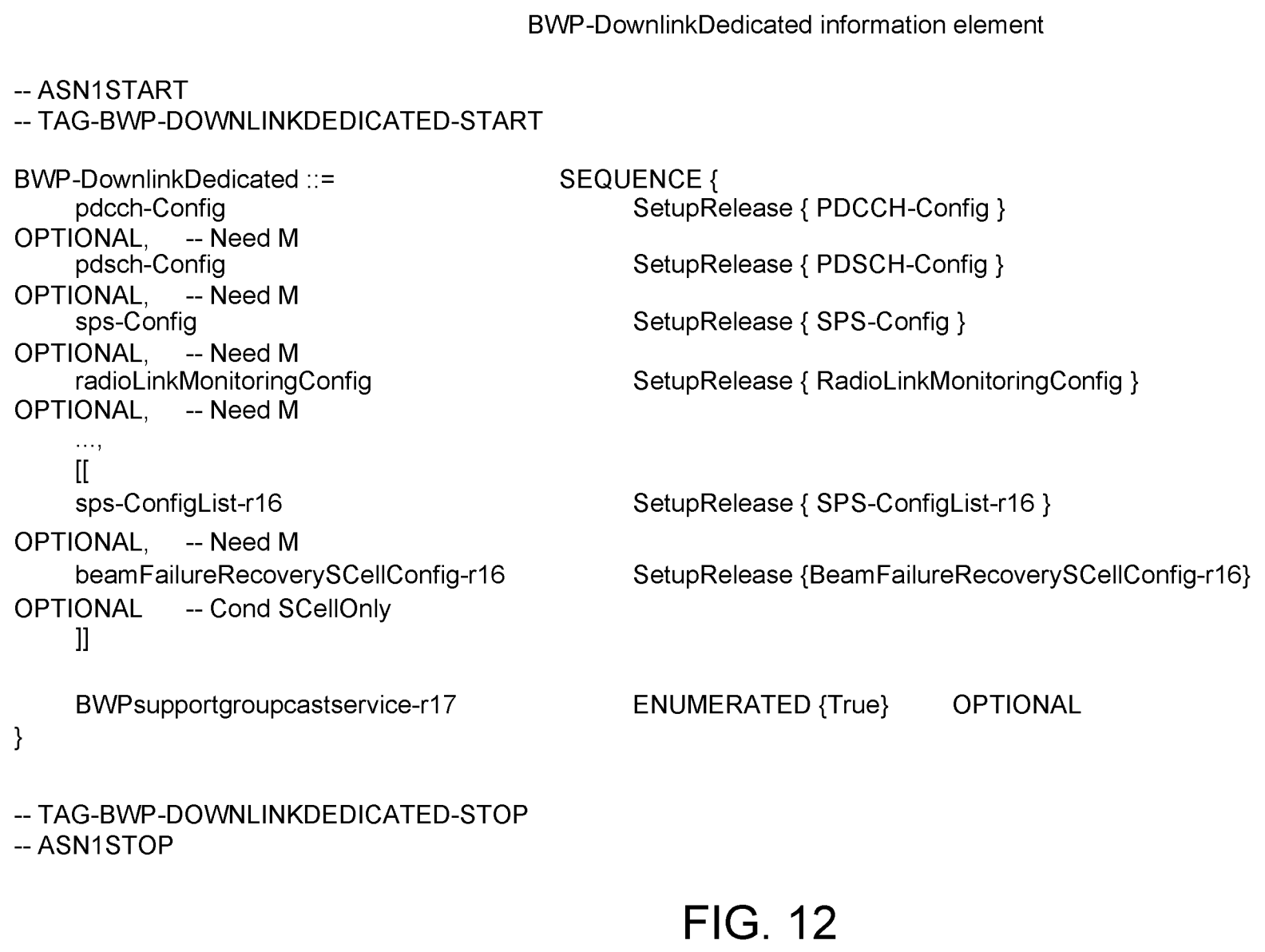

BWP-DownlinkDedicated information element

```
-- ASN1START
-- TAG-BWP-DOWNLINKDEDICATED-START

BWP-DownlinkDedicated ::=       SEQUENCE {
    pdcch-Config                    SetupRelease { PDCCH-Config }
OPTIONAL,      -- Need M
    pdsch-Config                    SetupRelease { PDSCH-Config }
OPTIONAL,      -- Need M
    sps-Config                      SetupRelease { SPS-Config }
OPTIONAL,      -- Need M
    radioLinkMonitoringConfig       SetupRelease { RadioLinkMonitoringConfig }
OPTIONAL,      -- Need M
    ...,
    [[
    sps-ConfigList-r16              SetupRelease { SPS-ConfigList-r16 }
OPTIONAL,      -- Need M
    beamFailureRecoverySCellConfig-r16   SetupRelease {BeamFailureRecoverySCellConfig-r16}
OPTIONAL      -- Cond SCellOnly
    ]]

BWPsupportgroupcastservice-r17  ENUMERATED {True}       OPTIONAL
}

-- TAG-BWP-DOWNLINKDEDICATED-STOP
-- ASN1STOP
```

FIG. 12

```
BWP-Downlink-Groupcast information element

-- ASN1START
-- TAG-BWP-DOWNLINK-GROUPCAST-START

BWP-Downlink-Groupcast ::=       SEQUENCE {
    bwp-Id-groupcast-r17             BWP-Id-Groupcast,
    bwp-Common                       BWP-DownlinkCommon
OPTIONAL,       -- Cond SetupOtherBWP
    bwp-Dedicated                    BWP-DownlinkDedicated
OPTIONAL,       -- Cond SetupOtherBWP
    ...
}

-- TAG-BWP-DOWNLINK-GROUPCAST-STOP
-- ASN1STOP
```

FIG. 13

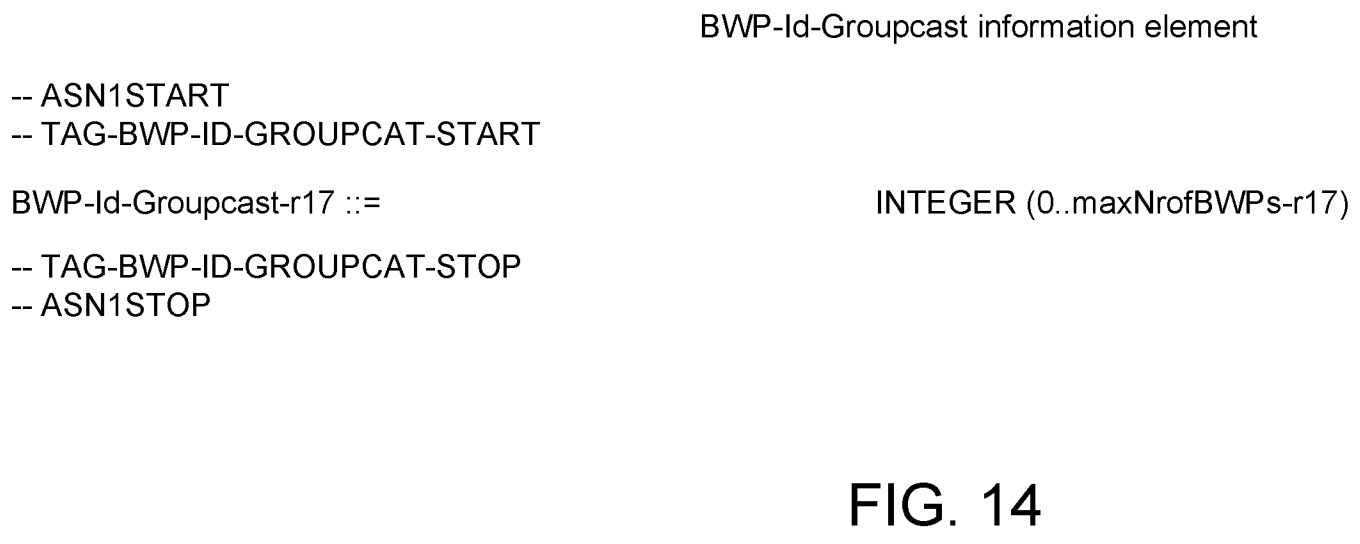

-- ASN1START
-- TAG-BWP-ID-GROUPCAT-START

BWP-Id-Groupcast information element

BWP-Id-Groupcast-r17 ::=       INTEGER (0..maxNrofBWPs-r17)

-- TAG-BWP-ID-GROUPCAT-STOP
-- ASN1STOP

FIG. 14

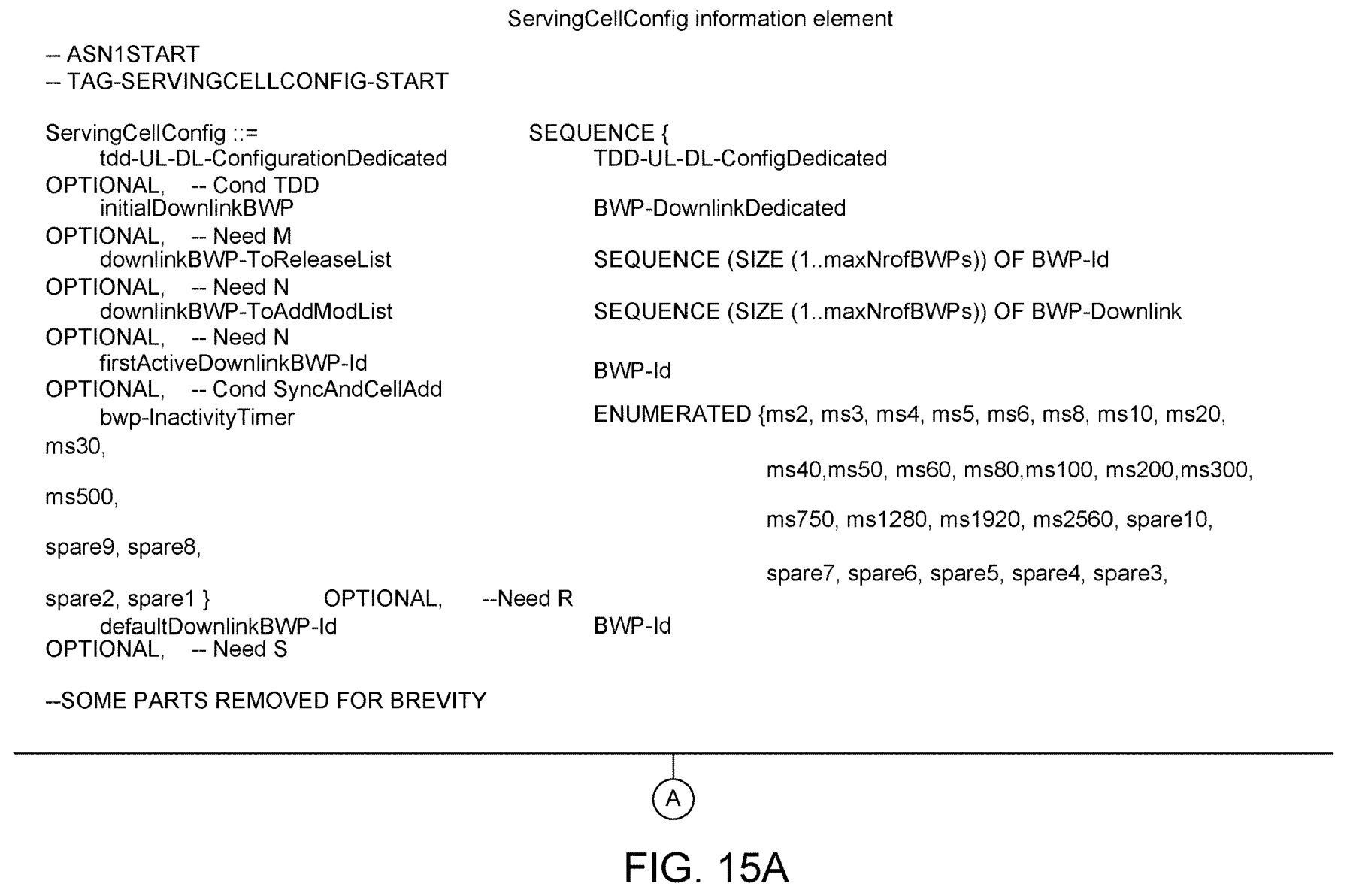

-- ASN1START
-- TAG-SERVINGCELLCONFIG-START

ServingCellConfig information element

ServingCellConfig ::=          SEQUENCE {
    tdd-UL-DL-ConfigurationDedicated          TDD-UL-DL-ConfigDedicated
OPTIONAL,    -- Cond TDD
    initialDownlinkBWP          BWP-DownlinkDedicated
OPTIONAL,    -- Need M
    downlinkBWP-ToReleaseList          SEQUENCE (SIZE (1..maxNrofBWPs)) OF BWP-Id
OPTIONAL,    -- Need N
    downlinkBWP-ToAddModList          SEQUENCE (SIZE (1..maxNrofBWPs)) OF BWP-Downlink
OPTIONAL,    -- Need N
    firstActiveDownlinkBWP-Id          BWP-Id
OPTIONAL,    -- Cond SyncAndCellAdd
    bwp-InactivityTimer          ENUMERATED {ms2, ms3, ms4, ms5, ms6, ms8, ms10, ms20,
ms30,
                                        ms40,ms50, ms60, ms80,ms100, ms200,ms300,
ms500,
                                        ms750, ms1280, ms1920, ms2560, spare10,
spare9, spare8,
                                        spare7, spare6, spare5, spare4, spare3,
spare2, spare1 }          OPTIONAL,          --Need R
    defaultDownlinkBWP-Id          BWP-Id
OPTIONAL,    -- Need S

--SOME PARTS REMOVED FOR BREVITY (A)

FIG. 15A

```
    downlinkBWPgroupcast-ToReleaseList          SEQUENCE (SIZE (1..maxNrofBWPs)) OF  BWP-Id-Groupcast
OPTIONAL,    -- Need N downlinkBWPgroupcast-ToAddModList           SEQUENCE (SIZE (1..maxNrofBWPs)) OF BWP-Downlink-
Groupcast                OPTIONAL,      -- Need N firstActiveDownlinkBWP-Id-groupcast         BWP-Id-Groupcast
OPTIONAL,     -- Cond SyncAndCellAdd bwp-InactivityTimer-groupcast               ENUMERATED {ms2, ms3, ms4, ms5, ms6, ms8, ms10, ms20,
ms30,
                                                            ms40,ms50, ms60, ms80,ms100, ms200,ms300,
ms500,
                                                            ms750, ms1280, ms1920, ms2560, spare10,
spare9, spare8,
                                                            spare7, spare6, spare5, spare4, spare3,
spare2, spare1 }                OPTIONAL,     --Need R defaultDownlinkBWP-Id-groupcast             BWP-Id-Groupcast
OPTIONAL,    -- Need S

}

-- TAG-SERVINGCELLCONFIG-STOP
-- ASN1STOP
```

FIG. 15B

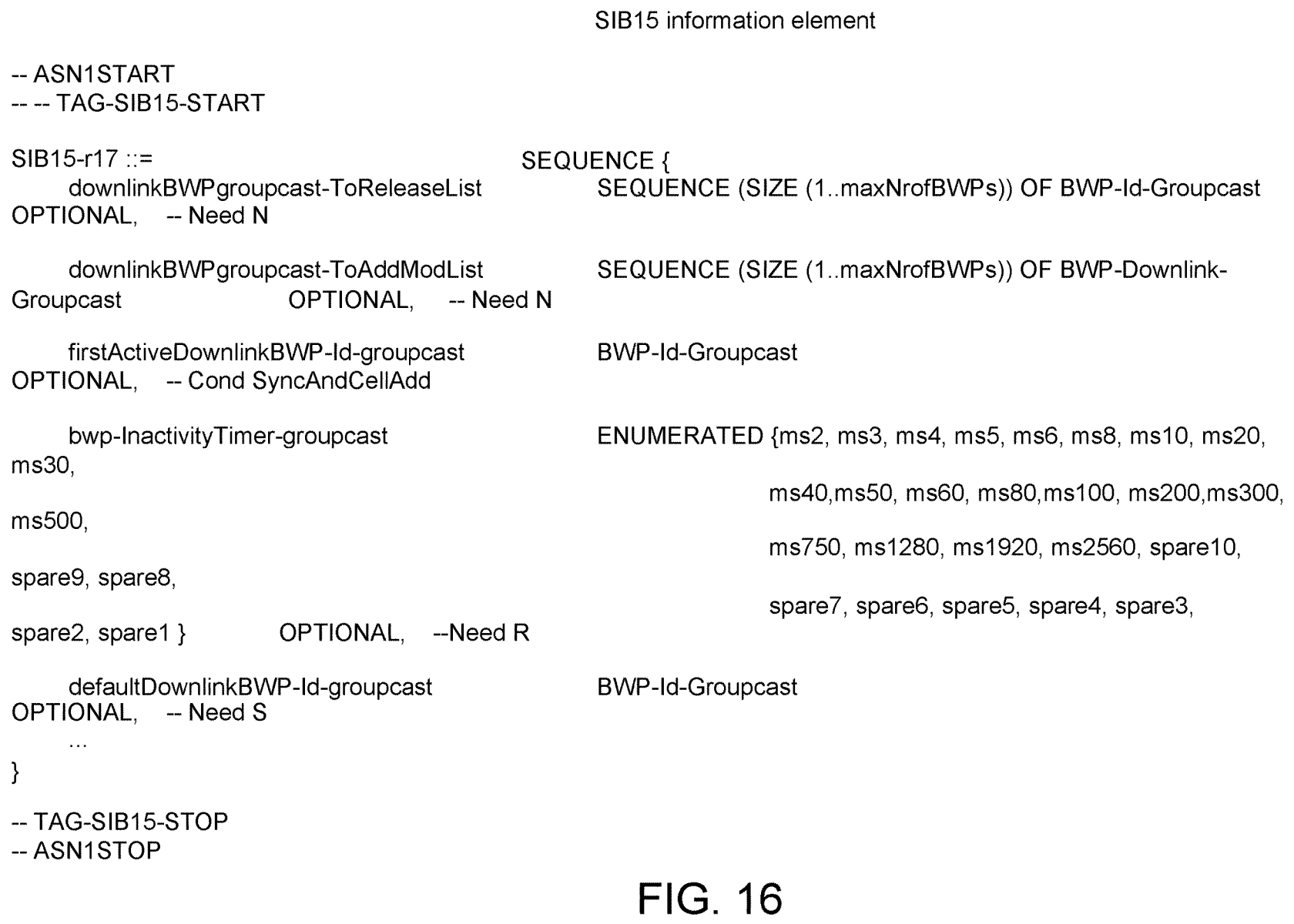

SIB15 information element

-- ASN1START
---- TAG-SIB15-START

SIB15-r17 ::=                    SEQUENCE {
    downlinkBWPgroupcast-ToReleaseList          SEQUENCE (SIZE (1..maxNrofBWPs)) OF BWP-Id-Groupcast
OPTIONAL,    -- Need N downlinkBWPgroupcast-ToAddModList          SEQUENCE (SIZE (1..maxNrofBWPs)) OF BWP-Downlink-
Groupcast                    OPTIONAL,    -- Need N firstActiveDownlinkBWP-Id-groupcast          BWP-Id-Groupcast
OPTIONAL,    -- Cond SyncAndCellAdd bwp-InactivityTimer-groupcast          ENUMERATED {ms2, ms3, ms4, ms5, ms6, ms8, ms10, ms20,
ms30,
                              ms40,ms50, ms60, ms80,ms100, ms200,ms300,
ms500,
                              ms750, ms1280, ms1920, ms2560, spare10,
spare9, spare8,
                              spare7, spare6, spare5, spare4, spare3,
spare2, spare1 }              OPTIONAL,    --Need R defaultDownlinkBWP-Id-groupcast          BWP-Id-Groupcast
OPTIONAL,    -- Need S
    ...
}

-- TAG-SIB15-STOP
-- ASN1STOP

FIG. 16

```
-- ASN1START
-- TAG-CONTROLRESOURCESET-START

ControlResourceSet information element

ControlResourceSet ::=      SEQUENCE {
    controlResourceSetId        ControlResourceSetId, frequencyDomainResources    BIT STRING (SIZE (45)),
    duration                    INTEGER (1..maxCoReSetDuration),

--SOME PARTS REMOVED FOR BREVITY

CORESETcasttype-r17         ENUMERATED {Unicast, Groupcast}      OPTIONAL
}

-- TAG-CONTROLRESOURCESET-STOP
-- ASN1STOP
```

FIG. 19

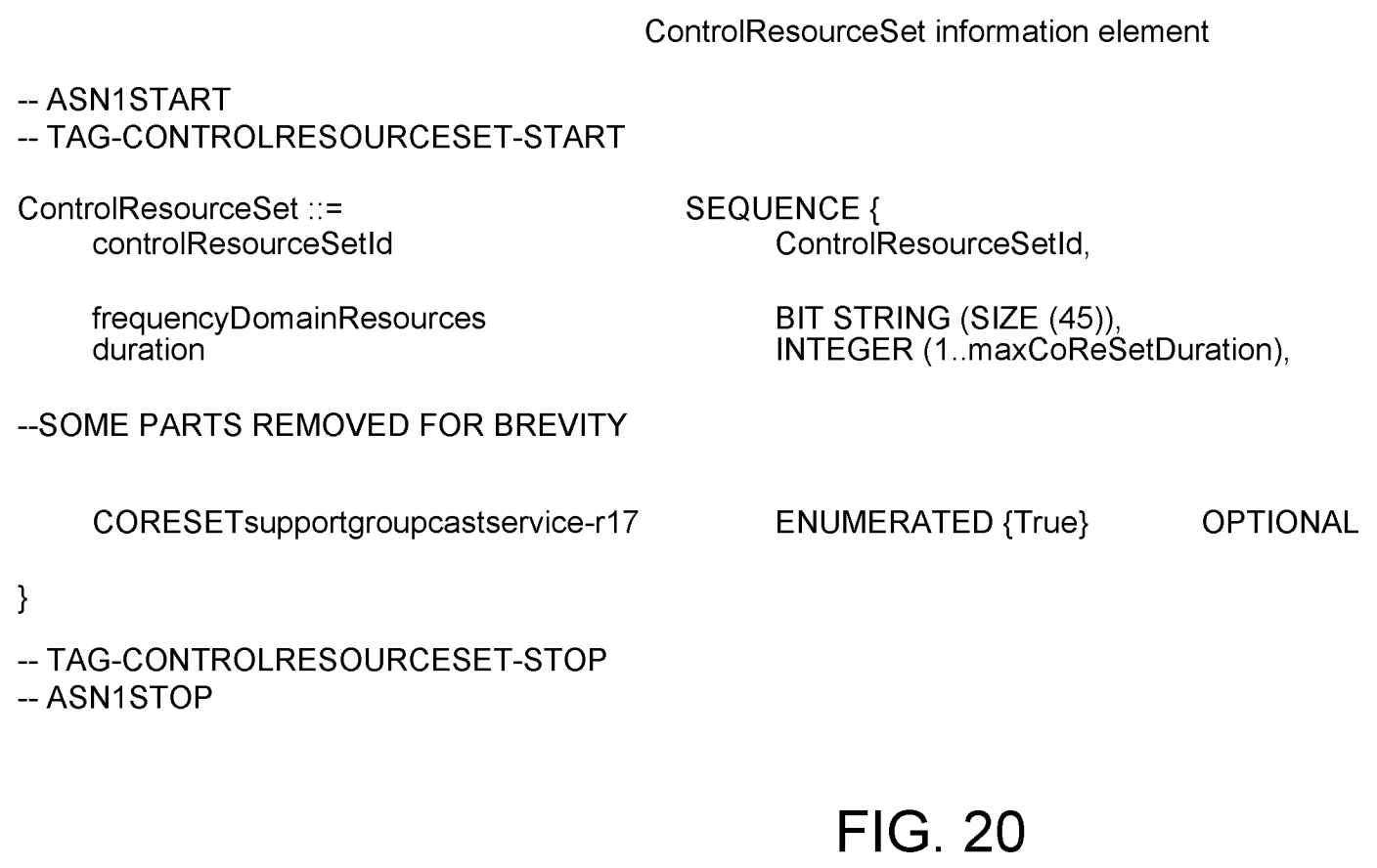

ControlResourceSet information element

-- ASN1START
-- TAG-CONTROLRESOURCESET-START

ControlResourceSet ::=        SEQUENCE {
    controlResourceSetId          ControlResourceSetId, frequencyDomainResources      BIT STRING (SIZE (45)),
    duration                      INTEGER (1..maxCoReSetDuration),

--SOME PARTS REMOVED FOR BREVITY

CORESETsupportgroupcastservice-r17    ENUMERATED {True}        OPTIONAL
}

-- TAG-CONTROLRESOURCESET-STOP
-- ASN1STOP

FIG. 20

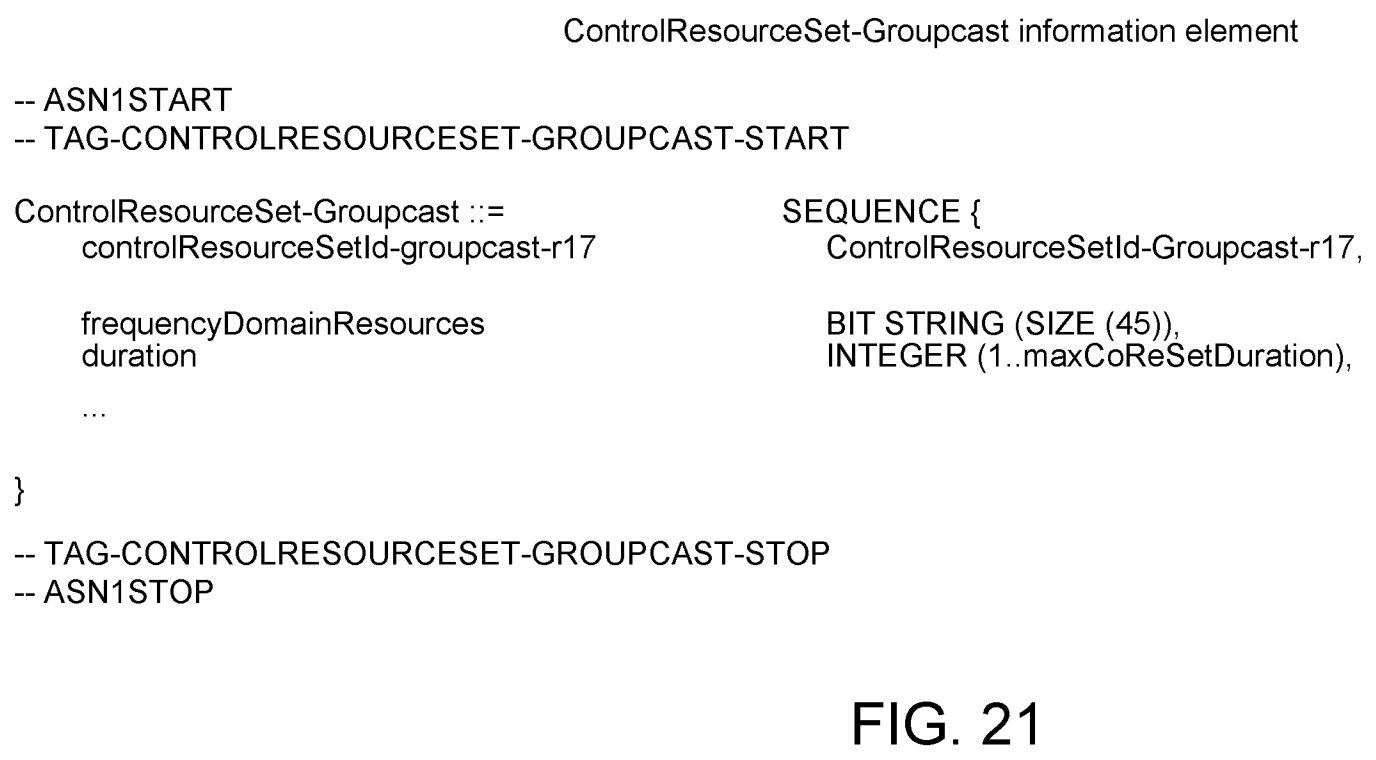

ControlResourceSet-Groupcast information element

-- ASN1START
-- TAG-CONTROLRESOURCESET-GROUPCAST-START

ControlResourceSet-Groupcast ::=          SEQUENCE {
    controlResourceSetId-groupcast-r17          ControlResourceSetId-Groupcast-r17, frequencyDomainResources          BIT STRING (SIZE (45)),
    duration          INTEGER (1..maxCoReSetDuration),

...

}

-- TAG-CONTROLRESOURCESET-GROUPCAST-STOP
-- ASN1STOP

FIG. 21

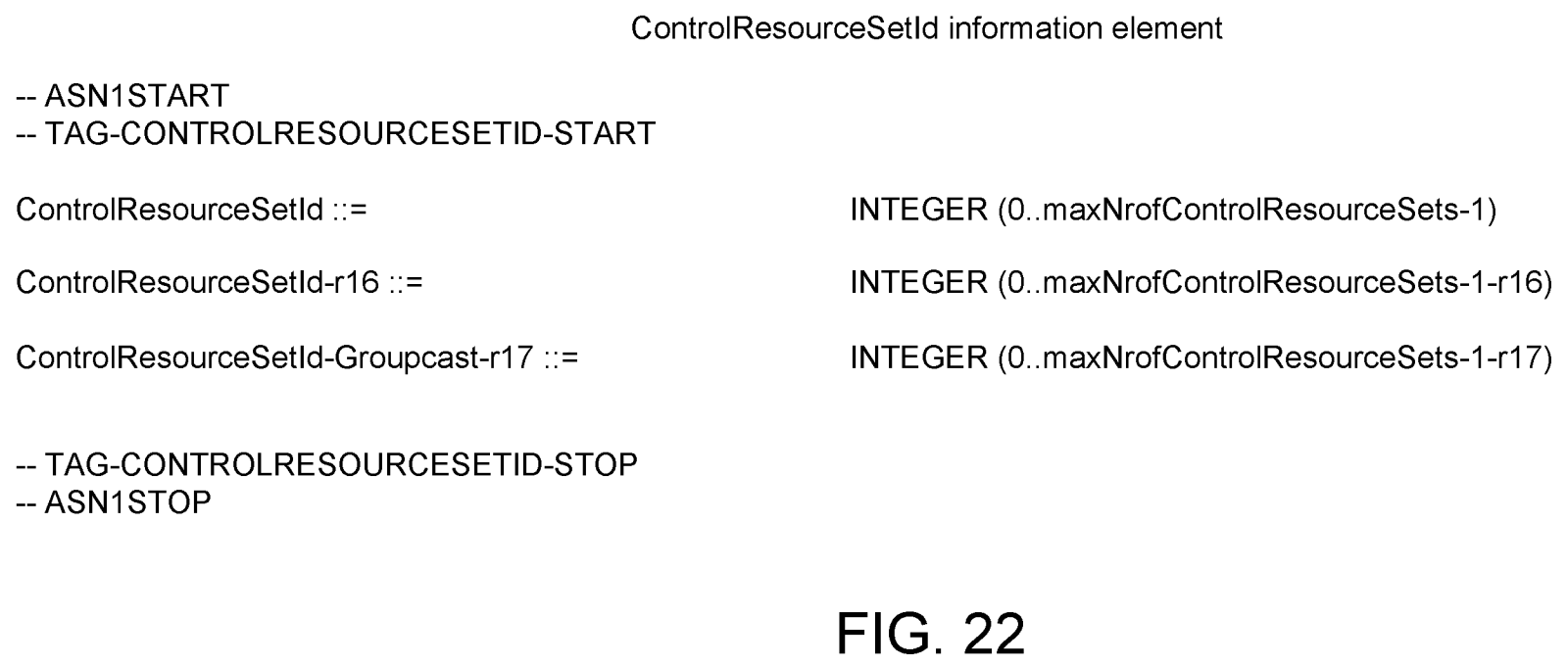

ControlResourceSetId information element

-- ASN1START
-- TAG-CONTROLRESOURCESETID-START

ControlResourceSetId ::=                        INTEGER (0..maxNrofControlResourceSets-1)

ControlResourceSetId-r16 ::=                    INTEGER (0..maxNrofControlResourceSets-1-r16)

ControlResourceSetId-Groupcast-r17 ::=          INTEGER (0..maxNrofControlResourceSets-1-r17)

-- TAG-CONTROLRESOURCESETID-STOP
-- ASN1STOP

FIG. 22

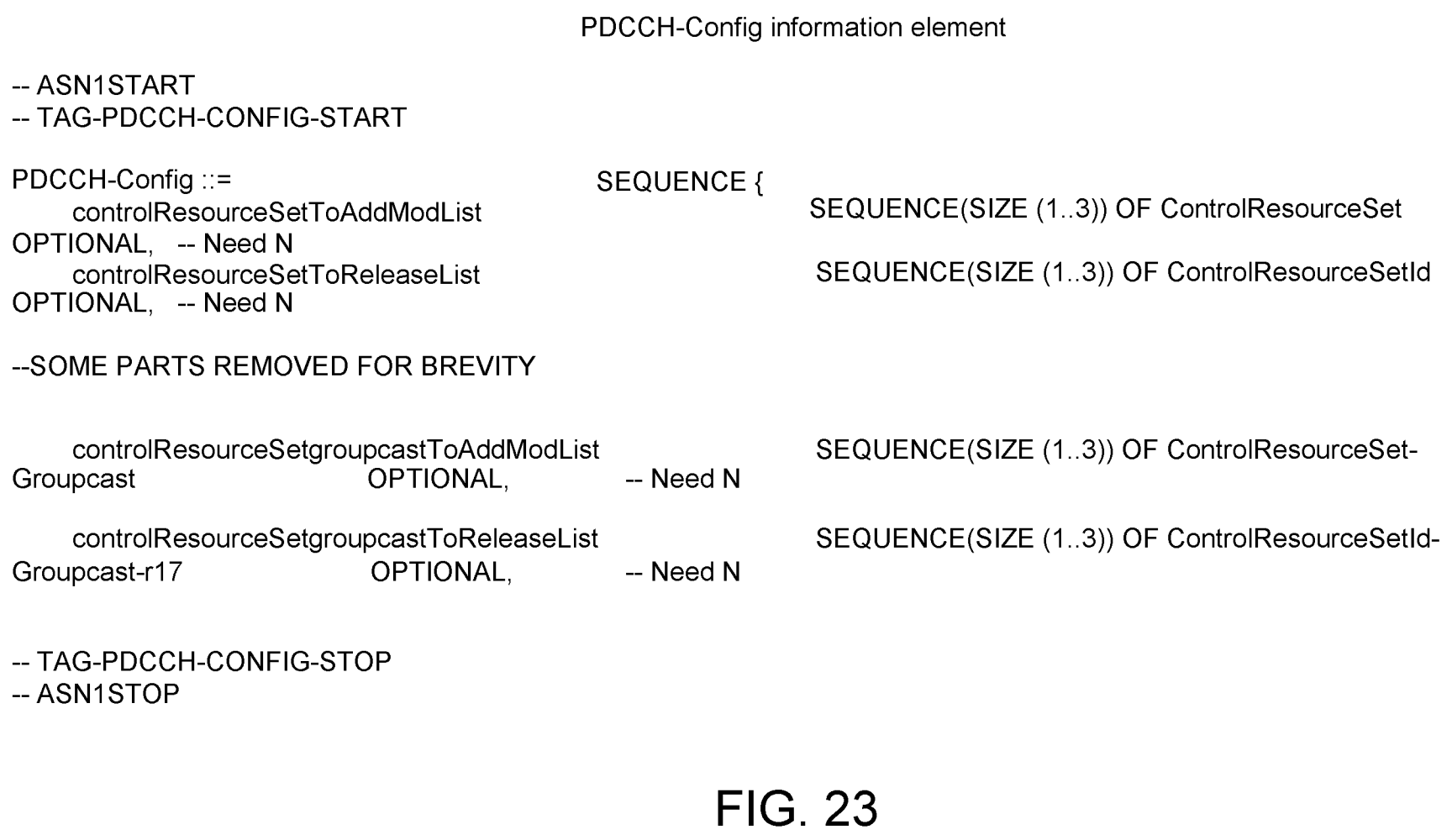

PDCCH-Config information element

-- ASN1START
-- TAG-PDCCH-CONFIG-START

PDCCH-Config ::=                          SEQUENCE {
    controlResourceSetToAddModList        SEQUENCE(SIZE (1..3)) OF ControlResourceSet
OPTIONAL,   -- Need N
    controlResourceSetToReleaseList       SEQUENCE(SIZE (1..3)) OF ControlResourceSetId
OPTIONAL,   -- Need N

--SOME PARTS REMOVED FOR BREVITY controlResourceSetgroupcastToAddModList
Groupcast              OPTIONAL,        SEQUENCE(SIZE (1..3)) OF ControlResourceSet-
-- Need N
    controlResourceSetgroupcastToReleaseList
Groupcast-r17          OPTIONAL,        SEQUENCE(SIZE (1..3)) OF ControlResourceSetId-
-- Need N

-- TAG-PDCCH-CONFIG-STOP
-- ASN1STOP

FIG. 23

```
-- ASN1START
-- TAG-SIB15-START

SIB15 information element

SIB15-r17 ::=                    SEQUENCE {
    controlResourceSetgroupcastToAddModList    SEQUENCE(SIZE (1..3)) OF ControlResourceSet-
Groupcast              OPTIONAL,    -- Need N
    controlResourceSetgroupcastToReleaseList   SEQUENCE(SIZE (1..3)) OF ControlResourceSetId-
Groupcast-r17          OPTIONAL,    -- Need N
    ...
}

-- TAG-SIB15-STOP
-- ASN1STOP
```

FIG. 24

```
-- ASN1START
-- TAG-SEARCHSPACE-START

SearchSpace ::=                      SEQUENCE {
    searchSpaceId                        SearchSpaceId,
    controlResourceSetId                 ControlResourceSetId
    OPTIONAL,    -- Cond SetupOnly

--SOME PARTS REMOVED FOR BREVITY searchSpacecasttype-r17              ENUMERATED {Unicast, Groupcast}    OPTIONAL
}
-- TAG-SEARCHSPACE-STOP
-- ASN1STOP
```

SearchSpace information element

FIG. 25

```
-- ASN1START
-- TAG-SEARCHSPACE-START

SearchSpace information element

SearchSpace ::=          SEQUENCE {
    searchSpaceId            SearchSpaceId,
    controlResourceSetId     ControlResourceSetId
    OPTIONAL,  -- Cond SetupOnly

--SOME PARTS REMOVED FOR BREVITY

SearchSpacesupportgroupcastservice-r17    ENUMERATED {True}    OPTIONAL

}
-- TAG-SEARCHSPACE-STOP
-- ASN1STOP
```

FIG. 26

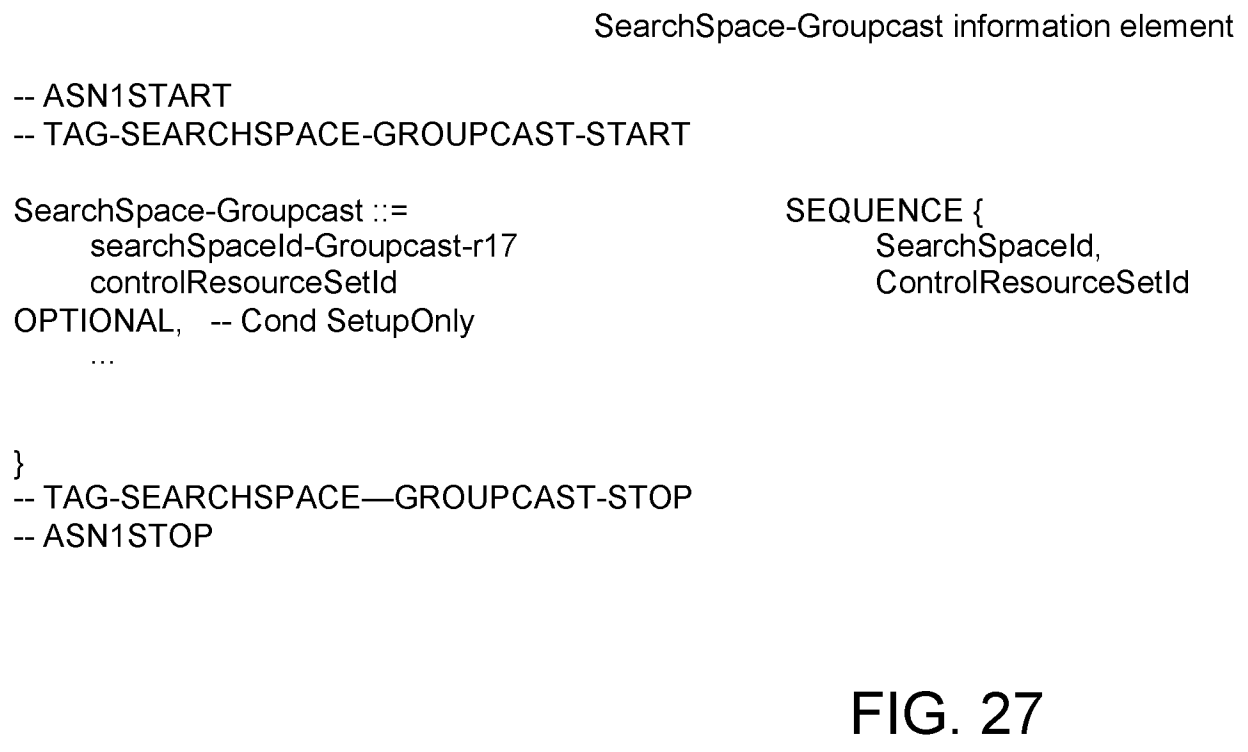

SearchSpace-Groupcast information element

-- ASN1START
-- TAG-SEARCHSPACE-GROUPCAST-START

SearchSpace-Groupcast ::=           SEQUENCE {
    searchSpaceId-Groupcast-r17          SearchSpaceId,
    controlResourceSetId                 ControlResourceSetId
OPTIONAL,  -- Cond SetupOnly

...

}
-- TAG-SEARCHSPACE—GROUPCAST-STOP
-- ASN1STOP

FIG. 27

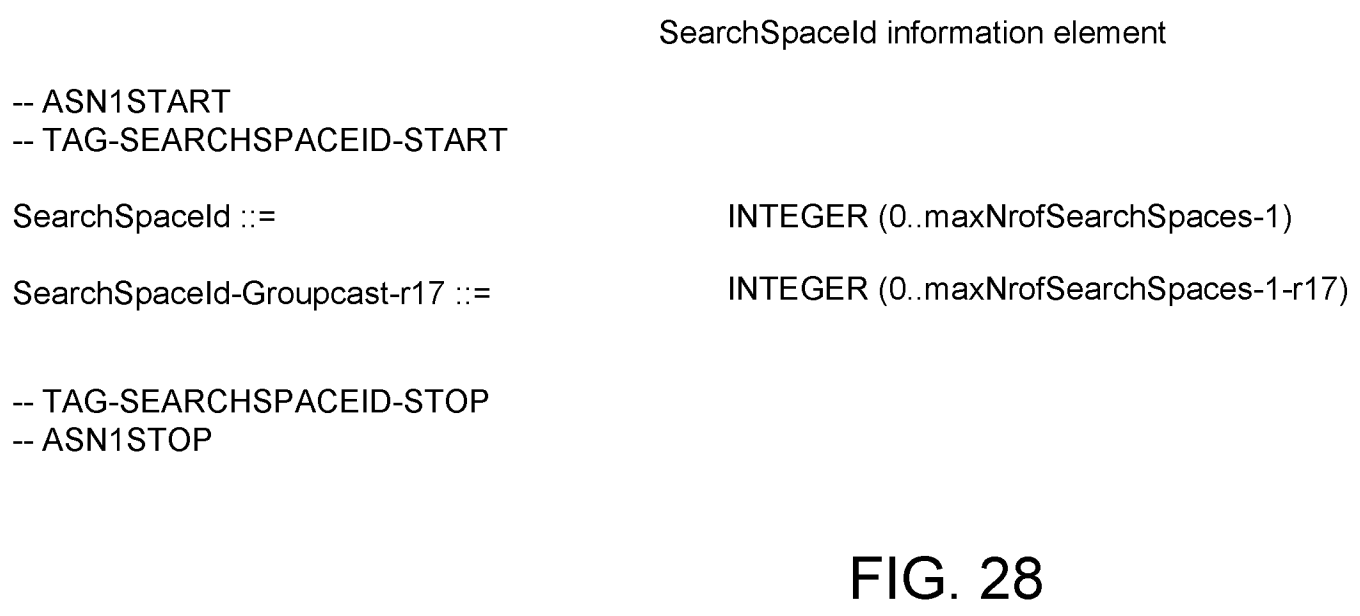

SearchSpaceId information element

-- ASN1START
-- TAG-SEARCHSPACEID-START

SearchSpaceId ::=                    INTEGER (0..maxNrofSearchSpaces-1)

SearchSpaceId-Groupcast-r17 ::=      INTEGER (0..maxNrofSearchSpaces-1-r17)

-- TAG-SEARCHSPACEID-STOP
-- ASN1STOP

FIG. 28

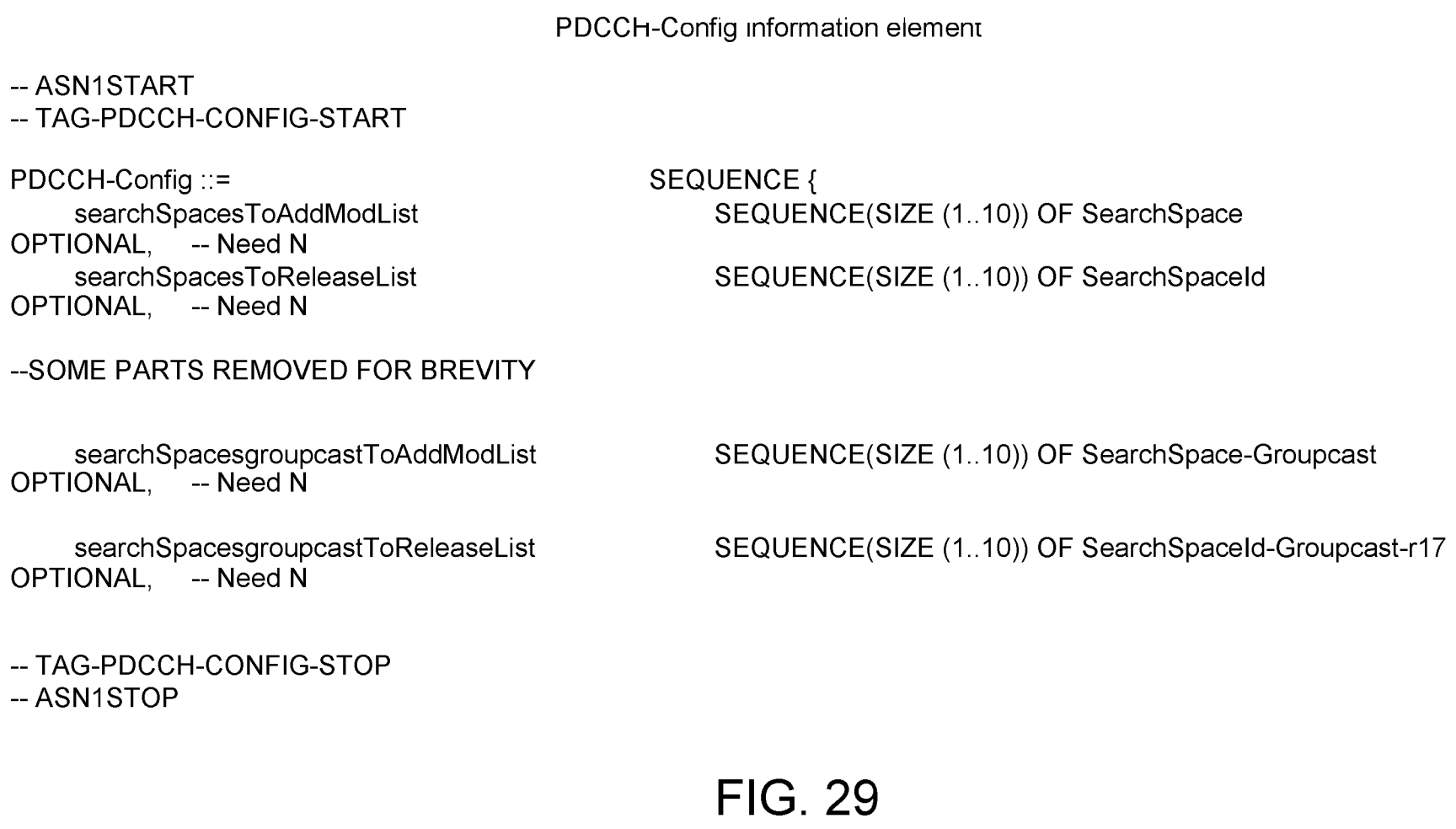

PDCCH-Config information element

```
-- ASN1START
-- TAG-PDCCH-CONFIG-START

PDCCH-Config ::=                              SEQUENCE {
    searchSpacesToAddModList                      SEQUENCE(SIZE (1..10)) OF SearchSpace
OPTIONAL,    -- Need N
    searchSpacesToReleaseList                     SEQUENCE(SIZE (1..10)) OF SearchSpaceId
OPTIONAL,    -- Need N

--SOME PARTS REMOVED FOR BREVITY searchSpacesgroupcastToAddModList             SEQUENCE(SIZE (1..10)) OF SearchSpace-Groupcast
OPTIONAL,    -- Need N
    searchSpacesgroupcastToReleaseList            SEQUENCE(SIZE (1..10)) OF SearchSpaceId-Groupcast-r17
OPTIONAL,    -- Need N

-- TAG-PDCCH-CONFIG-STOP
-- ASN1STOP
```

FIG. 29

```
-- ASN1START
-- TAG-SIB15-START

SIB15-r17 ::=          SEQUENCE {
    searchSpacesgroupcastToAddModList        SEQUENCE(SIZE (1..10)) OF SearchSpace-Groupcast
OPTIONAL,    -- Need N searchSpacesgroupcastToReleaseList       SEQUENCE(SIZE (1..10)) OF SearchSpaceId-Groupcast-r17
OPTIONAL,    -- Need N

...
}
-- TAG-SIB15-STOP
-- ASN1STOP
```

SIB15 information element

FIG. 30

MECHANISM OF SCHEDULING FOR BROADCAST AND GROUPCAST ON NEW RADIO UU INTERFACE

CROSS-REFERENCE TO RELATED APPLICATIONS

This application is the National Stage Application of International Patent Application No. PCT/US2021/032407, filed May 14, 2021, which claims the benefit of U.S. Provisional Patent Application No. 63/024,720, filed on May 14, 2020, entitled "Mechanism of Scheduling for Broadcast and Groupcast on New Radio Uu Interface," and U.S. Provisional Patent Application No. 63/170,735, filed on Apr. 5, 2021, entitled "Mechanism of Scheduling for Broadcast and Groupcast on New Radio Uu Interface," the contents of which are hereby incorporated by reference herein.

BACKGROUND

LTE MBMS

LTE MBMS (Multimedia broadcast multicast services) supports broadcast/multicast services in a cellular system, where the same content is simultaneously transmitted to the UEs located in an area.

In LTE, MBMS service area is defined as the area that all the UEs receive the same broadcast/multicast services. An MBMS service area may comprise one or multiple cells.

Two types of mechanism are supported in LTE for broadcast/multicast services: MBSFN (Multicast-Broadcast Single Frequency Network), and SC-PTM (Single-Cell Point to Multipoint).

LTE MBSFN

MBSFN is introduced to LTE in Rel-9, which targets the use case when the MBMS service is of interest over a larger area, e.g., for TV broadcasting. Different cells within the same MBSFN area are mutually time aligned and broadcast the identical information. Therefore, from a UE perspective, the transmissions received from multiple cells can be seen as a single transmission received from one cell subject to severe multi-path propagation as long as the cyclic prefix is large enough. The UE doesn't need to know which cell are actually involved in the transmission.

In LTE MBSFN, broadcast/multicast services are transmitted on the dedicated physical channel PMCH (Physical Multicast Channel) in the dedicated MBSFN subframes. An MBSFN subframe consists of two parts: a control region which is used for transmission of regular unicast L1/L2 control signaling, and an MBSFN region which is used for transmission of the multicast channel. Within one MBSFN subframe, all the MBSFN transmissions correspond to the same MBSFN area. However, the MBSFN transmissions in different subframes may correspond to different MBSFN areas.

To support coherent demodulation for the received MBSFN transmission, MBSFN area specific MBSFN reference signals are transmitted in the MBSFN subframe. All the cells within the same MBSFN area transmit the MBSFN reference signals at the same time-frequency location and with the same reference-symbol values. Since only one single MBSFN reference signal is transmitted in the MBSFN subframe, MIMO scheme is not supported in LTE MBSFN.

LTE SC-PTM

SC-PTM is introduced to LTE in release 13 in order to support MBMS services when it is of interest in a single cell or in a small area consisting of a few cells. Different from the MBSFN, SC-PTM transmissions reuse the PDSCH (Physical Downlink Shared Channel).

Similar to the unicast transmission, the SC-PTM transmission is dynamically scheduled by the DCI. G-RNTI (Group Radio Network Temporary Identifier) is used to scramble the DCI scheduling the SC-PTM transmission. For different MBMS services, different G-RNTIs are used for UE to receive the SC-PTM transmission that it is interested in.

In LTE SC-PTM, HARQ (Hybrid Automatic Repeat Request) feedback and CSI (Channel State Information) reports are not supported. Consequently, only the transmission modes 1-3, which do not rely on feedback, are supported.

a. NR Uu Broadcast/Groupcast Use Cases

In NR (New Radio), Uu broadcast/groupcast is identified to be beneficial in many use cases, such as V2X (Vehicle-to-everything) communication, public safety, video and audio distribution, IIoT (Industrial Internet of Things), media streams, various types of content distribution etc.

Comparing to the LTE, the NR Uu broadcast/groupcast use cases usually have a smaller communication range and require higher reliability and lower latency in many scenarios.

b. NR Downlink Scheduling Mechanism

In NR, DCI (Downlink Control Information) format 1_1 is used for the scheduling of PDSCH (Physical Downlink Share Channel) for unicast transmission in one cell. The scheduling DCI carries the information such as time and frequency resource assignments, HARQ related information, feedback resource assignment, etc.

For a UE, the transmission of DL scheduling is a priori unknown to it. The UE need to blindly detect the DCI from the gNB. To reduce the effort of blind decoding and therefore save the power consumed on it, the UE is configured with the BWP (Bandwidth Part), CORESET (Control Resource Set), search space information by the gNB. So, the UE only need to perform blind decoding within the configured time and frequency region and does not need to search the whole spectrum.

c. Feedback Mechanism for NR V2X Groupcast

In NR V2X groupcast scenario, two types of HARQ feedback mechanism are supported, ACK/NACK based mechanism and NACK only based mechanism. In ACK/NACK based case, a UE will send ACK or NACK based on whether the reception of a groupcast transmission is succeeded or failed. In NACK only based case, a UE will only send NACK when the reception of a groupcast transmission is failed. When the reception is succeeded, the UE doesn't send any feedback.

In NR V2X, a UE transmit the HARQ feedback on the PSFCH (Physical Sidelink Feedback Channel). Within a resource pool, a UE can be configured with periodic PSFCH transmission occasion resources. If a UE receives a transmission in a resource pool and is indicated to report the HARQ feedback, the UE transmits the HARQ feedback on one of the configured PSFCH transmission occasion resources. The UE transmits the feedback in the first slot that includes the configured PSFCH resource and is with a minimum time gap after the last slot of the reception of the transmission.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist with scheduling for broadcast and groupcast on new radio Uu interface. In an example, there may be broadcast and groupcast transmission scheduling mechanism with: group based scheduling, UE specific based scheduling, or sub-group based scheduling. In an example, there may be a serving cell configuration for broadcast and groupcast transmission with dedicated cell for broadcast and groupcast, or broadcast and groupcast cell which is shared with the cell for unicast, another example, there may be downlink control related configuration for broadcast and groupcast transmission with details of the BWP configuration, the CORESET configuration, or the search space configuration. In an example, there may be semi-persistent scheduling for NR MBS, which may include activation DCI and deactivation DCI for MBS; HARQ feedback for MBS SPS PDSCH; retransmission for MBS SPS PDSCH; or reliability enhancement for activation DCI and deactivation DCI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 3 illustrates an example of RRC information configuring a cell is dedicated for broadcast/groupcast service or for unicast service;

FIG. 4 illustrates an example of RRC information configuring a cell is dedicated for broadcast/groupcast service or not;

FIG. 6 illustrates an example of RRC information configuring a cell supports both unicast service and broadcast/groupcast service;

FIG. 11 illustrates an example of explicitly configure downlink BWP for broadcast and groupcast transmission;

FIG. 12 illustrates another example of explicitly configure downlink BWP for broadcast and groupcast transmission;

FIG. 13 illustrates an example of a new information element used for configuring the downlink bandwidth part for broadcast/groupcast transmission;

FIG. 14 illustrates an example of a new information element used for configuring the downlink bandwidth part ID for broadcast/groupcast transmission;

FIG. 15A illustrates an example of IE BWP-Downlink-Groupcast configured through UE specific RRC signaling;

FIG. 15B illustrates a continued example from FIG. 15A of IE BWP-Downlink-Groupcast configured through UE specific RRC signaling;

FIG. 16 illustrates an example of IE BWP-Downlink-Groupcast configured through broadcast RRC signaling;

FIG. 19 illustrates an example of explicitly configure CORESET for broadcast and groupcast transmission;

FIG. 20 illustrates another example of explicitly configure CORESET for broadcast and groupcast transmission;

FIG. 21 illustrates an example of a new information element used for configuring CORESET for broadcast and groupcast;

FIG. 22 illustrates an example of a new RRC parameter used for configuring the CORESET ID for broadcast/groupcast transmission;

FIG. 23 illustrates an example of IE ControlResourceSet-Groupcast configured through UE specific RRC signaling;

FIG. 24 illustrates an example of IE ControlResourceSet-Groupcast configured through broadcast RRC signaling;

FIG. 25 illustrates an example of explicitly configure search space for broadcast and groupcast transmission;

FIG. 26 illustrates another example of explicitly configure search space for broadcast and groupcast transmission;

FIG. 27 illustrates an example of a new information element used for configuring search space for broadcast and groupcast;

FIG. 28 illustrates an example of a new RRC parameter used for configuring the search space ID for broadcast/groupcast transmission;

FIG. 29 illustrates an example of IE SearchSpace-Groupcast configured through UE specific RRC signaling;

FIG. 30 illustrates an example of IE SearchSpace-Groupcast configured through broadcast RRC signaling;

DETAILED DESCRIPTION

In NR, broadcast and groupcast on the Uu interface may beneficial for many use cases, e.g., public safety, V2X application, IoT application, etc. In NR, the conventional scheduling mechanism is designed for scheduling on Uu interface the unicast data transmission but not groupcast. In support of V2X sidelink communication, NR supports scheduling mechanism for sidelink groupcast. However, such design is tailored to operation over the sidelink interface relying on the pre-defined/pre-configured resource pool with the cost of scheduling flexibility. To support transmitting data in a broadcast or groupcast manner over the Uu interface, enhancements need to be introduced for the scheduling mechanism to allow the UE to receive and decode the scheduling information from gNB to receive the broadcast and groupcast services.

In NR, a UE 241, for example, is configured with BWP, CORESET, and search space to blindly detect the scheduling of the unicast transmission. To support broadcast or groupcast, similar subject matter needs to be adopted. Current NR have not defined the BWP, CORESET, and search space for transmitting data radio bearer's data (application data) through broadcast or groupcast yet. Also, it may be problematic to directly reuse the BWP, CORESET, and search space configurations for unicast since a UE 241 may have different behaviors when receiving a scheduling of the unicast service versus a scheduling of the broadcast and groupcast service. Additionally, a UE 241 may simultaneously operate with both the unicast service and the broadcast and groupcast service. The behavior of the UE 241 in terms of concurrent scheduling by the network of unicast, groupcast and broadcast also need to be specified.

Disclosed in more detail herein are different scheduling schemes for NR Uu broadcast and groupcast.

Overview of Broadcast and Groupcast Scheduling

In NR Uu broadcast and groupcast scenario, the same packet is intended to be received by multiple UEs. To achieve this, a network 243 (e.g., gNB) sends the DCI carrying the downlink grant indicating the broadcast or groupcast transmission to these UEs.

Group Based Broadcast and Groupcast Scheduling

In one approach, one DCI, e.g., a group common DCI, which is used to schedule the broadcast or groupcast transmission may be received by multiple UEs. In this case, the same scheduling information is received by the UEs. And those UEs may try to detect and decode the broadcast or groupcast transmission in the time and frequency resources indicated in the received DCI.

Figure 1:
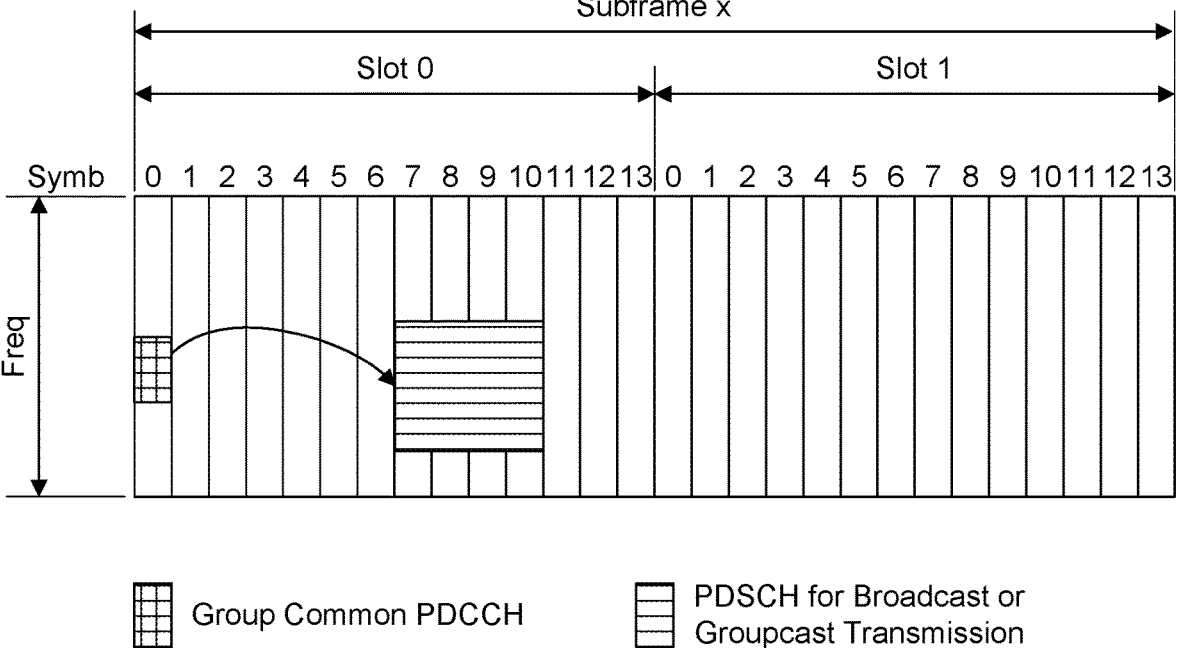
FIG. 1 illustrates an example of group common DCI scheduling the broadcast or groupcast transmission.

FIG. 1 shows an example of group common DCI scheduling the broadcast or groupcast transmission. In the example, the same group common DCI carrying the scheduling information is transmitted to the UEs that are configured to receive the broadcast or groupcast transmission, e.g., UE 241, UE 242, . . . . UE n.

Since the group common DCI is received by many UEs, a new RNTI, e.g., G-RNTI, may be introduced to scramble the CRC of the group common DCI for dynamic scheduling. This approach in this section may be applied to the UE 241 in RRC connected state, to the UE 241 in RRC inactive state, and to the UE 241 in RRC idle state. In addition, disclosed herein is another RNTI, e.g., G-SPS-RNTI, may be introduced to scramble the CRC of the group common DCI for semi-persistent scheduling.

UE Specific Based Broadcast and Groupcast Scheduling

In another approach, dedicated DCIs, e.g., different UE specific DCIs, may be transmitted to multiple UEs respectively with the DCIs indicating the same time and frequency resource which is used for the broadcast or groupcast transmission. In this case, the control/scheduling information carried in each DCI may be different.

Figure 2:
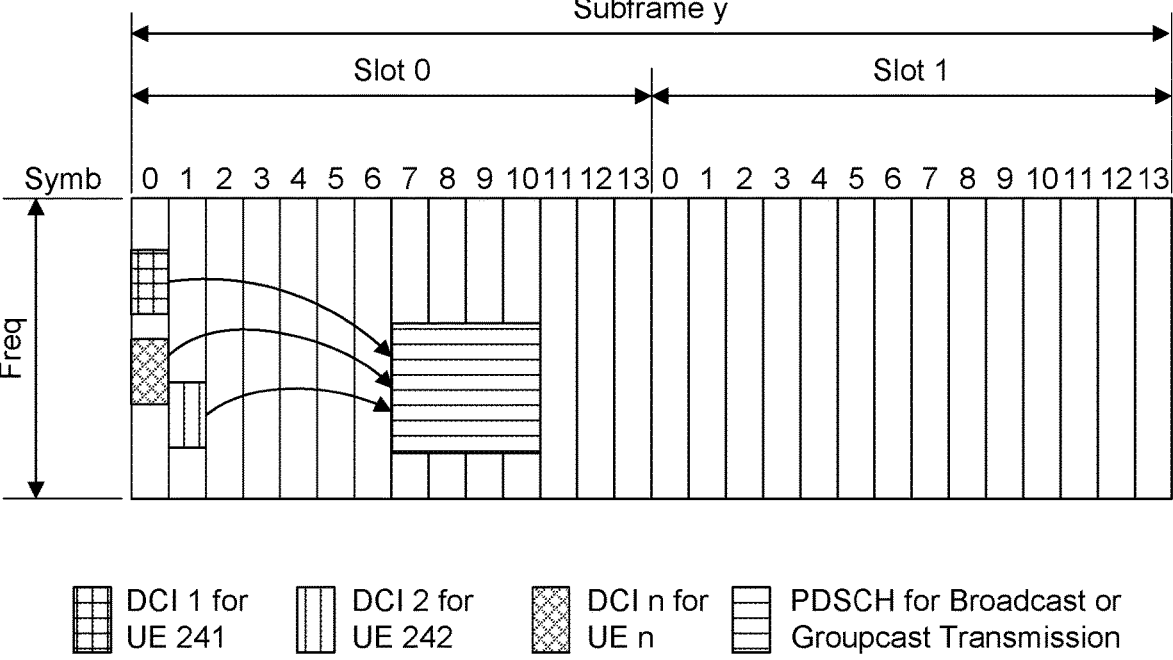
FIG. 2 illustrates an example of dedicated DCIs scheduling the broadcast or groupcast transmission.

FIG. 2 shows an example of dedicated DCIs scheduling the broadcast or groupcast transmission. In this example, different DCIs are transmitted to different UEs respectively, e.g., DCI 1 is transmitted to UE 241, DCI 2 is transmitted to UE 242, . . . . DCI n is transmitted to UE n. The DCIs indicates the same time and frequency resources for broadcast or groupcast transmission, e.g., indicate the same group-common PDSCH. However, the DCIs may indicate individual uplink resources for different UEs to send their feedback respectively, e.g., HARQ feedback, CSI feedback, etc. Different UEs may have different or same/common uplink channel resources for their uplink feedback transmission. Or the DCIs may indicate the same uplink resource for different UEs to send their feedback in the uplink.

In the example, the scheduling information is transmitted in a UE specific manner. In some scenarios, a UE 241 may support both unicast reception and broadcast/groupcast reception. The UE 241 may receive both the DCI scheduling the unicast transmission which is scrambled with C-RNTI and the DCI scheduling the broadcast/groupcast transmission.

In one case, the DCI scheduling the broadcast/groupcast transmission may be scrambled with a new RNTI, e.g., G-RNTI. Then the UE 241 may differentiate whether the received the DCI is used for scheduling the unicast transmission or for scheduling the broadcast/groupcast transmission based on the RNTI used for scrambling the DCI. When the network 243 (e.g., gNB) delivering the data to the UEs, the Physical Downlink Shared Channel (PDSCH) and the PDSCH DMRS may be scrambled with the same G-RNTI.

In another example, the DCI scheduling the broadcast/groupcast transmission may be also scrambled with C-RNTI. In this case, same DCI format may be used for scheduling both the unicast transmission and for scheduling the broadcast/groupcast transmission. Since the UEs may still receive the same PDSCH, we disclose the scrambling used for PDSCH and PDSCH DMRS may be aligned between the UEs. For example, it may be scrambled with a RNTI, e.g., G-RNTI, which is different from the C-RNTI. Such RNTI may be signaled to the UE 241 through RRC configuration or through the scheduling DCI. When a UE 241 receives the scheduling for broadcast/groupcast transmission, the UE 241 may use this RNTI to decode the corresponding PDSCH.

In some cases, a UE 241 can be configured with a higher-layer parameter PDSCH data scrambling identity for groupcast (e.g. called GroupCastdataScramblingIdentityPDSCH). The UE uses this identity for initialization of the scrambling for a PDSCH codeword if the codeword is scheduled for groupcast/broadcast, e.g. it is scheduled with an RNTI for groupcast/broadcast or the DCI content indicates that it schedules a groupcast or broadcast PDSCH transmission, etc. Furthermore, the UE 241 can be configured with a higher-layer parameter scrambling ID (e.g. GroupCastScramblingID or scramblingID2) used for the initialization of the scrambling used for the PDSCH DM- RS. Similarly, as for PDSCH data scrambling identity, the UE 241 uses the DM-RS scrambling identify if the PDSCH is scheduled for groupcast/broadcast.

To differentiate these two cases, one-bit field, e.g., cast type indicator field, may be introduced to the current DCI format, e.g., DCI format 1_1 and DCI format 1_0. Table 1 shows an example of the disclosed one-bit cast type indicator field. When a UE 241 is signaled by the DCI with the value of 'cast type indicator field' set to '0', the DCI is used for scheduling the unicast, when a UE 241 is signaled by the DCI with the value of 'cast type indicator field' set to '1', the DCI is used for scheduling the broadcast or groupcast.

TABLE 1

| Example of one-bit cast type indicator field | |
| --- | --- |
| Value of cast type indicator field | Cast type |
| 0 | Unicast |
| 1 | Broadcast or groupcast |

In the above example, it assumes that the UE 241 may not need to differentiate the DCI for broadcast transmission and the DCI for groupcast transmission. In another case, the UE 241 may also further distinguish between them. For example, this may apply to the case when a UE 241 sends HARQ feedback for groupcast and the UE 241 does not need to send HARQ feedback for broadcast.

In one example, the UE 241 may determine whether it is broadcast or groupcast based on explicit DCI signaling. For example, the cast type indicator field may be two bits. Table 2 shows an example of the disclosed two-bits cast type indicator field. When a UE 241 is signaled by the DCI with the value of 'cast type indicator field' set to be '00', the DCI is used for scheduling the unicast; when a UE 241 is signaled by the DCI with the value of 'cast type indicator field' set to be '01', the DCI is used for scheduling the broadcast; when a UE 241 is signaled by the DCI with the value of 'cast type indicator field' set to be '01', the DCI is used for scheduling the groupcast.

TABLE 2

| Example of two-bits cast type indicator field | |
| --- | --- |
| Value of cast type indicator field | Cast type |
| 00 | Unicast |
| 01 | Broadcast |
| 10 | Groupcast |
| 11 | Reserved |

In another example the UE 241 may differentiate the DCI for broadcast and the DCI for groupcast by reusing the existing field in the DCI, e.g., using the PUCCH resource indication field. The UE 241 may determine the information based on the PUCCH resource indication field and the one-bit cast type indicator field disclosed in Table 1.

Table 3 shows an example of the disclosed PUCCH resource indication field, in which there is a mapping of PUCCH resource indication field values to a PUCCH resource. Assuming the PUCCH resource indication field is 3 bits, when a UE 241 is signaled by the DCI with the value of 'cast type indicator field' set to be '1' and signaled with 'PUCCH resource indicator field' set to be '000', the UE 241 may determine the DCI is for scheduling broadcast transmission and may apply the configured broadcast scrambling IDs (e.g. data scrambling ID and scrambling ID for PDSCH DMRS) to the decode the PDSCH. Or this combination of the field settings may be used by the UE 241 for determining the DCI is for scheduling groupcast transmission with HARQ feedback disabled. When a UE 241 is signaled by the DCI with the value of 'cast type indicator field' set to be '1' and signaled with 'PUCCH resource indicator field' set to be a value other than '000', the UE 241 may determine the DCI is for scheduling groupcast transmission and may apply the configured groupcast scrambling IDs to the decode the PDSCH.

TABLE 3

| Mapping PUCCH resource indication field values to PUCCH resource | | | |
| --- | --- | --- | --- |
| PUCCH resource indicator | | | |
| 1 bit | 2 bits | 3 bits | PUCCH resource |
| '0' | '00' | '000' | Broadcast |
| '1' | '01' | '001' | $1^{st}$ PUCCH resource provided by higher layer signalling |
| | '10' | '010' | $2^{nd}$ PUCCH resource provided by higher layer signalling |
| | '11' | '011' | $3^{rd}$ PUCCH resource provided by higher layer signalling |
| | | '100' | $4^{th}$ PUCCH resource provided by higher layer signalling |
| | | '101' | $5^{th}$ PUCCH resource provided by higher layer signalling |
| | | '110' | $6^{th}$ PUCCH resource provided by higher layer signalling |
| | | '111' | $7^{th}$ PUCCH resource provided by higher layer signalling |

For the case that the DCI scheduling the broadcast/groupcast transmission is scrambled with a new RNTI, e.g., G-RNTI, a UE 241 may differentiate the DCI for broadcast and the DCI for groupcast using the subject matter disclosed in Table 3. In this case, the UE 241 may determine based on the signaling PUCCH resource indication field alone and the gNB may not need to signal the cast type indicator field in the DCI.

On the other hand, a UE 241 may differentiate the DCI for broadcast and the DCI for groupcast using the subject matter disclosed in Table 1, e.g., through a one-bit cast type indicator field. Table 4 shows an example of the disclosed one-bit cast type indicator field for differentiating the DCI for broadcast and the DCI for groupcast.

TABLE 4

| One-bit cast type indicator field for differentiating the DCI for broadcast and the DCI for groupcast | |
| --- | --- |
| Value of cast type indicator field | Cast type |
| 0 | Broadcast |
| 1 | Groupcast |

The example subject matter disclosed in Table 3 and Table 4 for differentiating the DCI for broadcast and the DCI for groupcast may be also applied to the group-based broadcast and groupcast scheduling as described herein. For example, a group common DCI may have a payload that includes a set of entries (or bits) wherein each entry or bit points to a HARQ feedback resource configuration. Each resource configuration may be specific to a UE 241 or a subgroup of UEs. The index or position of a resource configuration that applies to a UE 241 may be configured into the UE 241 through upper layer signaling such as RRC signaling. The disclosed approach may be applied to the UE in RRC connected state.

1.1.1 Sub-Group Based Broadcast and Groupcast Scheduling

Furthermore, in yet another approach, the UEs receiving the same broadcast or groupcast transmission may be partitioned into several sub-groups where different scheduling DCIs may be transmitted to different sub-groups respectively. For example, UE 241, UE 242, . . . , UE n may be partitioned into k sub-groups, e.g., sub-group 1, sub-group 2, . . . , sub-group k. DCI 1 may be transmitted to the UEs in sub-group 1, DCI 2 may be transmitted to the UEs in sub-group 2, . . . , DCI k may be transmitted to the UEs in sub-group k. The UEs may be partitioned into different sub-groups based on one or more of the following criteria: 1) UE location; 2) Channel Condition; 3) QCL assumption; or 4) UE category.

UE location: the service region may be divided into multiple zones and the UEs in the same zone may be divided into the same sub-group. For example, each zone may have a zone ID, the UEs having the same zone ID may be category into the same sub-group. Or the UE 241 may report its coordinate to the gNB (e.g., network 243), then the gNB may category the UEs into different sub-groups based on the reported coordinate.

Channel condition: the UEs receiving the broadcast or groupcast transmission may report its channel condition, e.g., CSI feedback, RSRP measurement, etc. The gNB may category the UEs into different sub-groups based on the reported channel condition.

QCL (Quasi Co Location) assumption: the gNB may categorize the UEs into different sub-groups based on the QCL assumption. For example, the gNB may categorize the UEs having the same QCL assumption, e.g., the UEs selecting the same preferred beam, into one sub-group.

UE category: the gNB may categorize the UEs into different sub-groups based on the UE category. For example, the UEs with limited capability may be partitioned into one sub-group, and the other regular UEs may be partitioned into another sub-group.

Support semi-persistent scheduling (SPS) in addition to dynamic scheduling for multicast broadcast service (MBS) is beneficial since it has low signaling overhead and is suitable for periodic traffic. A UE 241 may be configured by the gNB with multiple MBS SPS configurations per BWP per serving cell through RRC signaling, e.g., through information element MBS-SPS-config. The IE MBS-SPS-config may carry one or more of the following information.

Periodicity for the MBS SPS information. The periodicity may be configured by the gNB in unit of symbol, or in unit of slot, or in unit of ms, etc. After a UE 241 detects the activation DCI and determines the grant for the 1$^{st}$ DL SPS transmission, the UE 241 may expect the following n$^{th}$ DL SPS transmission for the same SPS configuration to be transmitted n×Periodicity symbols or slots or ms after the 1$^{st}$ SPS transmission.

Index of the MBS SPS configuration information, e.g., MBS-sps-ConfigIndex, which configures the unique identity of an MBS SPS configuration among all of the MBS SPS configurations within the BWP of the serving cell.

Aggregation factor. A UE 241 may be configured by the gNB with the number of repetitions for the SPS PDSCH transmission.

Activation or deactivation DCI type information. A UE 241 may be configured by the gNB with the DCI type, e.g., group-common DCI, or UE-specific DCI, or both types of DCI that the UE 241 needs to monitor to detect the activation and/or deactivation DCI. For one example, one RRC parameter may be used to configure the DCI type for both the activation DCI and the deactivation DCI. In another example, separate RRC parameters, e.g., activation DCI type and deactivation DCI type, may be used to configure the DCI type for the activation DCI and the deactivation DCI respectively in the MBS-SPS-config.

HARQ enabling/disabling information. A UE 241 may be configured by the gNB with the information to configure whether HARQ feedback is enabled for this MBS SPS configuration or not, e.g., for one or more of the MBS SPS PDCCH, activation DCI, deactivation DCI, etc.

HARQ feedback type for PDSCH information. A UE 241 may be configured by the gNB with the HARQ feedback, e.g., ACK/NACK based, or NACK only based, or both options, used for the MBS SPS PDSCH for this MBS SPS configuration.

HARQ feedback type for PDCCH information. A UE 241 may be configured by the gNB with the HARQ feedback, e.g., with shared PUCCH resources for the UEs within the group, or with dedicated PUCCH resources for each UE 241, or both options, used for the activation DCI and/or for the deactivation DCI for this MBS SPS configuration.

HARQ feedback resource pool information. A UE 241 may be configured by the gNB with a set of PUCCH resources which may be used by the UE to send the HARQ feedback, e.g., PUCCH resources used for sending HARQ feedback for one or more of the MBS SPS PDCCH, activation DCI, deactivation DCI, etc.

Retransmission type information. A UE 241 may be configured by the gNB with the information to configure how the retransmission is scheduled, e.g., dynamically scheduled, semi-persistently scheduled or both are supported, etc.

Retransmission scheduling type information. A UE 241 may be configured by the gNB with the information to configure how the retransmission is dynamically scheduled, e.g., dynamically scheduled by group-common DCI or dynamically scheduled by the UE specific DCI, or the retransmission is carried by the group-common PDSCH or carried by the UE specific PDSCH, etc.

When multiple schemes are configured to be supported by the MBS-SPS-config IE in one information e.g., both ACK/NACK based HARQ and NACK only based HARQ are supported, in one example, a UE 241 may be dynamically indicated by the DCI or be semi-statically indicated by the MAC-CE which scheme is to be used. In another example, the UE 241 may determine the scheme to be used by its own based on certain criteria, e.g., based on the reliability requirement of the MBS service, based on the latency requirement of the MBS service, etc.

1.1.2 Activation/Deactivation DCI for MBS SPS

To support SPS for MBS, the proposed scheduling mechanisms, e.g., group based scheduling, UE specific based scheduling, sub-group based scheduling, etc., where the exemplary figures are shown in FIG. 1, FIG. 2, etc., may be used to transmit the DCI that activates or deactivates the one or more of the configured SPS configurations. For example, when a UE want to join an ongoing MBS SPS transmission, the gNB may send UE specific DCI to activate it for the UE2 41.

When group based scheduling is used, group-common PDCCH may be used to transmit the activation DCI and the deactivation DCI, where the cyclic redundancy check (CRC) of the group common DCI is scrambled by a group RNTI, e.g., G-SPS-RNTI, as provided in the abovementioned disclosure.

The group common DCI for MBS SPS activation/deactivation and the group common DCI for MBS dynamical scheduling may share the same DCI format, e.g., DCI format 1_3. The UE may distinguish the two cases through the RNTI, e.g., G-RNTI and G-SPS-RNTI, used to scramble it. For example, when a group common DCI is scrambled by the G-SPS-RNTI, the UE 241 may determine it is used for MBS SPS activation or deactivation; when a group common DCI is scrambled by the G-RNTI, the UE 241 may determine it is used for MBS dynamic scheduling.

When UE specific based scheduling is used, the activation DCI and the deactivation DCI may be transmitted by the UE specific DCI. In current NR, unicast SPS is activated and deactivated by the UE specific DCI using DCI format 1, e.g., using DCI format 1_0, DCI format 1_1, and DCI format 1_2, where the DCI is scrambled by the CS-RNTI.

In a first example, a new DCI format, e.g., DCI format 1_4, may be introduced. When a UE 241 is configured with the MBS-SPS-config IE, the UE may monitor the new DCI format to detect the MBS SPS activation DCI and deactivation DCI, where the DCI may be scrambled by the same RNTI, e.g., CS-RNTI, used for unicast SPS; or a new RNTI may introduced to scramble the DCI, e.g., G-SPS-RNTI.

In a second example, the existing DCI formats may be reused with a new RNTI may be introduced to scramble the DCI. For example, the UE 241 may monitor the DCI format 1_0), DCI format 1_1, and DCI format 1_2 with CRC scrambled with G-SPS-RNTI to detect the MBS SPS activation DCI and deactivation DCI.

In a third example, the same DCI formats and same RNTI may be also used for the DCI activating or deactivating the MBS SPS transmission. For example, the UE 241 may also monitor the DCI format 1_0, DCI format 1_1, and DCI format 1_2 with CRC scrambled with CS-RNTI to detect the MBS SPS activation DCI and deactivation DCI. As the RNTI and the DCI formats are shared by the unicast SPS and the MBS SPS, the UE 241 need to further distinguish whether MBS SPS or unicast SPS is activated/deactivated by the received DCI.

To differentiate these two cases, a one-bit field, e.g., cast type indicator field, may be carried by the activation DCI and deactivation DCI as disclosed in Table 1. When a UE 241 detects an activation DCI or deactivation DCI with the value of 'cast type indicator field' set to '0', the DCI is used to activate or deactivate the unicast SPS, when a UE 241 detects an activation DCI or deactivation DCI with the value of 'cast type indicator field' set to '1', the DCI is used to activate or deactivate the MBS SPS. To further differentiate the SPS for broadcast service and the SPS for multicast service, two bits may be used for the cast type indicator field as disclosed in Table 2.

Or, the SPS configuration indexes may be split between the unicast SPS transmissions and the MBS SPS transmissions. For example, assume a UE 241 may be configured with up to 2N SPS configurations. The SPS configuration indexes 1 . . . . N may be allocated for the unicast SPS and the SPS configuration indexes N+1 . . . 2N may be allocated for the MBS SPS. When a UE 241 determines the SPS configuration index n of the activated or deactivated SPS, the UE 241 may determine whether it is a unicast SPS or an MBS SPS based on the value of n.

For NR MBS, only one type of PDCCH may be supported, e.g., the group-common PDCCH, or the UE-specific PDCCH, to transmit the activation and the deactivation DCI for MBS SPS. Then the UE 241 only monitors the supported PDCCH to detect it. Or, both the group-common PDCCH and the UE specific PDCCH may be supported. When both are supported, in a first example, the MBS-SPS-config IE may configure the PDCCH a UE 241 need to monitor, e.g., through Activation and or deactivation DCI type. Then, the UE 241 may only need to monitor the configured type of PDCCH to detect the activation DCI and deactivation DCI.

In a second example, the UE 241 may monitor both the group-common PDCCH and the UE specific PDCCH. The UE 241 may monitor both types of PDCCH for detecting the activation DCI and deactivation DCI. Or, the UE 241 may only monitor one type of PDCCH, e.g., group-common PDCCH or UE specific PDCCH for the activation DCI and monitor both types of PDCCH for the deactivation DCI. Or, the UE 241 may monitor both types of PDCCH for the activation DCI and only monitor one type of PDCCH, e.g., group-common PDCCH or UE specific PDCCH for the deactivation DCI.

As the same RNTI and DCI format are used for the activation and deactivation, the UE 241 must distinguish between these two cases. An example is shown in Table 5, when a new DCI format is introduced for MBS SPS. An activation/deactivation flag field with one bit may be introduced in the activation/deactivation DCI to indicate whether the DCI is used for activation or deactivation, e.g., '1' indicating the DCI is used for activation and '0' indicating the DCI is used for deactivation.

TABLE 5

| Example of one-bit cast Activation/deactivation flag field | |
|---|---|
| Value of cast Activation/ deactivation flag field | Activation/deactivation |
| 0 | Deactivation |
| 1 | Activation |

In another example, as the same DCI format is shared by the MBS dynamic scheduling and MBS SPS, it may reuse some fields used for dynamic scheduling to indicate such information for MBS SPS. For example, the UE 241 may determine the DCI is used for activation when all the bits in the redundancy version field are set to '0'. The UE 241 may determine the DCI is used for deactivation when all the bits in the redundancy version field are set to '0', and all the bits in the modulation and coding scheme field are set to '1', and all the bits in the frequency domain resource assignment field are set to '0' or set to '1'.

Within a frequency range, e.g., within an MBS BWP or a common frequency region, a UE 241 may be configured with multiple MBS SPS configurations. An indication may need to be provided to indicate which MBS SPS configuration a DCI is activating or deactivating. In a first example shown in Table 6, SPS configuration index field may be introduced in the activation/deactivation DCI. Assume that 8 MBS SPS configurations may be configured by the gNB, the SPS configuration index field may have 3 bits where each codepoint is associated with one MBS SPS configuration.

TABLE 6

| Example of a 3-bit SPS configuration index field | |
|---|---|
| Value of SPS configuration index field | SPS configuration |
| 000 | SPS configuration with index = 1 |
| 001 | SPS configuration with index = 2 |
| . . . | . . . |
| 111 | SPS configuration with index = 8 |

In a second example, some fields may be reused. For example, a value of the HARQ process number field in a DCI format may indicate an activation or deactivation for an MBS SPS configuration with a same value provided by the MBS-sps-ConfigIndex.

In one DCI, it may only activate or deactivate one MBS SPS configuration. Or, as another alternative, joint activation or deactivation may be supported for NR MBS SPS, e.g., one DCI may activate or deactivate multiple MBS SPS configurations. In a first example, the DCI may explicitly carry the SPS configuration indexes to be activated or deactivated, e.g., if gNB wants to deactivate MBS SPS configuration 1, 3, and 7, the bit string '000010110' may be carried in the last portion of the DCI after all the other DCI fields.

Or, in a second example, a bitmap may be indicated in the DCI with the length equal to the total number or maximum number of the SPS configuration configured for a frequency range. For example, assume a gNB can configured up to 8 MBS SPS configurations, the bitmap has 8 bits where each bit is associated with one SPS configuration. When a bit of the bitmap in the DCI is set to '1', the UE 241 may determine the corresponding SPS configuration is to be activated or deactivated; when a bit is set to '0', the UE 241 ignores this bit.

Or, in a third example, a list of combinations of the MBS SPS configuration indexes may be pre-configured by the gNB, where each combination may include one index or multiple indexes. The activation DCI and the deactivation DCI may include a field to indicate one of the configured combinations. When a UE 241 receives the DCI, all the MBS SPS configurations in the indicated combination may be activated or deactivated simultaneously.

1.1.3 HARQ Feedback for MBS SPS PDSCH

To enhance the reliability of the MBS SPS PDSCH transmission, physical layer HARQ feedback may be supported. In NR MBS, the PDSCH is delivered to a group of UEs. To transmit the HARQ feedback, in one case, ACK/NACK based scheme may be supported. E.g., gNB may allocate dedicated PUCCH resource to each UE 241 in the group for transmitting ACK feedback or NACK feedback.

In another case, NACK only based scheme may be supported, gNB may allocate shared PUCCH resource to the UEs in the group. One PUCCH resource may be allocated which is shared by all the UEs in the group. Or the UEs may be divided into several sub-groups and one PUCCH resource is allocated to a sub-group where all the UEs in the sub-group share the same PUCCH resource.

In NACK only based scheme, for the UEs sharing the same PUCCH resource, the UE 241 will feedback NACK on the PUCCH when it fails to receive an MBS SPS PDSCH. When the UE 241 successfully receives the MBS SPS PDSCH, the UE 241 doesn't provide any feedback on the allocated PUCCH resource.

In NR MBS, in a first example, only one HARQ feedback scheme may be supported for SPS PDSCH, e.g., only support ACK/NACK based scheme, or only support NACK only based scheme. The UE 241 uses the supported scheme to send HARQ feedback for an MBS SPS PDSCH transmission.

In a second example, both ACK/NACK based scheme and NACK only based scheme may be supported. A UE 241 may be statically configured with which scheme to be used, e.g., per cell or per MBS SPS configuration. For example, in the MBS-SPS-config IE, a UE 241 may be configured with such information through RRC parameter HARQ feedback type for PDSCH. A UE may be configured with ACK/NACK based scheme is supported for this MBS SPS configuration, or may be configured with NACK only based scheme is supported. Note the 'static' in this context herein means that it can be reconfigured frequently with RRC signaling.

A UE 241 may be also configured to support both two schemes for the MBS SPS configuration. The UE 241 may be dynamically indicated with which HARQ feedback to be used for each activation. For example, in the activation DCI, a one-bit field, e.g., HARQ feedback type field, may be introduced. When the field is set to '0', ACK/NACK based scheme is used; when the field is set to '1', NACK only based scheme is used.

Updating mechanism 1: When a UE 241 is indicated with one scheme, the UE 241 may use the indicated scheme for all the MBS SPS PDSCH transmissions until it is deactivated. In other words, if the gNB wants to switch to the other feedback scheme, it needs to deactivate the SPS PDSCH first and then send another activation DCI with the HARQ feedback type field set to the different value.

Updating mechanism 2: Or the HARQ feedback scheme may be updated during an activation. For example, after the UE 241 receives an activation DCI to activate an MBS SPS PDSCH transmission, the UE 241 may further receive an indication e.g., a DCI, or a reference signal, etc., to update the information of the activated SPS PDSCH. In this case, the gNB doesn't need to deactivate the SPS PDSCH first to update the indicated setting. Therefore, it may achieve faster updating.

In the above discussion, it may be assumed that the HARQ feedback will always be supported for NR MBS SPS. In another case, as the NR MBS may have different QoS requirements for different services, HARQ feedback may be enabled or disabled, e.g., for MBS SPS PDSCH, or for MBS SPS PDCCH, or for both. The HARQ enabling/disabling may be statically configured for a cell or for an MBS SPS configuration, e.g., through RRC parameter HARQ enabling disabling in the MBS-SPS-config IE.

Or the HARQ enabling/disabling may be both statically configured and dynamically indicated. For example, the RRC may configure whether the HARQ enabling/disabling function is supported for a cell or for a SPS configuration. If a UE 241 is configured with not supporting the enabling/disabling function, the UE 241 may assume HARQ feedback is always enabled, or always disabled, e.g., based on pre-defined rules, or based on the QoS requirements of the MBS, etc. If a UE 241 is configured to support the HARQ enabling/disabling function, it may be indicated to the UE by the activation DCI to determine whether HARQ feedback is enabled or disabled. To further dynamically update this setting, the disclosed two updating mechanisms may be applied.

In NR MBS, the PUCCH resource for sending the HARQ feedback for SPS PDSCH may be statically allocated by the RRC. Or the PUCCH may be dynamically allocated by the activation DCI. For NACK only based scheme, the gNB may allocate one shared the PUCCH resource. For example, the RRC parameter HARQ feedback resource pool in the MBS-SPS-config IE may configure a set of candidate PUCCH resources and the activation DCI may indicate one PUCCH resource from the candidate set. The activation DCI may also indicate the offset between the SPS PDSCH and the corresponding PUCCH, e.g., the slot offset between the slot carrying the SPS PDSCH and the slot carrying the PUCCH resource.

For ACK/NACK based scheme, dedicated PUCCH needs to be allocated to each UE. When UE specific PDCCH is used to activate the SPS PDSCH, each UE may be indicated with dedicated PUCCH resource through the received activation DCI. When group common PDCCH is used, the PUCCH resource may be allocated through one of the following methods.

In a first example, assume the gNB needs to allocate the PUCCH resources to n UEs, one PUCCH resource region may be allocated through the RRC and DCI signaling. The PUCCH resource region contains the n PUCCH resources allocated to the n UEs. Once receiving the PUCCH resource region, the UE may evenly divide it into n portions, e.g., in frequency domain; or in time domain; or in both time domain and frequency domain. The UE 241 may divide the region in frequency first and time second order or divide it in time first and frequency second order. The $1^{st}$ portion is used by the $1^{st}$ UE, the $2^{nd}$ portion is used by the $2^{nd}$ UE, etc. The total number of UEs within the group may be signaled to the UE 241 through RRC or MAC-CE or DCI.

The order of the UE 241 within the group may be explicitly signaled to the UE 241 by the gNB through RRC or MAC-CE or DCI. Or it may be implicitly determined by the UE 241. For example, the UE may determine it based on its physical layer ID, e.g., C-RNTI, or an ID within the group configured for the MBS SPS group. Or the UE 241 may determine the order based on higher layer signaling, e.g., through higher layer ID, ranking, QoS/KPI, or some other criteria.

In a second example, the activation may indicate the allocated PUCCH resource for a reference UE, e.g., the $1^{st}$ UE 241. The other UEs may determine the PUCCH resources for them correspondingly. For example, the PUCCH resources allocated for other UEs may have the same size, e.g., in time and frequency, as the indicated one and are contiguous with each other. Assume the PUCCH resource for $1^{st}$ UE 241 spans from PRB n to PRB n+i and from symbol m to symbol m+j which is indicate by the gNB, the PUCCH resource for $2^{nd}$ UE 242 spans from PRB n+i+1 to PRB n+2i and from symbol m to symbol m+j, and etc. The UE may be signaled with the maximum number k of PUCCHs can be mapped in the frequency domain e.g., through RRC or MAC-CE or DCI. Then PUCCH resource switch to the next symbols starting from the $(k \cdot 1)^{th}$ UE, e.g., for $(k \cdot 1)^{th}$ UE, the PUCCH resource spans from PRB n+1 to PRB n+i and from symbol m+j+1 to symbol m+2j, etc.

In a third example, the gNB may configure orthogonal PUCCH resources or PUCCH resource sets for different UEs in a group through the UE specific RRC configuration. When receiving the same activation DCI, each UE 241 may automatically use orthogonal PUCCH resources for sending the HARQ feedback.

In the above example, the PUCCH resources are mapped in frequency first and time second order. It may be also mapped in time first and frequency second order. In this scenario, the UE 241 may be signaled with the maximum number of PUCCHs can be mapped in the time domain. In the above example, the PUCCH resources are mapped contiguously with each other. In another example, the PUCCH resources may be mapped non-contiguously, e.g., non-contiguous in time, or non-contiguous in frequency, or non-contiguous in both time and frequency. In this case, the UE may be signaled with the time gap and/or the frequency gap, e.g., through RRC or MAC-CE or DCI. The time gap may be signal in unit of symbol, or in unit of slot, or in unit of symbol group, e.g., 2 symbols or 4 symbols. The frequency gap may be signal in unit of RE, or in unit of RE groups, e.g., 2 REs or 6 REs, or in unit of PRB, or in unit of PRB groups, etc.

1.1.4 Retransmission for MBS SPS PDSCH

Once an MBS SPS PDSCH is NACK-ed by the UE 241, retransmission needs to be performed. In a first example, the retransmission may be dynamically scheduled. E.g., after a UE 241 sends NACK for an MBS SPS PDSCH transmission, the UE 241 may monitor the PDCCH to detect the DCI scheduling the retransmission. In a second example, the retransmission may be semi-persistently pre-configured. E.g., the resources used for potential PDSCH retransmission may be pre-allocated by the gNB. The retransmission may be directly transmitted on the allocated resources if the UE 241 feedbacks NACK. The rescheduling DCI is not needed and transmitted, and the UE 241 doesn't need to monitor and detect it. Within a group, due to different channel conditions for each UE 241, some UEs may feedback ACK and some UEs may feedback NACK for the same PDSCH transmission. A UE 241 monitors the retransmission only when it sends NACK. When a UE sends ACK, it may skip the retransmission to save power.

Only one rescheduling scheme may be supported for NR MBS SPS. Or both schemes may be supported. A UE 241 may be statically configured with which scheme to be used, e.g., per cell or per MBS SPS configuration. For example, in the MBS-SPS-config IE, a UE 241 may be configured with such information through RRC parameter Retransmission type. A UE 241 may be configured with dynamic rescheduling scheme is supported for this MBS SPS configuration, or may be configured with semi-persistent rescheduling scheme is supported, or both schemes are supported.

When both schemes are supported, the UE 241 may be dynamically indicated with which scheme to use by the activation DCI, e.g., through 1-bit field Retransmission type field. To further dynamically update this setting, the disclosed two updating mechanisms may be applied.

For semi-persistent rescheduling, the resources for retransmission may be pre-allocated when the SPS PDSCH transmission is activated. In time domain, the retransmission may always occupy the same symbols as the initial transmission. For example, assume the initial transmission for the $1^{st}$ SPS PDSCH transmission is allocated from symbol $l_1$ to $l_2$ in slot k by the activation DCI, the retransmission will be occurred in slot k+n from symbol $l_1$ to $l_2$, where n is the slot offset between the initial transmission and retransmission. The value of n may be configured by the RRC signaling, e.g., through the MBS-SPS-config IE, or it may be indicated by the activation DCI.

Or the retransmission may have different symbol locations. The UE 241 may be signaled, e.g., through RRC, or MAC-CE, or DCI with the slot offset, symbol offset between the initial transmission and retransmission. The time duration, e.g., number of symbols, of the retransmission may be same as the initial one. Or the time duration may be also different. The UE 241 may be signaled with the symbol length of the retransmission PDSCH.

Instead of signaling the relative value, e.g., offset, the gNB may directly signal the start symbol and the duration of the retransmission PDSCH, e.g., through the start and length indicator value (SLIV) field in the activation DCI. The value indicated in the SLIV field for the initial PDSCH transmission may be also applied for the retransmission PDSCH. Or a new SLIV field may be introduced for retransmission PDSCH which is different from the SLIV field used for the initial PDSCH. Combined with the indicated slot offset, the UE 241 may determine the time location of the retransmission.

In the frequency domain, similar ideas may be applied. The retransmission may have the same frequency resource allocation with the initial transmission; or may be located at different frequency resources. The frequency resource for retransmission may be allocated using relative values, e.g., PRB offset; or may be allocated using starting PRB and the length of PRB, etc.

For dynamic rescheduling, gNB dynamically transmits a DCI to schedule the retransmission. The rescheduling DCI may be transmitted on the group-common PDCCH; or it may be transmitted on the UE specific PDCCH.

Only one type of PDCCH to send the rescheduling DCI may be supported for NR MBS SPS. Or both types of PDCCH may be supported. A UE 241 may be statically configured with which PDCCH type to be used, e.g., per cell or per MBS SPS configuration. For example, in the MBS-SPS-config IE, a UE 241 may be configured with such information through RRC parameter Retransmission scheduling type. A UE may be configured with group common PDCCH is used for scheduling the retransmission for this MBS SPS configuration, or may be configured with UE specific PDCCH is used, or both types of PDCCH are supported.

When both types of PDCCH are supported, the UE 241 may be dynamically indicated with which PDCCH to be used by the activation DCI, e.g., through 1-bit field Retransmission scheduling type field. To further dynamically update this setting, the disclosed two updating mechanisms may be applied.

For the retransmission PDSCH, two types of PDSCH may be also supported. In one case, the group common PDSCH may be used. The group common PDSCH may be scrambled with the group RNTI, e.g., G-SPS-RNTI, to allow all the UEs within the group can decode it. In another case, the UE specific PDSCH may be used. The UE specific PDSCH may be scrambled with the UE specific RNTI, e.g., C-RNTI or CS-RNTI, and only the UE 241 configured with the UE specific RNTI can decode it.

Only one type of PDSCH may be supported for NR MBS SPS retransmission. Or both types of PDCCH may be supported. A UE 241 may be statically configured with which type to be used, e.g., per cell or per MBS SPS configuration. For example, a UE 241 may be configured with group common PDSCH is used; or may be configured with UE specific PDSCH is used; or both types of PDSCH are supported.

When both types of PDSCH are supported, the UE 241 may be dynamically indicated with which PDSCH to be used by the activation DCI, e.g., through 1-bit field Retransmission PDSCH type field. To further dynamically update this setting, the disclosed two updating mechanisms may be applied. The ideas disclosed herein for retransmission PDSCH may be applied to both semi-persistent rescheduling and dynamic rescheduling.

For dynamic rescheduling, the type of retransmission PDSCH and the types of rescheduling DCI may be jointly signaled e.g., use PTP transmission scheme, PTM transmission scheme 1, and PTM transmission scheme 2 for statically configuring or dynamically indicating.

1.1.5 Reliability Enhancement for the Activation/Deactivation DCI

In NR MBS, it is also important to improve the reliability for the activation DCI and deactivation DCI. For the activation DCI, in a first example, the gNB may determine whether a UE 241 has received the activation or not based on the HARQ feedback for the 1$^{st}$ SPS PDSCH transmission, e.g., if a UE provides HARQ feedback, it means that the UE 241 has successfully received the activation DCI; if a UE 241 doesn't provide any HARQ feedback, it means that the UE 241 failed to receive the activation DCI. This mechanism will work when ACK/NACK based scheme is used for MBS SPS PDSCH.

However, when NACK only based scheme is used for SPS PDSCH, a UE 241 will not provide any feedback if it fails to decode the activation DCI. As the gNB doesn't receive any feedback, the gNB will assume the PDSCH transmission is succeeded and will not be able to know the activation DCI is missed by the UE 241. To solve this issue, in a second example, ACK/NACK scheme may be used for the 1$^{st}$ SPS PDSCH transmission while NACK only based scheme is used for the rest PDSCH transmissions. The PUCCH resources for ACK/NACK scheme and for NACK only scheme may be separately allocated, e.g., each one is allocated using one of the PUCCH allocation mechanisms disclosed herein. Or, they may be jointly allocated. For example, the PUCCH resources for ACK/NACK scheme may be explicitly allocated by the gNB. The PUCCH resources for NACK only scheme may be further derived from the allocated resources. E.g., the PUCCH resource allocated to the 1$^{st}$ UE 241 to feedback ACK/NACK for the 1$^{st}$ SPS PDSCH transmission may be shared by all the UE to feedback NACK for the rest PDSCH transmissions.

In a third example, HARQ feedback may be introduced for the MBS SPS activation DCI. For example, PUCCH resource may be allocated after the activation DCI transmission for the UEs to send HARQ feedback for it. If a UE 241 successfully receives the activation DCI, the UE 241 may feedback ACK on the allocated resource, if the UE 241 fails to receive the activation DCI, the UE 241 doesn't provide any HARQ feedback, or it may send NACK to the gNB. Dedicate PUCCH resources may be allocated to each UE 241 to send the HARQ feedback for the activation DCI. By doing this, the gNB can know which UE 241 missed the DCI and re-send the activation DCI, e.g., through group common PDCCH or UE specific PDCCH. Or one PUCCH resource may be allocated which is shared by all the UEs. The PUCCH resource allocation mechanisms disclosed herein for allocating the PUCCH for PDSCH may be also applied for allocating the PUCCH for activation DCI. The ideas disclosed herein for activation DCI may be also applied for the deactivation DCI.

In a fourth example, PDCCH repetition may be introduce for the activation DCI or the deactivation DCI.

For the deactivation DCI, another alternative may be that, after sending the deactivation DCI, the gNB may continue to monitor the PUCCH resources previously allocated for the SPS PDSCH. If a UE 241 missed the deactivation DCI, it may continue monitor the following PDSCH. As the gNB stops to transmit the PDSCH, the UE 241 will send NACK on the allocated PUCCH resource. Then the gNB may determine the UE 241 missed the deactivation DCI and it may transmit it again, e.g., through group common PDCCH or UE specific PDCCH.

1.1.6 Serving Cell for Broadcast and Groupcast

In NR, a UE 241 may be configured with multiple serving cells. In addition to the unicast service, when a gNB (e.g., network 243) also provides broadcast/groupcast service, the gNB may configure the serving cell with the following approaches.

1.1.7 Dedicated Cell for Broadcast and Groupcast

The gNB may configure dedicated serving cell for broadcast/groupcast purpose only for a UE 241. When a cell is configured to be providing broadcast/groupcast service only, the UE 241 is not expected to be scheduled with unicast transmission in this cell. Otherwise, the serving cell only provide unicast service and does not provide broadcast/ groupcast service. The UE 241 may be configured by the gNB with such information, e.g., which cell is used for broadcast/groupcast service only, through RRC signaling. This information may be configured in broadcast manner, e.g., through SIB. The SIB may be transmitted in another cell, e.g., transmitted in the SpCell, or the SIB may be transmitted in the cell used by the UE for receiving groupcast and broadcast service. Or, this information may be configured in unicast manner, e.g., through UE specific RRC signaling.

FIG. 3 illustrates an example of RRC information configuring a cell is dedicated for broadcast/groupcast service or for unicast service. When a UE 241 is configured with RRC parameter 'casttype-r17' set to be 'Unicast', the serving cell only provides unicast service, when a UE 241 is configured with RRC parameter 'casttype-r17' set to be 'Groupcast', the serving cell only provides broadcast and groupcast service. In the example shown here, the cell supports both broadcast and groupcast. In another example, a cell may only support broadcast or the cell may only support groupcast. In this case the RRC parameter 'casttype-r17' may have three candidate values, e.g., 'Unicast', 'Groupcast' and 'Broadcast'. The subject matter disclosed here may also be applied to the BWP, CORESET, search space for configuring the corresponding information for broadcast only or for groupcast only.

FIG. 4 illustrates an example of RRC information configuring a cell is dedicated for broadcast/groupcast service or not. When a UE 241 is configured with RRC parameter 'cellforgroupcastservice-r17' set to be 'true', the serving cell only provides broadcast and groupcast service, when a UE 241 is not configured with RRC parameter 'cellforgroupcastservice-r17', the serving cell only provides unicast service and does not provide broadcast and groupcast service.

This approach disclosed here may be applied to the case that a UE 241 only operates with broadcast and groupcast transmission while not operating with unicast transmission. This approach may be also applied to the case that a UE 241 operates with both broadcast and groupcast transmission, and operates with unicast transmission in different frequency. For example, a UE 241 may operate with unicast transmission in one cell, e.g., operate in the Pcell, and the UE 241 may receive both broadcast and groupcast transmission in another cell, e.g., operate in one of the Scell. If the Scell is also configured as PUCCH-SCell, the UE 241 may send the feedback for groupcast or broadcast on this Scell. Otherwise, the UE 241 may send the feedback for groupcast or broadcast on the configured SpCell.

Since the broadcast and groupcast services are provided on a dedicated cell, the UE 241 may use the configured BWP, CORESET, search space information to blindly detect the DCI scheduling the broadcast and groupcast transmission without ambiguity.

Figure 5:
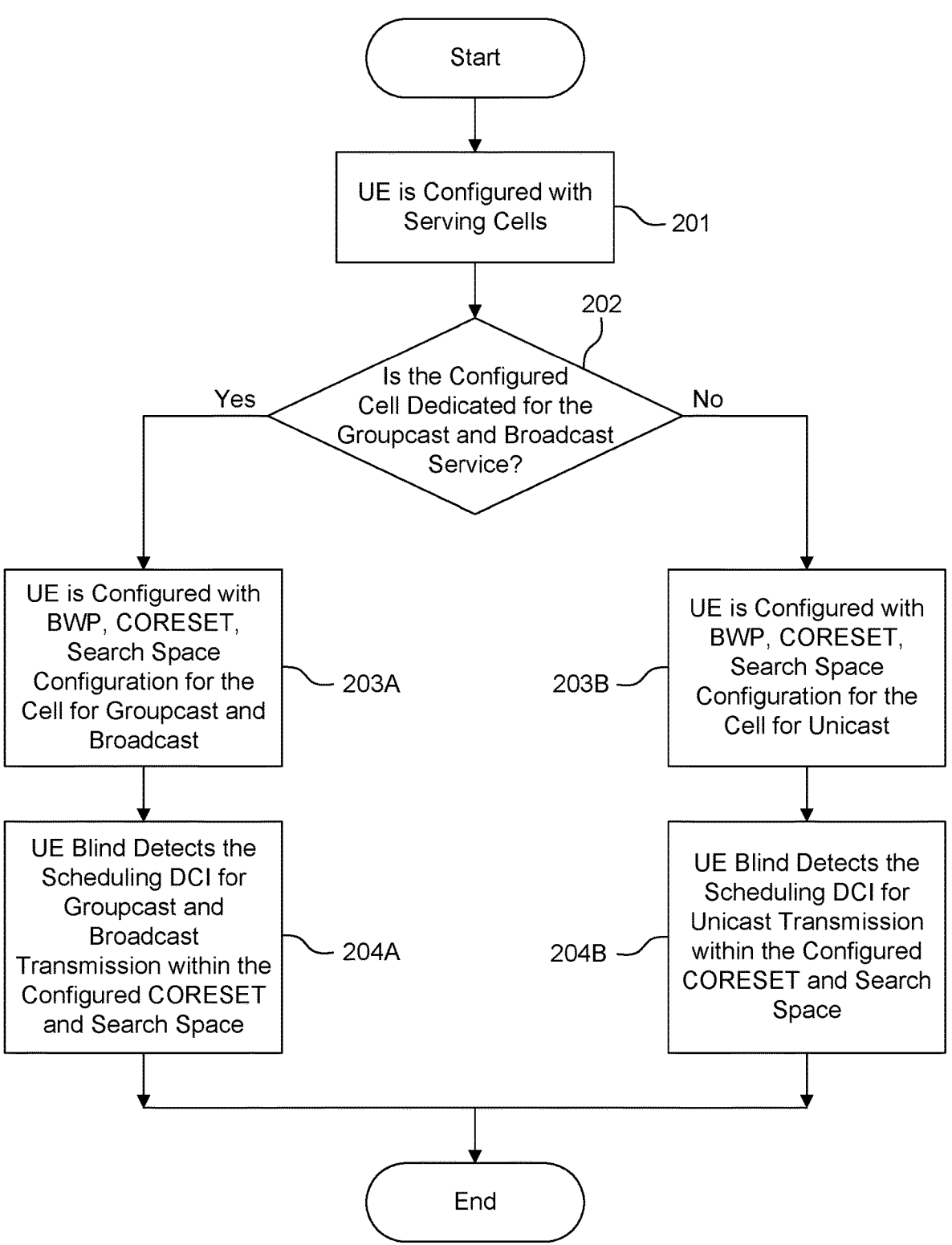
FIG. 5 illustrates an example flowchart of blindly detecting DCI when dedicated cell is used for broadcast and groupcast service.

The flowchart in FIG. 5 illustrates exemplary steps of a UE 241 performing blind detection of the scheduling DCI for broadcast and groupcast transmission. In step 201 of FIG. 5, a UE 241 may be configured with multiple serving cells. In step 202 of FIG. 5, the UE 241 may check which cell(s) is dedicated for broadcast and groupcast service, e.g., by checking the RRC parameter cellforgroupcastservice-r17 or casttype-r17 in the ServingCellConfig information element. In step 203A of FIG. 5, for the cell(s) configured to be dedicated for broadcast and groupcast service, the UE 241 may be configured with the BWP, CORESET, search space configuration, e.g., by reusing the existing BWP, CORESET, search space configuration. In step 204A of FIG. 5, the UE 241 may try to blindly detect the scheduling DCI for groupcast and broadcast transmission within the configured CORESET and search space. In step 203B, when in step 202, the configured cell is not dedicated for the groupcast and broadcast service, then UE 241 is configured with BWP, CORESET, search space configuration for the cell for unicast. In step 204B, UE 241 blind detects the scheduling DCI for unicast transmission within the configured CORESET and search space.

1.1.8 Serving Cell Supporting Both Unicast and Broadcast/Groupcast

On one hand, assigning dedicated cell for broadcast and groupcast service can simplify the signaling therefore reduce the signaling overhead. On the other hand, since the cell is dedicated for broadcast and groupcast, it may introduce undesired restriction to the system and may limit the spectrum efficiency.

Therefore, disclosed herein is a cell that may be configured by the gNB to support both unicast service and broadcast/groupcast service. At the same time, the gNB may also configure serving cells that only support the unicast service. The UE 241 may be configured by the gNB with such information through RRC signaling. This information may be configured in broadcast manner, e.g., through SIB. Or, this information may be configured in unicast manner, e.g., through UE specific RRC signaling.

FIG. 6 shows an example of RRC information configuring a cell supports both unicast service and broadcast/groupcast service. When a UE 241 is configured with RRC parameter 'cellsupportgroupcastservice-r17' set to be 'true', the serving cell supports both unicast service and broadcast/groupcast service, when a UE 241 is not configured with RRC parameter 'cellsupportgroupcastservice-r17', the serving cell provides unicast service and does not provide broadcast and groupcast service.

This approach disclosed here may be applied to the case that a UE 241 operates with both broadcast and groupcast, and operates with unicast in intra-frequency manner within a same cell. This approach may be also applied to the case that a UE 241 operates with both broadcast and groupcast transmission, and operates with unicast transmission in different frequency within a cell.

When a serving cell supports both unicast service and broadcast/groupcast service, a UE 241 works in this cell should be able to blindly detect both the scheduling DCI for unicast transmission, and the scheduling DCI for broadcast and groupcast transmission. To achieve this, the UE 241 knows the BWP, CORESET, and search space information for both DCIs.

In one example, the DCI for unicast and the DCI for broadcast and groupcast transmission may share the same BWP configuration, CORESET configuration and search space configuration. A UE 241 may try to blindly detect both the DCI for unicast and the DCI for broadcast and groupcast within one configured CORESET and in one search occasion.

Figure 7:
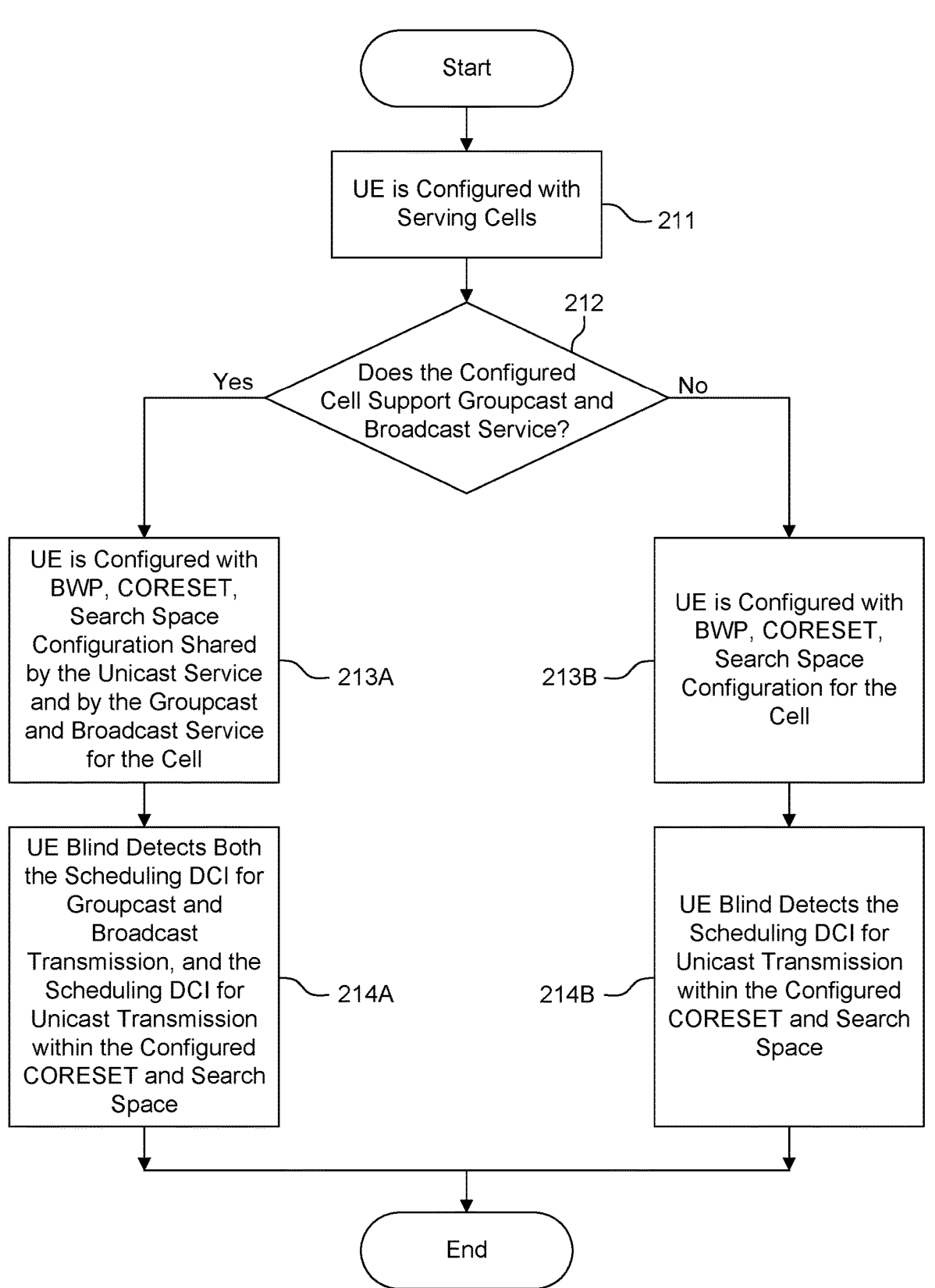
FIG. 7 illustrates an example flowchart of blindly detecting DCI when the cell supports both broadcast and groupcast service and unicast service with shared configuration for DCI monitoring.

The flowchart in FIG. 7 illustrates exemplary steps of a UE performing blind detection of the scheduling DCI for broadcast and groupcast transmission when shared configuration is used. In step 211 of FIG. 7, a UE 241 may be configured with multiple serving cells. In step 212 of FIG. 7, the UE 241 may check which cell(s) supports both broadcast and groupcast service and unicast service, e.g., by checking the RRC parameter cellsupportgroupcastservice-r17 in the ServingCellConfig information element. In step 213A of FIG. 7, for the cell(s) supports both services, the UE 241 may be configured with the BWP, CORESET, search space configuration shared by both services. In step 214A of FIG. 7, the UE 241 may try to blindly detect both the scheduling DCI for groupcast and broadcast transmission, and the scheduling DCI for unicast transmission within the configured CORESET and search space. In step 213B, when in step 212, the configured cell is not dedicated for the groupcast and broadcast service, then UE 241 is configured with BWP, CORESET, search space configuration for the cell. In step 214B, UE 241 blind detects the scheduling DCI for unicast transmission within the configured CORESET and search space.

Note, in the example shown in FIG. 7, the DCI for groupcast and broadcast and the DCI for unicast share the same BWP configuration, the same CORESET configuration and the same search space configuration. In another example, the DCI for groupcast and broadcast and the DCI for unicast may share one or more of the BWP configuration, the CORESET configuration and the search space configuration. For example, they may share the same BWP configuration but have different CORESET configurations and different the search space configurations, etc.

The advantage of sharing these configurations between the unicast and broadcast/groupcast is that it may reduce the signaling overhead. However, on the other hand, it may limit the scheduling flexibility from the system's perspective, and it may increase the burden of blind decoding for a UE 241. As another example, a UE 241 may be configured with dedicated BWP configuration, CORESET configuration and search space configuration for blindly detecting the DCIs scheduling broadcast and groupcast transmission. For example, while a UE 241 is configured with BWP a, CORESET a and search space a for blindly detecting the scheduling DCI for unicast, the UE 241 may be also configured with BWP b, CORESET b and search space b for blindly detecting the scheduling DCI for broadcast and groupcast.

Figure 8:
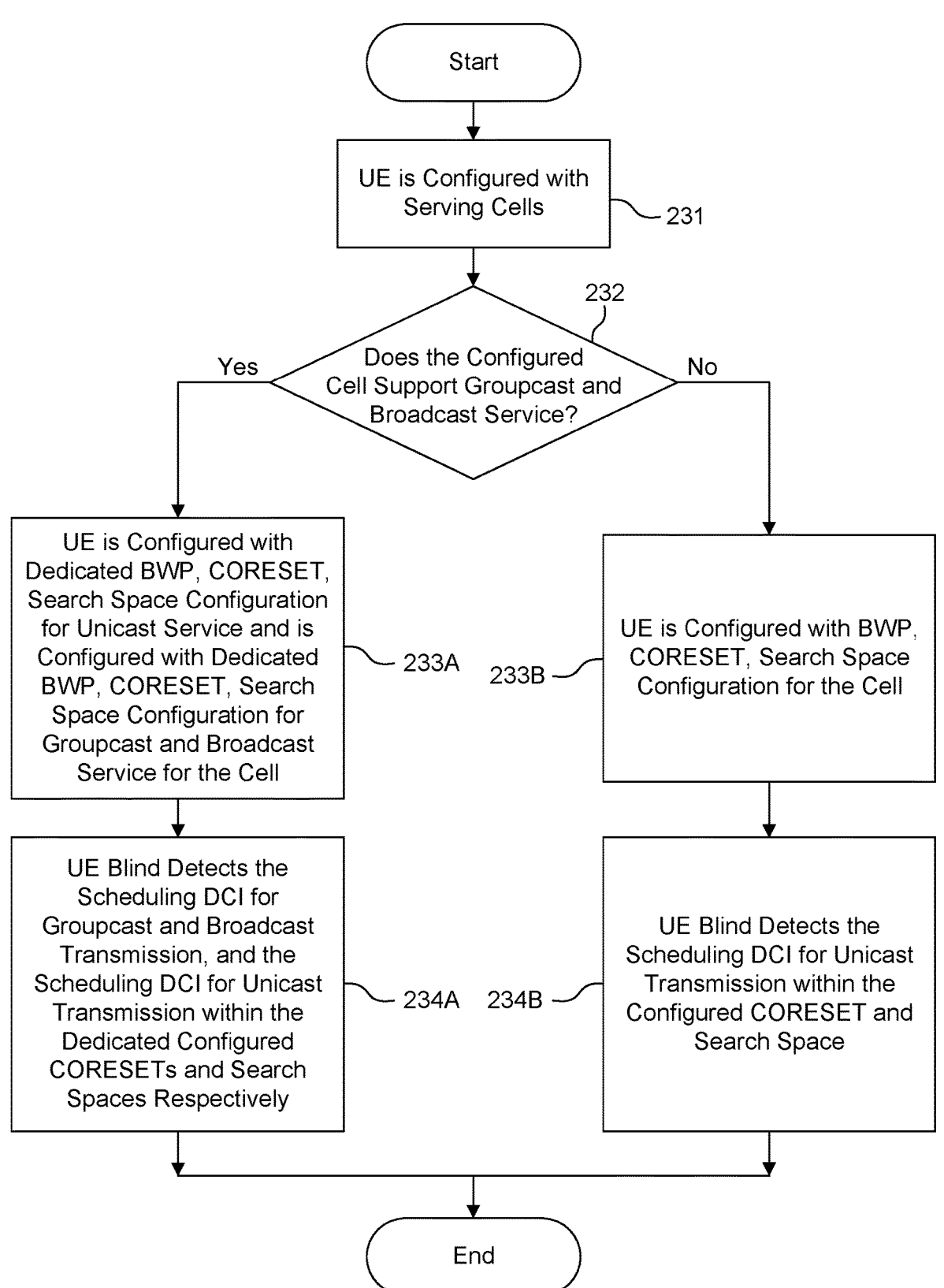
FIG. 8 illustrates an example flowchart of blindly detecting DCI when the cell supports both broadcast and groupcast service and unicast service with dedicated configuration for DCI monitoring.

The flowchart in the FIG. 8 illustrates exemplary steps of a UE 241 performing blind detection of the scheduling DCI for broadcast and groupcast transmission when dedicated configuration is used. In step 231 of FIG. 8, a UE 241 may be configured with multiple serving cells. In step 232 of FIG. 8, the UE 241 may check which cell(s) supports both broadcast and groupcast service and unicast service, e.g., by checking the RRC parameter cellsupportgroupcastservice-r17 in the ServingCellConfig information element. In step 233A of FIG. 8, for the cell(s) supports both services, the UE 241 may be configured with dedicated BWP. CORESET, search space configuration for unicast service, and the UE 241 may be configured with dedicated BWP, CORESET, search space configuration for broadcast and groupcast service. In step 4a of FIG. 8, the UE 241 may try to blindly detect the scheduling DCI for unicast transmission in the associated CORESET and search space, e.g., within the CORESET a and the search space a. Meanwhile, the UE 241 may also try to blindly detect the scheduling DCI for groupcast and broadcast transmission in the associated CORESET and search space, e.g., within the CORESET b and the search space b. Note that the step 231 of FIG. 8 and step 233 of FIG. 8 do not mean that the serving cell configuration and the BWP, CORESET, search space configurations are separately configured, nor does it mean that one is firstly configured and the other one is secondly configured. The steps here describe the procedures of a UE 241 receiving the configuration and understanding the configuration. In step 233B, when in step 232, the configured cell is not dedicated for the groupcast and broadcast service, then UE 241 is configured with BWP, CORESET, search space configuration for the cell. In step 234B, UE 241 blind detects the scheduling DCI for unicast transmission within the configured CORESET and search space.

1.1.9 Downlink Control Related Configuration for Broadcast and Groupcast

When a gNB provides broadcast and groupcast service within an area, it may provide two types of services. In one case, the gNB may provide broadcast or common groupcast service. In this case, the gNB may provide the service without the request from the UEs. One example of such broadcast service may be the public safety message, e.g., tsunami warning. For the common groupcast service case, an example may be that the gNB may provide certain groupcast service within an area, e.g., the gNB performs live streaming a sports event, the UE 241 may decide whether to join and receive the groupcast based on its interest. In another case, the gNB may provide event triggered groupcast service. In this case, the gNB may provide the service based on the request from the UEs.

1.1.10 Overview of the Downlink Control Related Configuration

Figure 9:
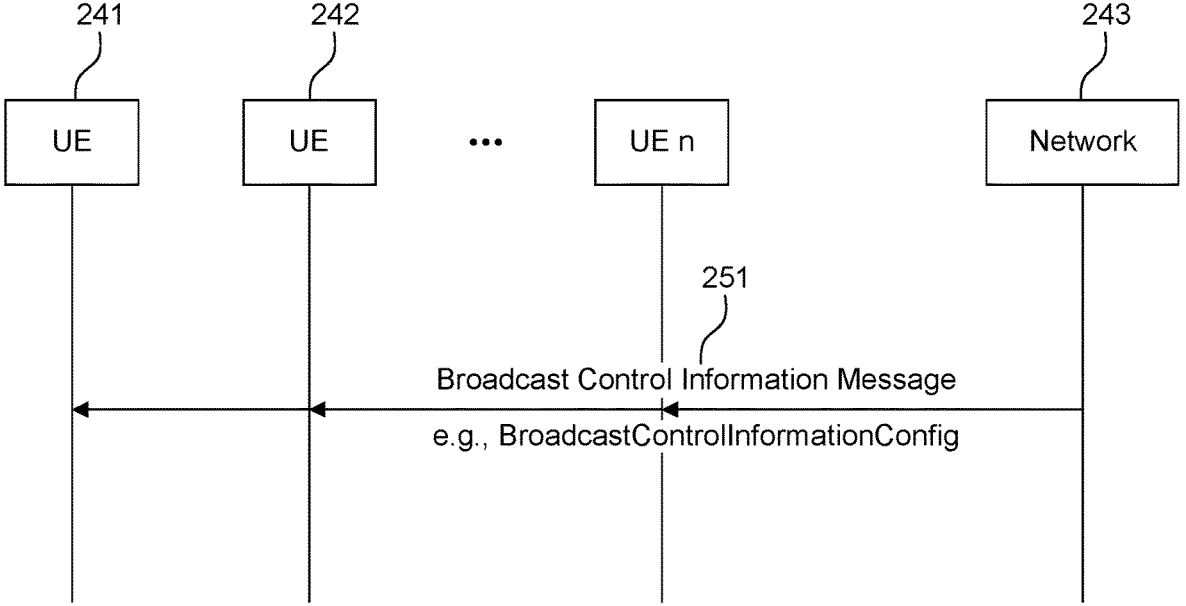
FIG. 9 illustrates an example gNB initiated broadcast control information message transmission.

To deliver the information used for monitoring the scheduling DCI for broadcast and groupcast service, gNB may configure such information through broadcast signaling. For one example, the gNB may use the SIB, e.g., through the existing SIB, for example SIB1; or through a new SIB, for example SIB15, to broadcast the configuration of the broadcast control information message to the UEs receiving the broadcast and groupcast service as shown in FIG. 9 (see step 251 of FIG. 9). The message may include the information such as BWP configuration for broadcast and groupcast service, CORESET configuration for broadcast and groupcast service, search space configuration for broadcast and groupcast service, etc.

In the example shown in FIG. 9, the gNB broadcasts the control related information for broadcast service to the UE 241 receiving it. It should be also noted that the gNB may also broadcast the control related information for group service using the same message. For example, both messages may be carried by the SIB15.

In one method, the same configuration may be shared by both broadcast service and the groupcast service. For example, the gNB may configure one set of configurations, e.g., BroadcastControlInformationConfig. which are applied to both broadcast service and the groupcast service. The UE 241 may monitor both the scheduling DCI for broadcast and the scheduling DCI for groupcast in the same configured CORSET and search space.

In another method, dedicated configurations may be configured for broadcast service and groupcast service separately. For example, the gNB may configure different configurations, e.g., BroadcastControlInformationConfig and GroupcastControlInformationConfig. for broadcast service and groupcast serviced respectively.

Furthermore, when a gNB provides multiple groupcast services simultaneously, the gNB may also configure different configurations for different groupcast services separately. For example, the gNB may configure GroupcastControlInformationConfig1 for groupcast service A and may configure GroupcastControlInformationConfig2 for groupcast service B, etc.

Besides being initialized by the gNB, in another example, the transmission of such information may be initialized by the UE 241, e.g., through the existing on-demand SI or through a new SI. In the UE 241 initialized procedures, a UE 241 may send a groupcast control information request message to the gNB when it is interested in one of groupcast services provided by this gNB. After receiving the request, the gNB may send a groupcast control information response message through broadcast signaling, e.g., though SIB16, to configure the groupcast control related information.

Figure 10:
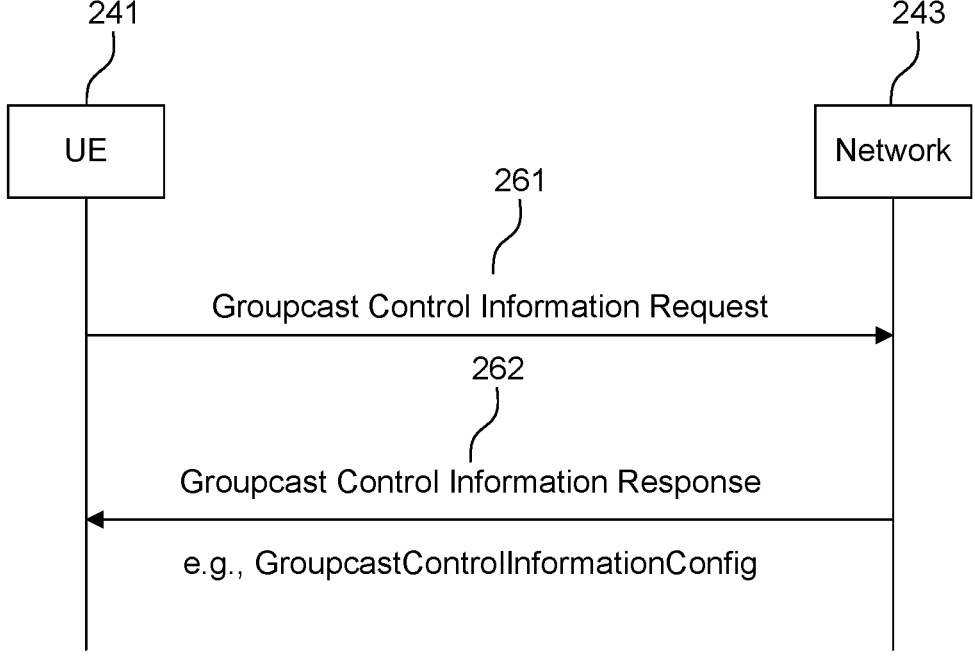
FIG. 10 illustrates an example UE initiated groupcast control information message transmission.

FIG. 10 shows an example of UE 241 initiated groupcast control information message transmission. In the response message, it may include the information such as BWP configuration for groupcast service, CORESET configuration for groupcast service, search space configuration for groupcast service, etc.

On one hand, a gNB (e.g., network 243) may configure the information used for monitoring the scheduling DCI using broadcast RRC signaling. On the other hand, the gNB may configure such information through unicast signaling, e.g., UE specific RRC signaling.

Similar to configuring through broadcast signaling, the configuration using UE specific RRC signaling may be initialized by the gNB as shown in FIG. 9, or may be initialized by the UE 241 as shown in FIG. 10. The configured information may include the information such as BWP configuration for broadcast and groupcast service, CORESET configuration for broadcast and groupcast service, search space configuration for broadcast and groupcast service, etc.

1.1.11 BWP Configuration for Broadcast and Groupcast

In NR, a UE 241 can be configured with up to 4 downlink BWPs and activated with 1 downlink BWP for unicast downlink transmission within a cell. When a cell supports both unicast service and broadcast/groupcast service, the UE 241 should know the BWP information for broadcast and groupcast service as well. In this section, various solutions are disclosed for addressing the details of BWP operation for broadcast and groupcast.

1.1.12 Configured BWP

In a first approach, a UE 241 may operate the broadcast/groupcast and unicast services on the same downlink BWP. When the UE is configured with multiple BWPs and is activated with one of them, the UE 241 may receive both the transmission for broadcast/groupcast and the transmission for unicast on it. In this approach, since the BWP is shared by the two types of service, a UE 241 may be still configured with up to 4 downlink BWPs and may be activated with 1 downlink BWP within a cell.

Sharing the BWP may simplify the BWP operation. However, it may introduce undesired restriction to the system and limit the spectrum efficiency. As an alternative, dedicated BWP configuration may be configured for broadcast and groupcast service. Or, as another alternative, BWP for broadcast and groupcast service may be a frequency region confined within the UE's unicast BWP to avoid BWP switching. The UE 241 doesn't need to be configured with dedicated IE for the BWP for broadcast and groupcast service. Instead, the information, e.g., such as the information configured in FIG. 11, of the frequency region may be part of the UE's unicast BWP configuration and may be associated with each unicast BWP. To indicate the location of the frequency region, a UE 241 may be also configured with the start and length of the frequency region. For example, the start PRB of the frequency region may be with respect to the lowest PRB of the associated unicast BWP; or may be with respect to lowest PRB of the frequency band, e.g., PRB 0. Or, the UE 241 may be configured with two offsets to indicate the location, e.g., the UE 241 may be configured with two PRB offsets with respect to the lowest PRB and the highest PRB of the associated unicast BWP respectively.

In a second approach, the total maximum number of configured downlink BWPs may be maintained, e.g., a UE 241 can still be configured with up to 4 downlink BWPs within a cell. The configured downlink BWPs can be split between the broadcast/groupcast service and the unicast service.

To differentiate the downlink BWP configured for broadcast/groupcast and the downlink BWP configured for unicast, the gNB may indicate it explicitly or implicitly. For one example, such information may be explicitly configured in the BWP configuration. An example is shown in FIG. 11. When a UE 241 is configured with RRC parameter 'BWP-casttype-r17' set to be 'Unicast', the configured BWP is for unicast transmission, when a UE 241 is configured with RRC parameter 'BWPcasttype-r17' set to be 'Groupcast', the configured BWP is for broadcast and groupcast transmission.

Another example is shown in FIG. 12. When a UE 241 is configured with RRC parameter 'BWPsupportgroupcastservice-r17' set to be 'True', the configured BWP is for broadcast and groupcast transmission, when a UE 241 is not configured with RRC parameter 'BWPsupportgroupcastservice-r17', the configured BWP is for unicast transmission.

For another example such indicating may be implicit. For example, the BWP configured for the broadcast and groupcast transmission may be indicated by the BWP ID. E.g., if the BWP ID of a configured downlink BWP is 1 or 2, the BWP is configured for unicast transmission; if the BWP ID of a configured downlink BWP is 3 or 4, the BWP is configured for broadcast and groupcast transmission, and vice versa. Or the BWP with the lowest/highest BWP index may be used for configuring the BWP for groupcast/broadcast, and the other BWPs may be used for configuring the BWP for unicast.

Or it may be determined by whether the value of the BWP ID is even or odd. For example, if the value of the BWP ID of a configured downlink BWP is even, the BWP is configured for unicast transmission; if the value of the BWP ID of a configured downlink BWP is odd, the BWP is configured for broadcast and groupcast transmission, and vice versa.

In yet a third approach, the total maximum number of configured downlink BWPs may be increased. For example, within a cell, a UE 241 may be configured with up to 4 downlink BWPs for unicast transmission and the UE 241 may be configured with up to another 4 downlink BWPs for broadcast and groupcast transmission.

To differentiate the downlink BWP configured for broadcast/groupcast and the downlink BWP configured for unicast, the above disclosed schemes may still be applied, e.g., with the maximum number of configured downlink BWP increased from 4 to 8. For example, when implicitly indicated by the BWP ID, if the BWP ID of a configured downlink BWP is 1 or 2 or 3 or 4, the BWP is configured for unicast transmission; if the BWP ID of a configured downlink BWP is 5 or 6 or 7 or 8, the BWP is configured for broadcast and groupcast transmission, and vice versa.

Note for both the second approach and the third approach, the configured BWPs may not be evenly distributed between the broadcast/groupcast and the unicast. For example, when the total maximum number of configured downlink BWP is 4, it may be pre-specified that BWP 1 and BWP 2 and BWP 3 may be used for configuring the BWP for unicast transmission, and the BWP 4 may be used for configuring the BWP for broadcast/groupcast transmission.

Beyond the above disclosed schemes, another alternative is that the BWP for broadcast/groupcast transmission may be configured though a new information element, e.g., BWP-Downlink-Groupcast. An example of such information element is shown in FIG. 13. The IE BWP-Downlink-Groupcast may be used to configure an additional downlink bandwidth part for broadcast/groupcast transmission.

To differentiate the BWP ID used for unicast transmission and the BWP ID used for broadcast/groupcast transmission, a new information element, e.g., BWP-Id-Groupcast may be introduced. An example of this information element is shown in FIG. 14. The IE BWP-Id-Groupcast, may be used to refer to Bandwidth Parts for broadcast and groupcast transmission. Or it may be configured by adding the new RRC parameter BWP-Id-Groupcast-r17 into the existing IE BWP-Id.

In this alternative, a UE 241 may be configured with the IE BWP-Downlink-Groupcast through broadcast RRC signaling or through UE specific RRC signaling. FIG. 15 shows an example of IE BWP-Downlink-Groupcast configured through UE specific RRC signaling.

FIG. 16 shows an example of IE BWP-Downlink-Groupcast configured through broadcast RRC signaling. In the example, the IE is configured through a new SIB, e.g., SIB15 as shown in the figure. In another example, the IE may be signaled by the existing broadcast SIB, e.g., through the broadcast IE ServingCellConfigCommonSIB in the SIB 1.

1.1.13 Activated BWP

When a UE 241 is configured with shared downlink BWP for unicast and broadcast/groupcast, the UE 241 may be activated with one downlink BWP per cell for receiving the unicast transmission and broadcast/groupcast transmission. However, when a UE 241 is configured with dedicated downlink BWPs for unicast and broadcast/groupcast separately, enhancements are needed to address the BWP operation.

In one approach, a UE 241 may be activated with separate BWPs for unicast and broadcast/groupcast, and operate on two or multiple BWPs simultaneously. For example, a UE 241 may be activated with one downlink BWP for the reception of unicast transmission, and the UE 241 may be activated with another downlink BWP for the reception of broadcast and groupcast transmission. The UE 241 may operate with these two activated BWPs separately, e.g., the UE 241 may be configured with separate BWP inactivity timers and may operate with them independently for each activated downlink BWP. When the timer expires, the UE 241 may switch to the default BWP or initial BWP. A UE 241 may be configured with a same default BWP or initial BWP for unicast and broadcast/groupcast. Or the UE 241 may be configured with dedicated default BWPs or initial BWPs separately.

In another approach, a UE 241 may be activated with one downlink BWP for unicast and broadcast/groupcast in a time. For one example, the UE 241 may be activated with one downlink BWP, e.g., BWP a, for unicast and work on it as default. The UE may be also configured with one downlink BWP for broadcast/groupcast, e.g., BWP b. When there is no broadcast and groupcast transmission, the UE 241 may work on BWP a. When there is broadcast and groupcast transmission, the UE 241 may switch to BWP b and work on it. After the broadcast and groupcast transmission is finished, the UE 241 may switch back to BWP a and work on it again, and vice versa, e.g., the UE 241 may work on the BWP for broadcast/groupcast as default and switch to the BWP for unicast whenever there is a unicast transmission. The subject matter disclosed here may be applied to the case that BWP for broadcast/groupcast and the BWP for unicast are in inter-frequency case or in intra-frequency case.

In one mode of operation, it's up to the network to switch the UE 241 to groupcast BWP whenever it's time to receive groupcast transmissions. In another mode of operation, potentially with lower overhead, the UE may periodically switch to the groupcast BWP to monitor the groupcast PDCCH. If no group PDCCH detected, the UE 241 may quickly switch back to previous BWP, e.g., the unicast BWP. If a group PDCCH is detected, the UE may switch back after receiving the group PDSCH. However, if the UE 241 is being scheduled with unicast transmission on the active unicast BWP when there is a groupcast data to be transmitted in the same time, the UE 241 shouldn't have to switch to the groupcast BWP. Instead, the network may transmit the groupcast data to this UE 241 in unicast manner. The UE 241 may be configured with the periodicity to do the switching and the time duration it needs to stay in the groupcast BWP through the RRC signaling.

For another example, the gNB may configure the activated BWP for unicast and the activated BWP for broadcast/groupcast in an intra-frequency manner. Examples are shown in FIG. 17. The two activated BWPs may have the same sub-carrier spacing. For example, when a UE 241 is activated with two DL BWPs for unicast and broadcast/groupcast respectively, the UE 241 may determine the sub-carrier spacing configured for the activated unicast BWP may be also applied for the activated broadcast/groupcast BWP.

Figure 17A:
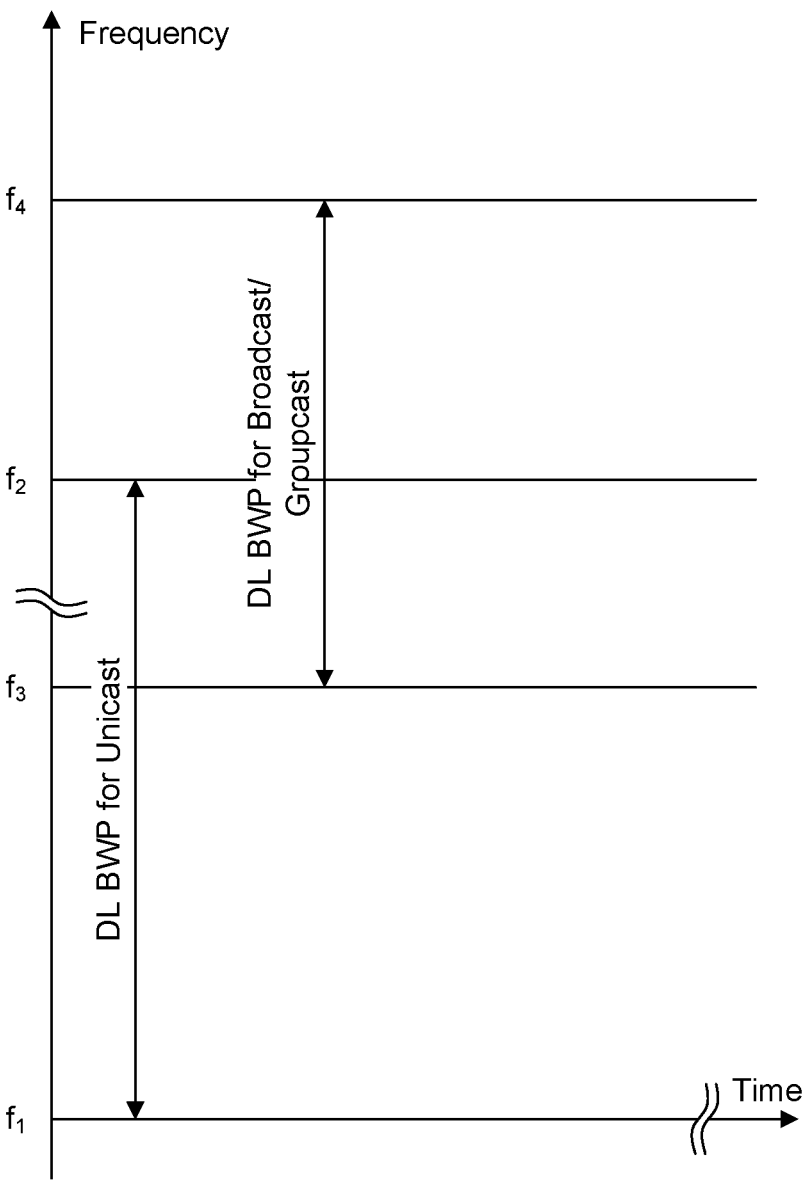
FIG. 17A illustrates an example of BWP for unicast and BWP for broadcast/groupcast configured in an intra-frequency manner with partial overlapping.

In the example shown in FIG. 17A, the unicast BWP and the broadcast/groupcast BWP are configured to be partially overlapped.

Figure 17B:
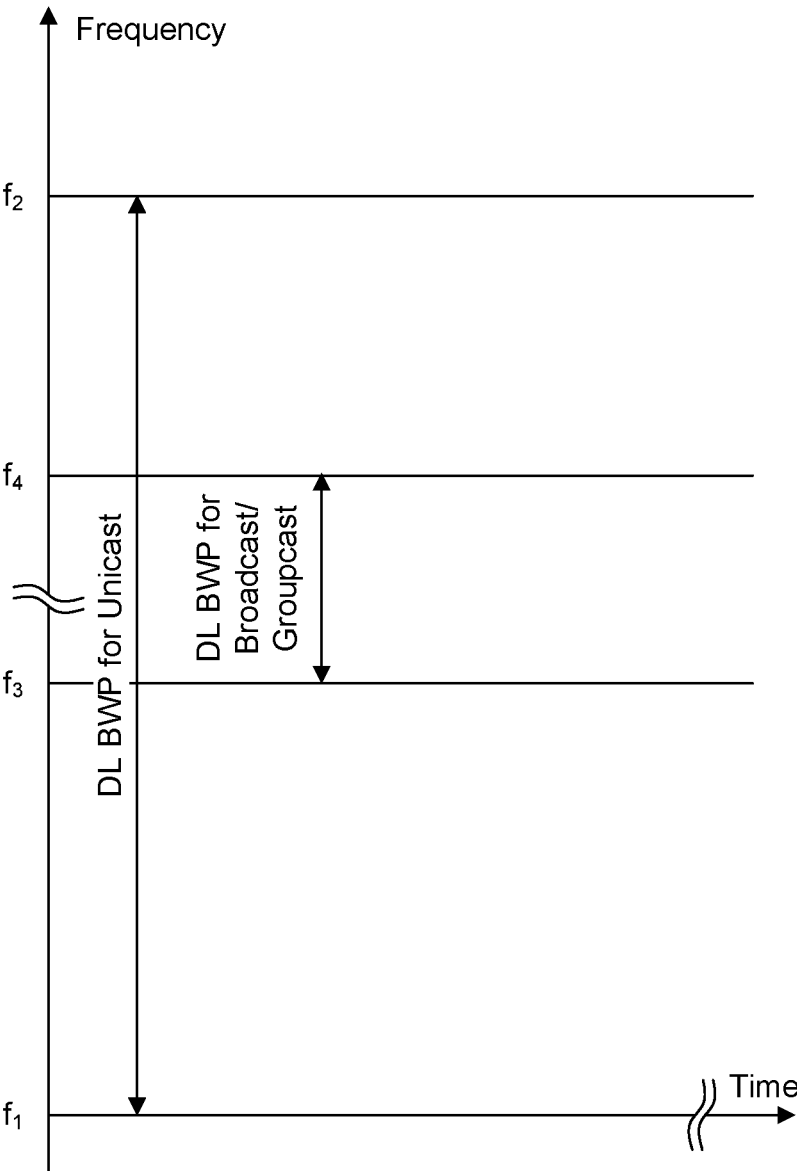
FIG. 17B illustrates an example of BWP for unicast and BWP for broadcast/groupcast configured in an intra-frequency manner with broadcast/groupcast BWP within unicast BWP.

In the example shown in FIG. 17B, the broadcast/groupcast BWP is configured to be smaller than the unicast BWP and is configured to be located within the unicast BWP.

Figure 17C:
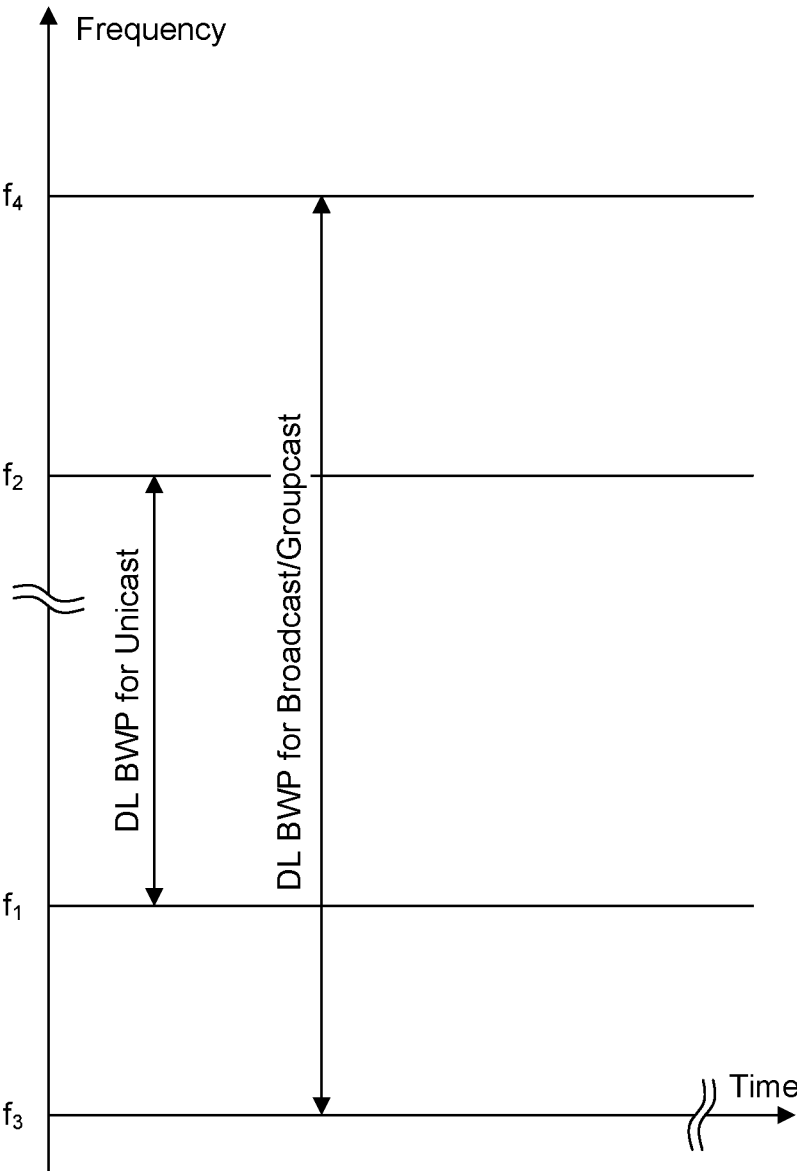
FIG. 17C illustrates an example of BWP for unicast and BWP for broadcast/groupcast configured in an intra-frequency manner with unicast BWP within broadcast/groupcast BWP.

In the example shown in FIG. 17C, the unicast BWP is configured to be smaller than the broadcast/groupcast BWP and is configured to be located within the broadcast/groupcast BWP.

When the UE 241 is configured with intra-frequency unicast BWP and the broadcast/groupcast BWP, the UE 241 may be operated with a BWP, e.g., consolidated BWP, which is the union of these two BWPs, e.g., unicast BWP U broadcast/groupcast BWP. Using the FIG. 16 as an example, assuming the frequency range of the unicast BWP spans from $f_1$ to $f_2$, and the broadcast/groupcast BWP spans from $f_3$ to $f_4$, the UE 241 may be operated with a BWP with the frequency range from $f_1$ to $f_4$ for FIG. 17A, with the frequency range from $f_1$ to $f_2$ for FIG. 17B, with the frequency range from $f_3$ to $f_4$ for FIG. 17C.

When a UE 241 is receiving both the unicast service and the broadcast/groupcast service, the UE 241 may operate with one activated consolidated BWP. The UE 241 may determine the consolidated BWP to be activated based on the configured activated unicast BWP and the configured activated broadcast/groupcast BWP. When the configured activated unicast BWP or the configured activated broadcast/groupcast BWP is changed, e.g., due to BWP switching, the activated consolidated BWP may be updated accordingly, and the UE 241 may switch to the new activated consolidated BWP to continue receiving the downlink transmission.

For one activated consolidated BWP, a UE 241 may be configured with one inactivity timer. The UE 241 may restart the timer whenever there is unicast traffic or broadcast/groupcast traffic. If the UE 241 does not have the unicast traffic or the broadcast/groupcast traffic for certain period time, the UE 241 may deactivate the consolidated BWP and switch to the default BWP or switch to the initial BWP.

Figure 18:
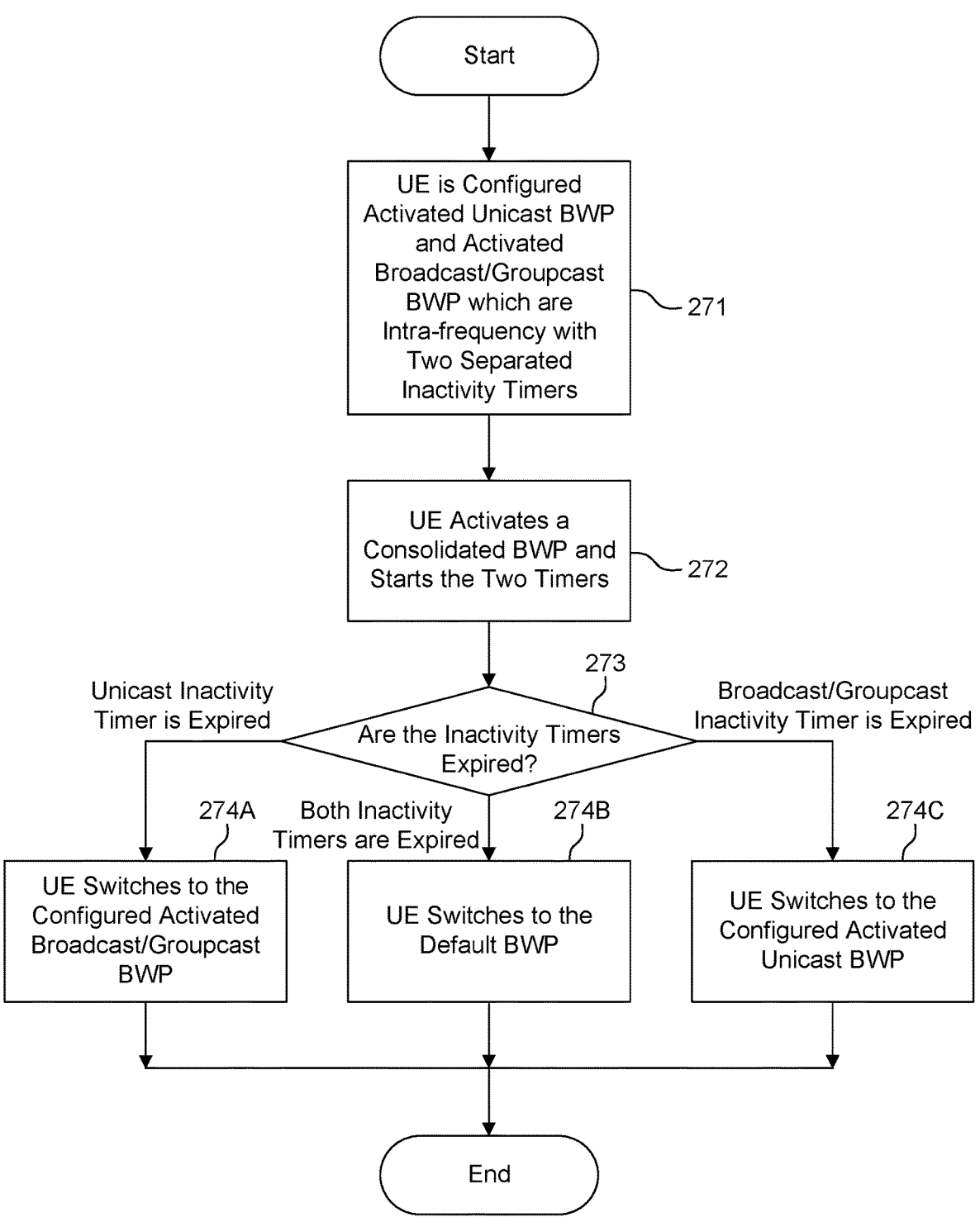
FIG. 18 illustrates a flowchart of a UE working with two BWP inactivity timers within a consolidated BWP.

Or the UE 241 may be configured with time inactivity timers for unicast and broadcast/groupcast separately in one activated consolidated BWP. The UE 241 may count the two timers independently. The flowchart in the FIG. 18 shows the exemplary steps of a UE 241 working with two BWP inactivity timers within a consolidated BWP. In step 271 of FIG. 18, a UE 241 may be configured with an active BWP for unicast and configured with an active BWP for broadcast/groupcast in an intra-frequency manner. The UE 241 may be also configured with two inactivity timers for them respectively. In the step 272 of FIG. 18, the UE 241 may activate a consolidated BWP to receive both the unicast transmission and the broadcast/groupcast transmission. The UE 241 also start the both timers. In step 273 of FIG. 18, the UE 241 may check if one of the two timers or both the timer are expired. In step 274A of FIG. 18, if only the unicast inactivity timer is expired, the UE 241 may switch to the configured activated broadcast/groupcast BWP to continue receive the broadcast/groupcast transmission. In step 274C of FIG. 18, if only the broadcast/groupcast inactivity timer is expired, the UE 241 may switch to the configured activated unicast BWP to continue receive the unicast transmission. In step 274B of FIG. 18, if both the unicast inactivity timer and the broadcast/groupcast timer are expired, the UE 241 may switch to the default BWP.

1.1.14 UL BWP

Besides the DL BWP, a UE 241 may also be aware of the UL BWP used to support receiving the broadcast/groupcast transmission. For example, when a UE 241 should send HARQ feedback for the received broadcast/groupcast transmission, the UE 241 should be aware on which UL BWP it should be transmitted.

Subject matter described herein for the control of DL BWP and the switching between DL BWPs may also be extended to address the control of UL BWPs and switching. For example, the UE 241 may use the configured UL BWP for unicast to send the HARQ feedback for broadcast/groupcast. Or in another example, the UE 241 may be configured with dedicated broadcast/groupcast UL BWP for sending the feedback.

1.1.15 CORESET Configuration for Broadcast and Groupcast.

In order to blindly detect the scheduling DCI for broadcast and groupcast transmission, a UE 241 should know the CORESET information. In this section, various solutions are disclosed for configuring the CORESET for broadcast and groupcast.

In first approach, the CORESET configured for unicast may be applied for broadcast and groupcast. In this case, a UE 241 may try to blindly detect both the scheduling DCI for broadcast/groupcast and the scheduling DCI for unicast in the same CORESET. Vice versa, e.g., the CORESET configured for broadcast and groupcast may be applied for unicast.

Sharing the CORESET configuration may simplify the signaling therefore may reduce the signaling overhead. However, it may restrict the scheduling flexibility and it also may increase the UE's complexity on blind decoding the DCI. As an alternative, dedicated CORESET configuration may be configured for broadcast and groupcast.

When a UE 241 is configured with dedicated BWP configuration, the dedicated CORESET configuration used for broadcast and groupcast may be implicitly determined by the UE 241. For example, when receiving the broadcast and groupcast transmission, the UE 241 may monitor the DCI using the CORESET configuration configured in the broadcast/groupcast BWP.

When a UE 241 is configured with shared BWP configuration, mechanisms should be introduced for the UE 241 to differentiate the CORESET used for unicast and the CORESET used for broadcast/groupcast. We disclose the gNB may indicate such information explicitly or implicitly.

The subject matters disclosed for implicitly differentiating the BWP may be also applied here for differentiating the CORESET. For example, it may be determined based on whether the value of the CORESET ID is even or odd as predefined in the specification. Or it may be determined by which range the value of the CORESET ID falls into. For example, CORESET 1 to x may be used for unicast and CORESET x+1 to y may be used for the broadcast and groupcast, where x is a value can be predefined in the specification or may be configured by the RRC, and y is the maximum number of CORESET can be configured.

In one example of explicitly indicating, this information may be explicitly configured in the CORESET configuration. An example is shown in FIG. 19. When a UE 241 is configured with RRC parameter 'CORESETcasttype-r17' set to be 'Unicast', the configured CORESET is used for searching the scheduling DCI for unicast transmission, when a UE 241 is configured with RRC parameter 'CORESETcasttype-r17' set to be 'Groupcast', the configured CORESET is used for searching the scheduling DCI for broadcast and groupcast transmission.

Another example is shown in FIG. 20. When a UE 241 is configured with RRC parameter 'CORESETsupportgroupcastservice-r17' set to be 'True', the configured CORESET is used for searching the scheduling DCI for broadcast and groupcast transmission; when a UE 241 is not configured with RRC parameter 'CORESETsupportgroupcastservice-r17', the configured CORESET is used for searching scheduling DCI for unicast transmission.

In another example of explicitly indicating, a new information element, e.g., ControlResourceSet-Groupcast, may be introduced. An example of such information element is shown in FIG. 21. The IE ControlResourceSet-Groupcast may be used to configure a time/frequency control resource set (CORESET) in which to search for DCI for broadcast and groupcast transmission.

To differentiate the CORESET ID used for unicast transmission and the CORESET ID used for broadcast/groupcast transmission, a new information parameter, e.g., ControlResourceSetId-Groupcast-r17, may be introduced. An example of this information element is shown in FIG. 22.

In this example, a UE 241 may be configured with the IE ControlResourceSet-Groupcast through broadcast RRC signaling or through UE specific RRC signaling. FIG. 23 shows an example of IE ControlResourceSet-Groupcast configured through UE specific RRC signaling.

FIG. 24 shows an example of IE ControlResourceSet-Groupcast configured through broadcast RRC signaling. In the example, the IE is configured through a new SIB, e.g., SIB15 as shown in the figure. In another example, the IE may be signaled by the existing broadcast SIB, e.g., through the broadcast IE ServingCellConfigCommonSIB in the SIB 1.

1.1.16 Search Space Configuration.

In order to blindly detect the scheduling DCI for broadcast and groupcast transmission, a UE 241 should know the search space information. In this section, various solutions are disclosed for configuring the search space for broadcast and groupcast.

In first approach, the search space configured for unicast may be applied for broadcast and groupcast, vice versa, e.g., the search space configured for broadcast and groupcast may be applied for unicast. In this case, a UE 241 may try to blindly detect both the scheduling DCI for broadcast/groupcast and the scheduling DCI for unicast in the same search space. For example, a UE 241 may blindly search for the DCI scrambled with the RNTI used for unicast and blindly search for the DCI scrambled with the RNTI used for broadcast/groupcast in one search occasion.

In one example, a UE 241 may be scheduling with a DCI for one type of cast service within one search space. In this alternative, the UE 241 may search for the DCI for unicast first. If a DCI is detected, the UE 241 may stop the searching. If the UE 241 does not detect the DCI for unicast, the UE 241 may continue to search for the DCI for groupcast/broadcast until a DCI is detected or finishing the searching, and vice versa, e.g., search DCI for groupcast/broadcast first and then search DCI for unicast next.

In another example, a UE 241 may be scheduling with both the DCI for unicast and the DCI for groupcast/broadcast within one search space. In this alternative, the UE 241 should search both DCIs regardless of the searching result for any one of them. For example, regardless the searching result for unicast DCI, the UE 241 should search for the DCI for groupcast/broadcast until one DCI is detected or finishing the searching for it, and vice versa.

Sharing the search space configuration may simplify the signaling therefore may reduce the signaling overhead. However, it may restrict the scheduling flexibility and it also may increase the UE's complexity on blind decoding the DCI. As an alternative, dedicated search space configuration may be configured for broadcast and groupcast.

When a UE 241 is configured with dedicated BWP configuration, the dedicated search space configuration used for broadcast and groupcast may be implicitly determined by the UE 241. For example, when receiving the broadcast and groupcast transmission, the UE 241 may monitor the DCI using the search space configuration configured in the broadcast/groupcast BWP.

Or the search space used for broadcast and groupcast may be implicitly determined by the associated CORESET. For example, if the CORESET is dedicatedly configured for broadcast and groupcast, the UE may determine the associated search space is also used for searching for the PDCCH candidates for broadcast and groupcast.

When a UE 241 is configured with shared CORESET configuration, mechanisms should be introduced for the UE to differentiate the search space used for unicast and the search space used for broadcast/groupcast. Disclosed herein is that the gNB may indicate such information explicitly or implicitly.

The subject matters disclosed for implicitly differentiating the BWP may be also applied here for differentiating the search space. For example, it may be determined based on whether the value of the search space ID is even or odd as predefined in the specification. Or it may be determined by which range the value of the search space ID falls into. For example, search spaces with indices 1 to x may be used for unicast and search spaces with indices x+1 to y may be used for the broadcast and groupcast, where x is a value can be predefined in the specification or may be configured by the RRC, and y is the maximum number of search space can be configured.

In one example of explicitly indicating, this information may be explicitly configured in the search space configuration. An example is shown in FIG. 25. When a UE 241 is configured with RRC parameter 'searchSpacecasttype-r17' set to be 'Unicast', the configured search space is used for searching the scheduling DCI for unicast transmission, when a UE 241 is configured with RRC parameter 'searchSpacecasttype-r17' set to be 'Groupcast', the configured search space is used for searching the scheduling DCI for broadcast and groupcast transmission.

Another example is shown in FIG. 26. When a UE 241 is configured with RRC parameter 'SearchSpacesupportgroupcastservice-r17' set to be 'True', the configured search space is used for searching the scheduling DCI for broadcast and groupcast transmission; when a UE 241 is not configured with RRC parameter 'SearchSpacesupportgroupcastservice-r17', the configured search space is used for searching the scheduling DCI for unicast transmission.

Yet in another example may use the associated DCI format in the configured search space to determine it. For example, under the searchSpaceType RRC message, a UE 241 may be configured with the associated DCI format. A new DCI, e.g., DCI format 1_3 may be introduced for scheduling the groupcast and broadcast transmission. When a UE 241 is configured through 'searchSpaceType' with the associated DCI format to be 'DCI format 1_3', the UE 241 may determine the configured search space is used for searching the scheduling DCI for broadcast and groupcast.

In another example of explicitly indicating, a new information element, e.g., SearchSpace-Groupcast, may be introduced. An example of such information element is shown in FIG. 27. The IE SearchSpace-Groupcast may defines how/where to search for PDCCH candidates for broadcast and groupcast transmission.

To differentiate the search space ID used for unicast transmission and the search space ID used for broadcast/groupcast transmission, a new information parameter, e.g., searchSpaceId-Groupcast-r17, may be introduced. An example of this information element is shown in FIG. 28.

In this example, a UE 241 may be configured with the IE SearchSpace-Groupcast through broadcast RRC signaling or through UE specific RRC signaling. FIG. 29 shows an example of IE SearchSpace-Groupcast configured through UE specific RRC signaling.

FIG. 30 shows an example of IE SearchSpace-Groupcast configured through broadcast RRC signaling. In the example, the IE is configured through a new SIB, e.g., SIB15 as shown in FIG. 30. In another example, the IE may be signaled by the existing broadcast SIB, e.g., through the broadcast IE ServingCellConfigCommonSIB in the SIB 1.

It is understood that the entities performing the steps illustrated herein, such as in FIG. 5, FIG. 7, FIG. 8, FIG. 9, FIG. 10, and FIG. 18, among others, may be logical entities. The steps may be stored in a memory of, and executing on a processor of, a device, server, or computer system such as those illustrated in FIG. 32C or FIG. 32D. Skipping steps, combining steps, or adding steps between exemplary methods disclosed herein (e.g., FIG. 5, FIG. 7, FIG. 8, FIG. 9, FIG. 10, and FIG. 18) is contemplated. Table 7 illustrates exemplary abbreviations and definitions.

TABLE 7

| Abbreviations and Definitions | |
|---|---|
| Abbreviations | Definitions |
| BWP | Bandwidth Part |
| CORESET | Control Resource Set |
| CRC | Cyclic Redundancy Check |
| DCI | Downlink Control Information |
| DMRS | Demodulation Reference Signal |
| FDM | Frequency-Division Multiplexing |
| G-RNTI | Group Radio Network Temporary Identifier |
| HARQ | Hybrid Automatic Repeat Request |

TABLE 7-continued

Abbreviations and Definitions

| Abbreviations | Definitions |
| --- | --- |
| IIoT | Industrial Internet of Things |
| LSB | Least Significant Bit |
| LTE | Long Term Evolution |
| MAC | Medium Access Control |
| MAC-CE | MAC Control Element |
| MBMS | Multimedia broadcast multicast services |
| MBS | Multicast Broadcast Service |
| MBSFN | Multicast-Broadcast Single Frequency Network |
| MSB | Most Significant Bit |
| NR | New Radio |
| OSI | Other System Information |
| PDCCH | Physical Downlink Control Channel |
| PDSCH | Physical Downlink Shared Channel |
| PSCCH | Physical Sidelink Control Channel |
| PSFCH | Physical Sidelink Feedback Channel |
| PSSCH | Physical Sidelink Shared Channel |
| PMCH | Physical Multicast Channel |
| PUCCH | Physical Uplink Control Channel |
| QCL | Quasi Co Location |
| QoS | Quality of Service |
| RMSI | Remain Minimum System Information |
| RNTI | Radio Network Temporary Identifier |
| RRC | Radio Resource Control |
| SC-PTM | Single-Cell Point to Multipoint |
| SINR | Signal to Interference & Noise Ratio |
| SLIV | Start and Length Indicator Value |
| SPS | Semi-persistent Scheduling |
| TDM | Time-Division Multiplexing |
| UE | User Equipment |

Figure 31:
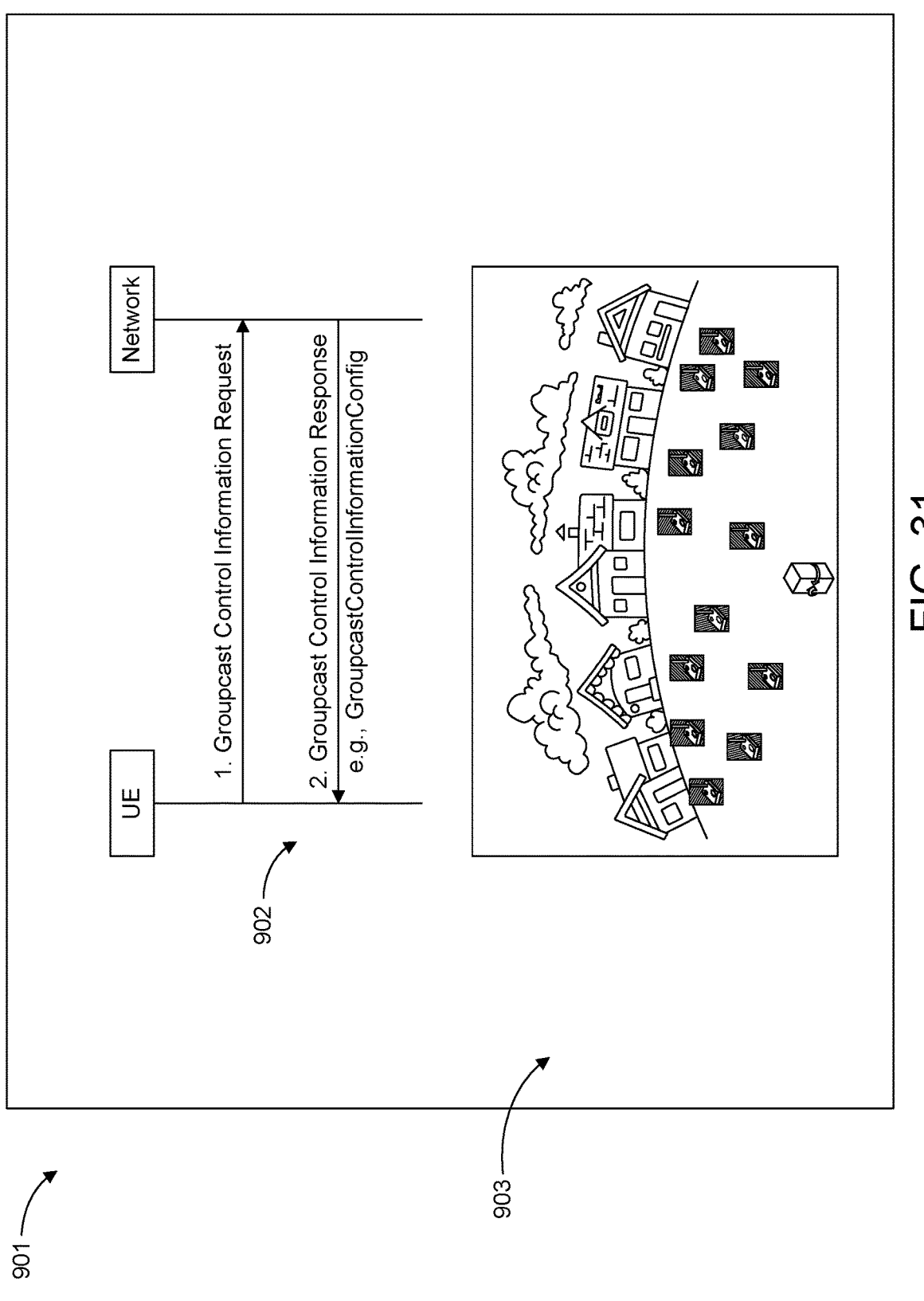
FIG. 31 illustrates an exemplary display (e.g., graphical user interface) that may be generated based on the methods, systems, and devices of scheduling for broadcast and groupcast on new radio Uu interface.

FIG. 31 illustrates an exemplary display (e.g., graphical user interface) that may be generated based on the methods, systems, and devices of scheduling for broadcast and group-cast on new radio Uu interface, as discussed herein. Display interface 901 (e.g., touch screen display) may provide text in graphical output 902 associated with scheduling for broadcast and groupcast on new radio Uu interface, such as related parameters, method flow, and associated current conditions. Progress of any of the steps (e.g., sent messages or success of steps) discussed herein may be displayed in graphical output 902. In addition, graphical output 902 may be displayed on display interface 901. Graphical output 903 may be the topology of the devices implementing the methods, systems, and devices of scheduling for broadcast and group-cast on new radio Uu interface, a graphical output of the progress of any method or systems discussed herein, or the like.

The 3rd Generation Partnership Project (3GPP) develops technical standards for cellular telecommunications network technologies, including radio access, the core transport network, and service capabilities-including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHZ, and the provision of new ultra-mobile broadband radio access above 7 GHZ. The flexible radio access is expected to consist of a new, non-backwards compatible radio access in new spectrum below 6 GHZ, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 32A:
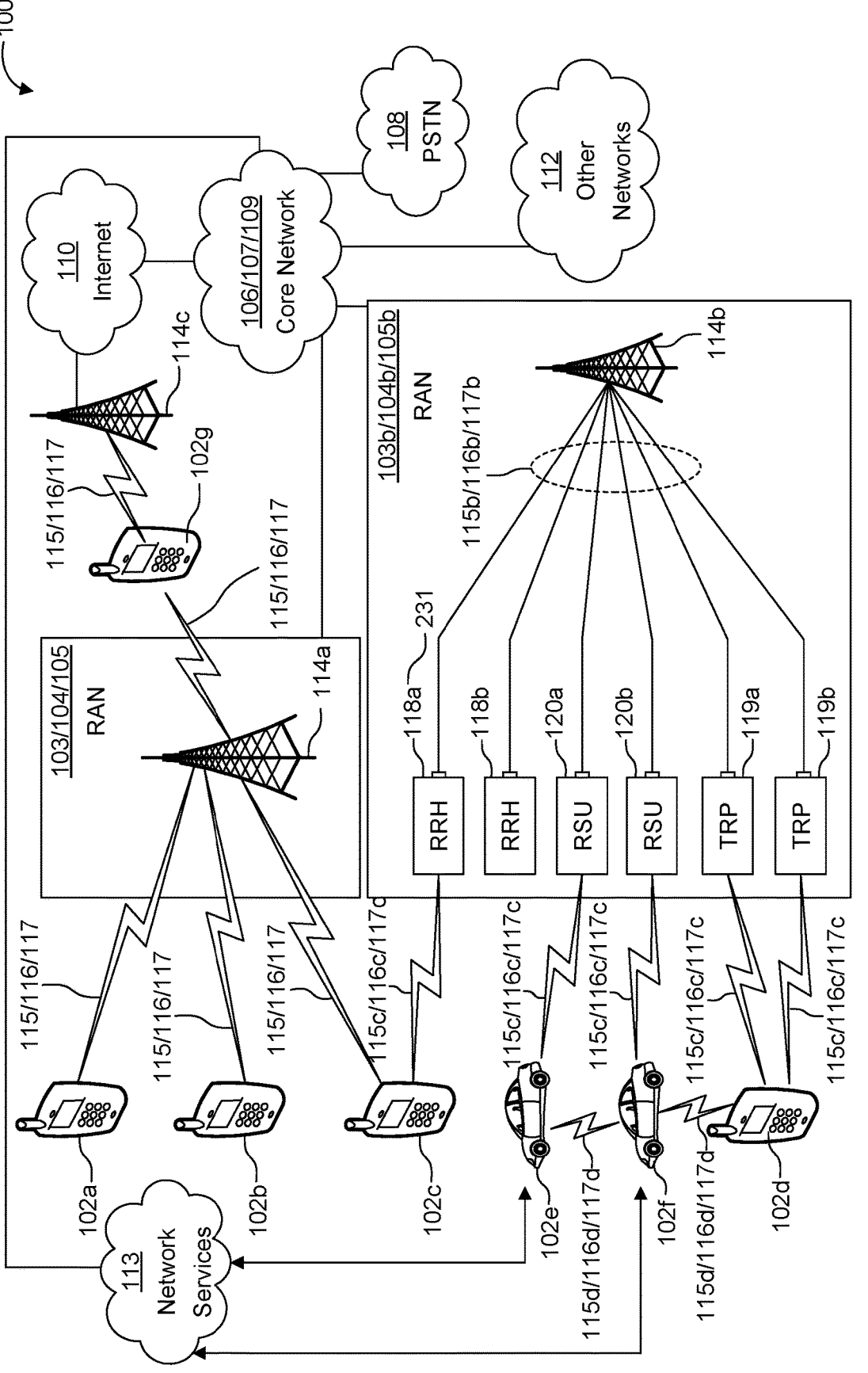
FIG. 32A illustrates an example communications system.

FIG. 32A illustrates an example communications system 100 in which the methods and apparatuses of scheduling for broadcast and groupcast on new radio Uu interface, such as the systems and methods illustrated in FIG. 1-FIG. 30 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a. 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 32A, FIG. 32B, FIG. 32C, FIG. 32D, FIG. 32E, or FIG. 32F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 32A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of scheduling for broadcast and groupcast on new radio Uu interface, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a. 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95

(IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 32A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of scheduling for broadcast and groupcast on new radio Uu interface, as disclosed herein. In an example, the base station 114*c* and the WTRUs 102, e.g., WTRU 102*e*, may implement a radio technology such as IEEE 802.11 to establish a wireless local area network (WLAN). similarly, the base station 114*c* and the WTRUs 102*d*, may implement a radio technology such as IEEE 802.15 to establish a wireless personal area network (WPAN). In yet another example, the base station 114*c* and the WTRUs 102, e.g., WTRU 102*e*, may utilize a cellular-based RAT (e.g., WCDMA, CDMA2000, GSM, LTE, LTE-A, NR, etc.) to establish a picocell or femtocell. As shown in FIG. 32A, the base station 114*c* may have a direct connection to the Internet 110. Thus, the base station 114*c* may not be required to access the Internet 110 via the core network 106/107/109.

The RAN 103/104/105 or RAN 103*b*/104*b*/105*b* may be in communication with the core network 106/107/109, which may be any type of network configured to provide voice, data, messaging, authorization and authentication, applications, or voice over internet protocol (VOIP) services to one or more of the WTRUs 102*a*, 102*b*, 102*c*, 102*d*. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 32A, it will be appreciated that the RAN 103/104/105 or RAN 103*b*/104*b*/105*b* or the core network 106/107/109 may be in direct or indirect communication with other RANs that employ the same RAT as the RAN 103/104/105 or RAN 103*b*/104*b*/105*b* or a different RAT. For example, in addition to being connected to the RAN 103/104/105 or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102*a*, 102*b*, 102*c*, 102*d*, 102*e* to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links for implementing methods, systems, and devices of scheduling for broadcast and groupcast on new radio Uu interface, as disclosed herein. For example, the WTRU 102*g* shown in FIG. 32A may be configured to communicate with the base station 114*a*, which may employ a cellular-based radio technology, and with the base station 114*c*, which may employ an IEEE 802 radio technology.

Although not shown in FIG. 32A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115*c*/116*c*/117*c* may equally apply to a wired connection.

Figure 32B:
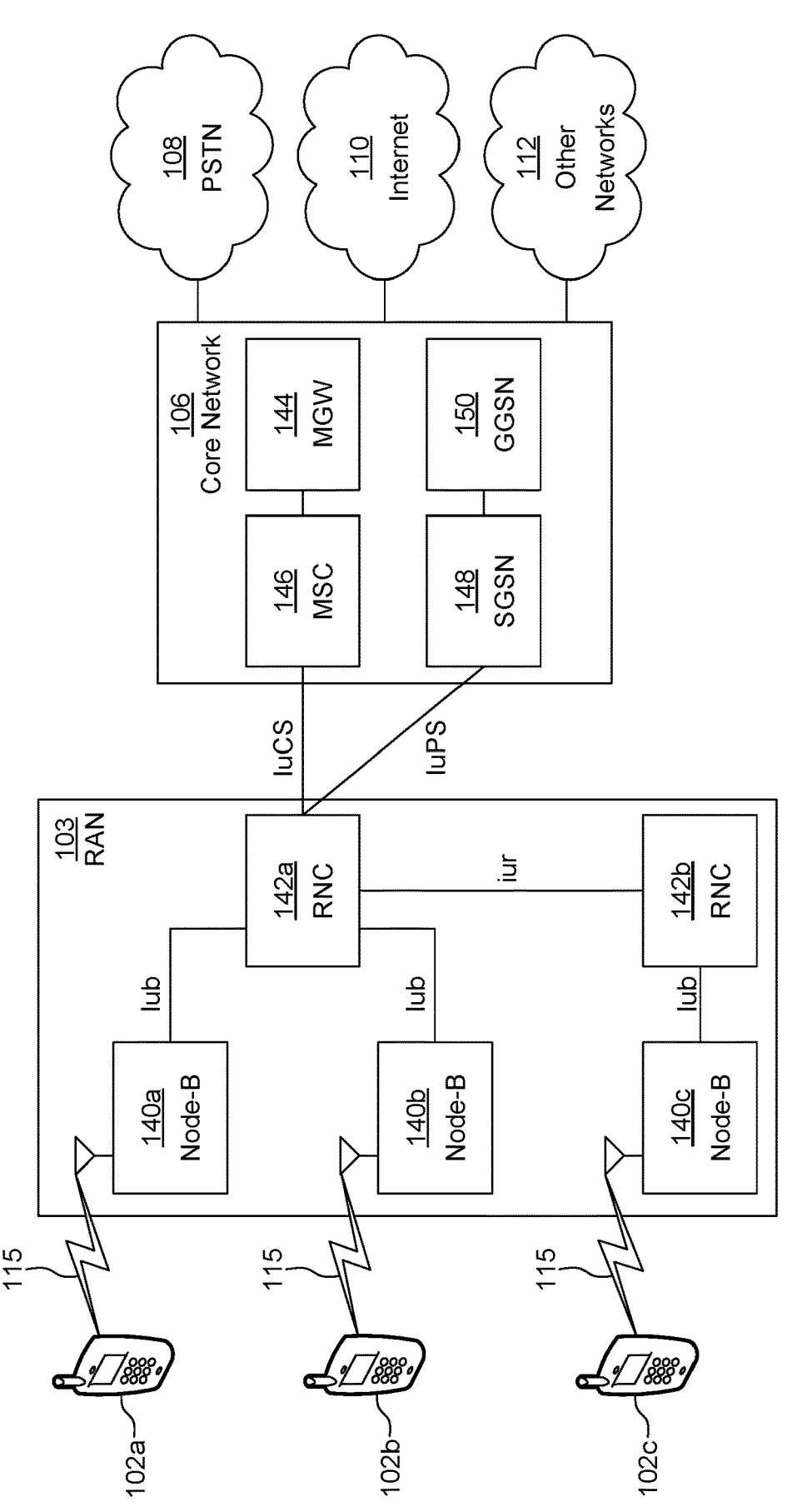
FIG. 32B illustrates an exemplary system that includes RANs and core networks.

FIG. 32B is a system diagram of an example RAN 103 and core network 106 that may implement methods, systems, and devices of scheduling for broadcast and groupcast on new radio Uu interface, as disclosed herein. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 32B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.).

As shown in FIG. 32B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 32B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 32C:
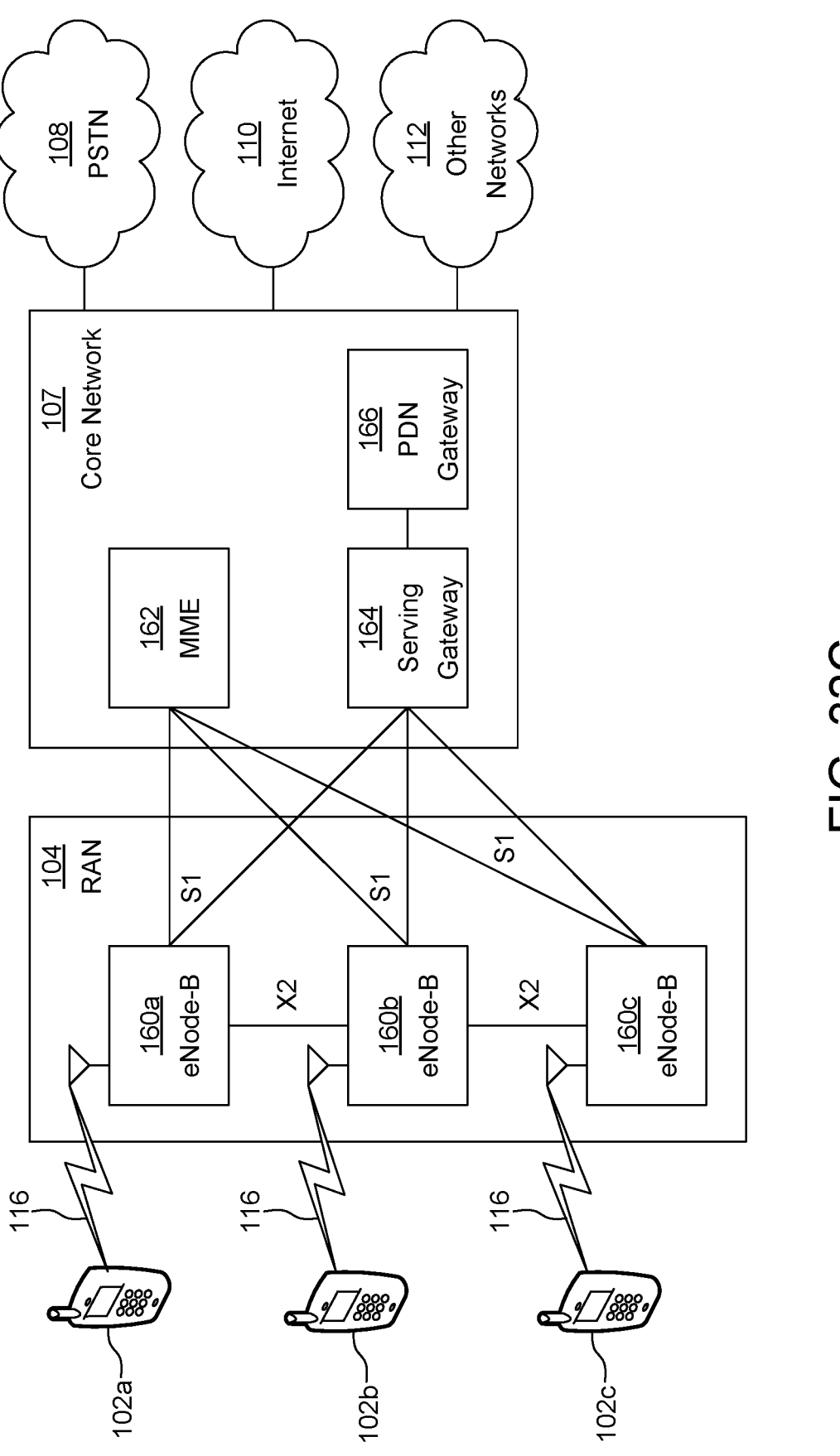
FIG. 32C illustrates an exemplary system that includes RANs and core networks.

FIG. 32C is a system diagram of an example RAN 104 and core network 107 that may implement methods, systems, and devices of scheduling for broadcast and groupcast on new radio Uu interface, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 32C, the eNode-Bs 160a, 160b, and 160c may communicate with one another over an X2 interface.

The core network 107 shown in FIG. 32C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a. 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 32D:
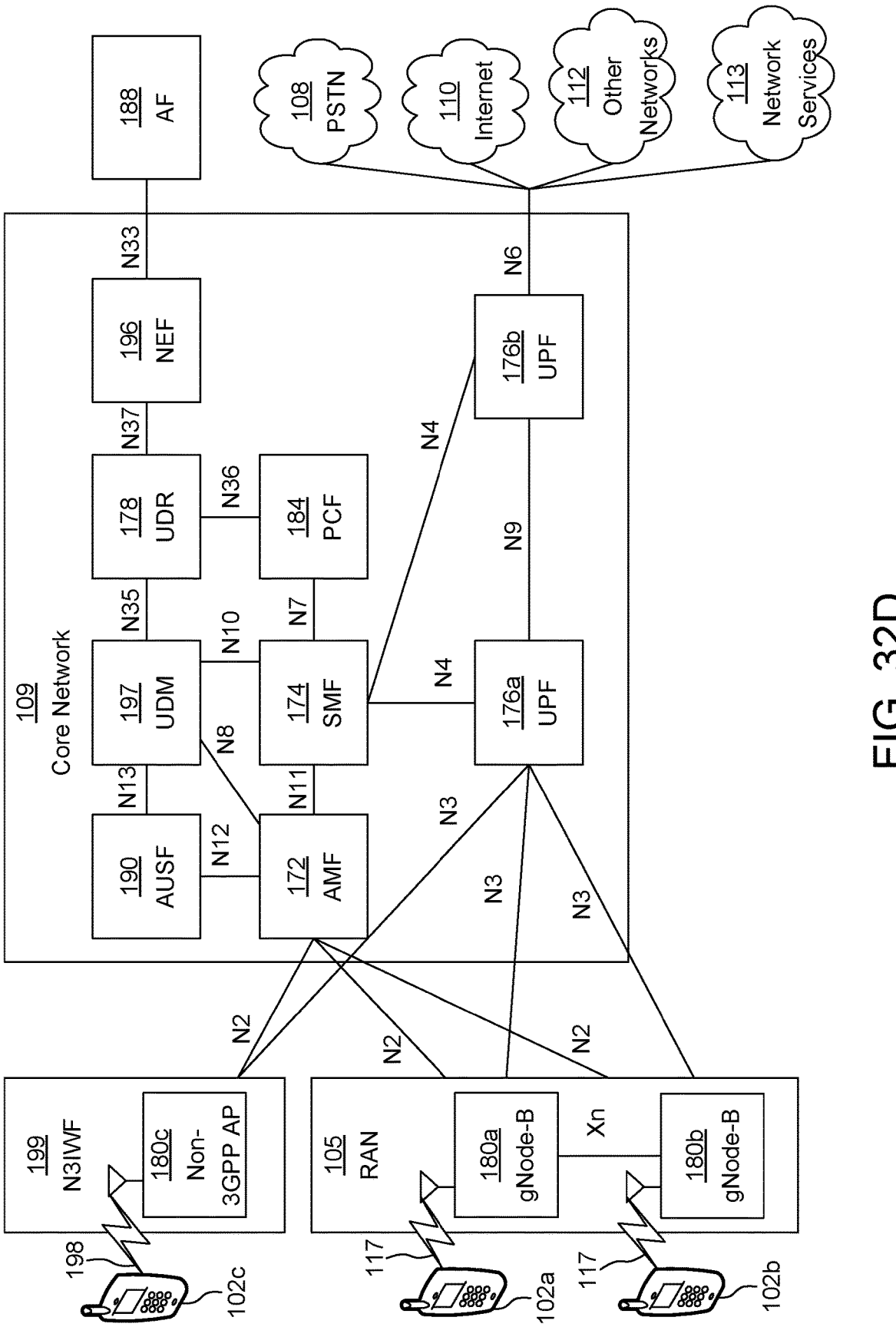
FIG. 32D illustrates an exemplary system that includes RANs and core networks.

FIG. 32D is a system diagram of an example RAN 105 and core network 109 that may implement methods, systems, and devices of scheduling for broadcast and groupcast on new radio Uu interface, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 32D, the gNode-Bs 180a and 180b may communicate with one another over an Xn interface, for example.

The core network 109 shown in FIG. 32D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 32G.

In the example of FIG. 32D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 32D shows that network functions directly connect with one another, however, it should be appreciated that they may communicate via routing agents such as a diameter routing agent or message buses.

In the example of FIG. 32D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 32D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 32D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a. 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 32D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 32A, FIG. 32C, FIG. 32D, or FIG. 32E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 32A, FIG. 32B, FIG. 32C, FIG. 32D, or FIG. 32E are provided by way of example only, and it is understood that the subject matter disclosed and claimed herein may be embodied or implemented in any similar communication system, whether presently defined or defined in the future.

Figure 32E:
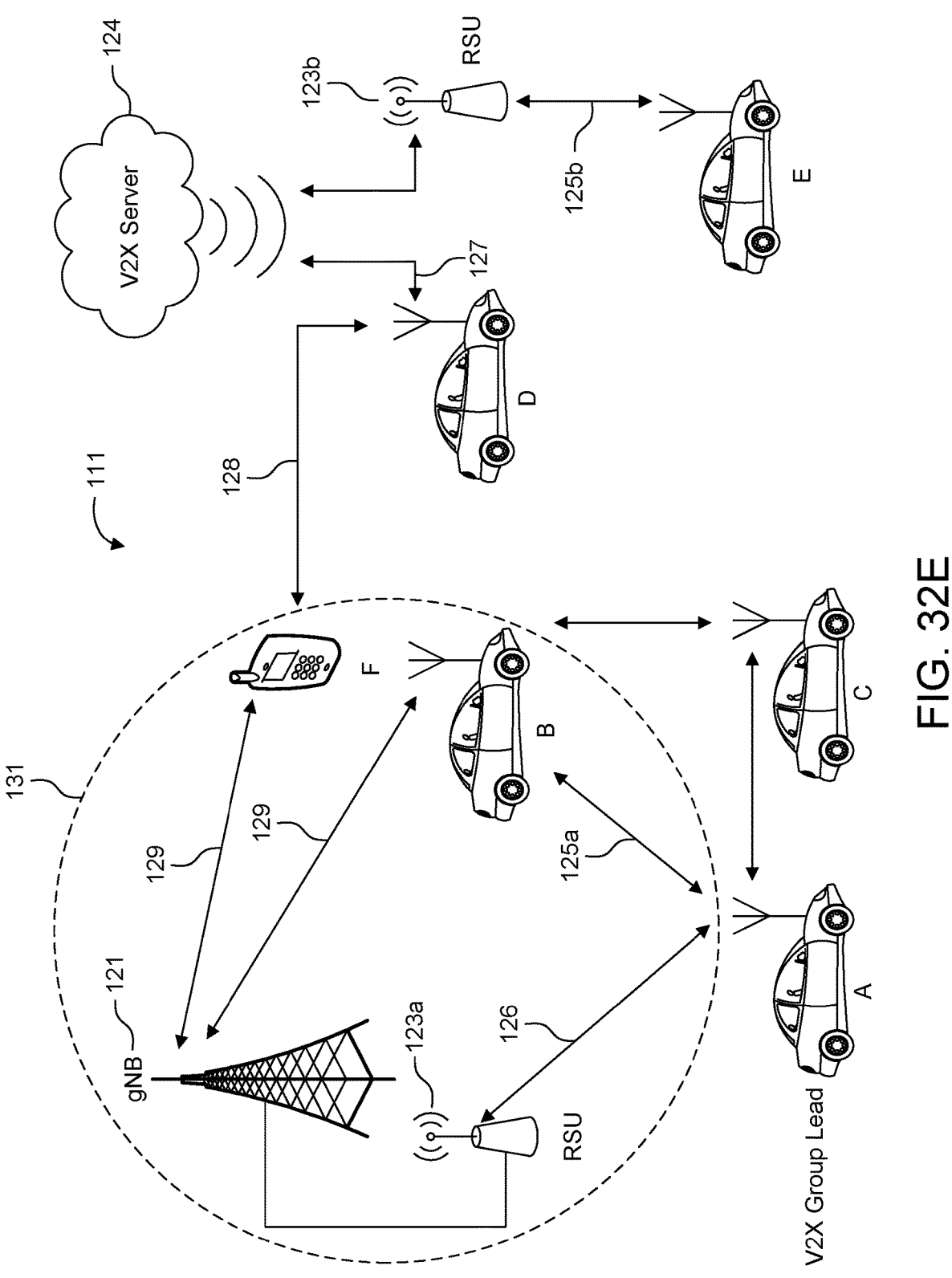
FIG. 32E illustrates another example communications system.

FIG. 32E illustrates an example communications system 111 in which the systems, methods, apparatuses that implement scheduling for broadcast and groupcast on new radio Uu interface, described herein, may be used. Communications system 111 may include Wireless Transmit/Receive Units (WTRUS) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUS A, B, C, D, E, and F may communicate with each other over a Uu interface 129 via the gNB 121 if they are within the access network coverage 131. In the example of FIG. 32E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 32E, WRTU D, which is outside of the access network coverage 131, communicates with WTRU F, which is inside the coverage 131.

WTRUS A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 32F:
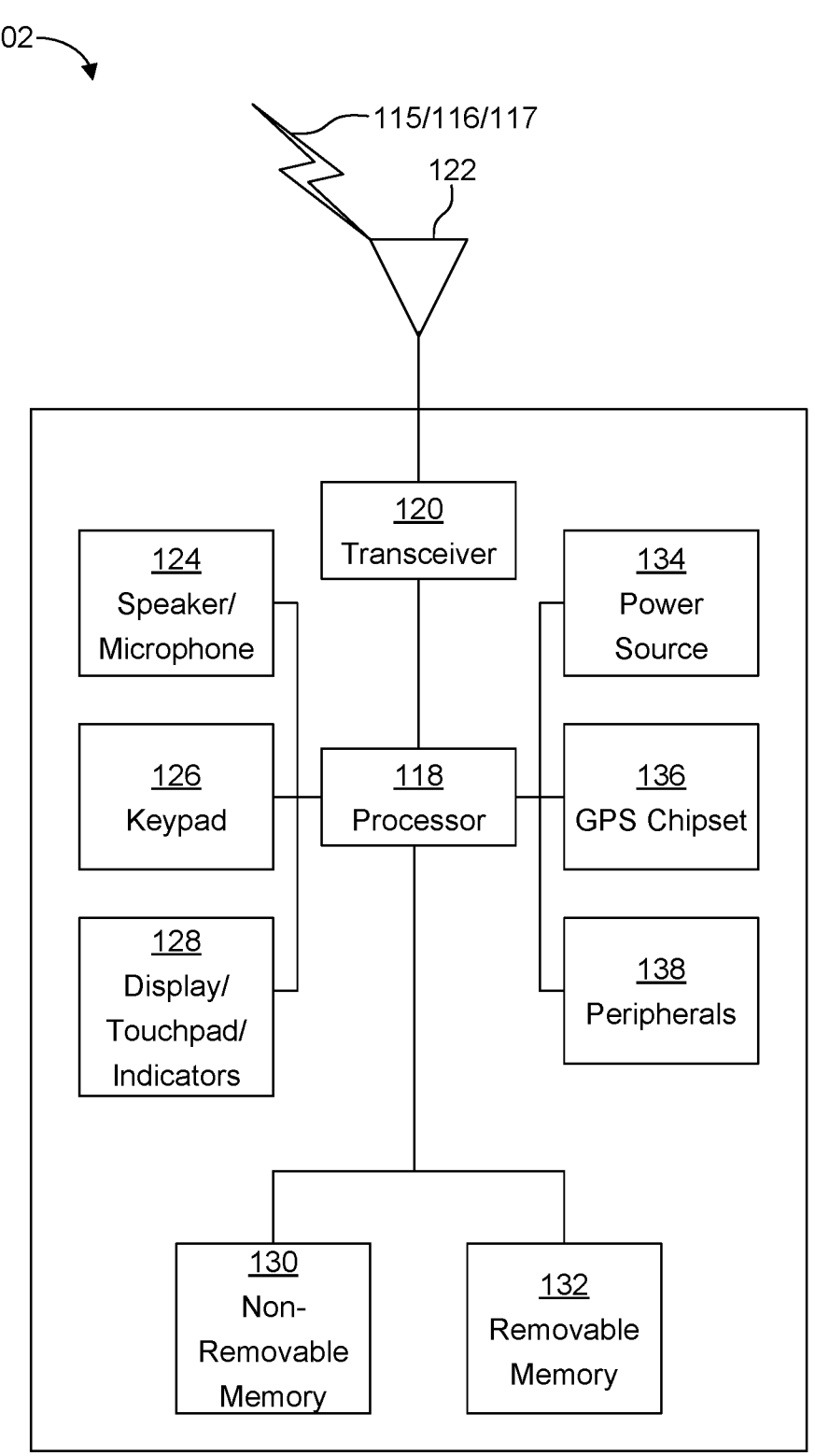
FIG. 32F is a block diagram of an example apparatus or device, such as a WTRU.

FIG. 32F is a block diagram of an example apparatus or device WTRU 102 that may be configured for wireless communications and operations in accordance with the systems, methods, and apparatuses that implement scheduling for broadcast and groupcast on new radio Uu interface, described herein, such as a WTRU 102 of FIG. 32A, FIG. 32B, FIG. 32C, FIG. 32D, or FIG. 32E, or other devices (e.g., UE 241, UE 242, Network 243) of FIG. 1-FIG. 30. As shown in FIG. 32F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 32F and may be an exemplary implementation that performs the disclosed systems and methods for scheduling for broadcast and groupcast on new radio Uu interface described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 32F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 32A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 32F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the examples described herein are successful or unsuccessful, or otherwise indicate a status of scheduling for broadcast and groupcast on new radio Uu interface and associated components. The control lighting patterns, images, or colors on the display or indicators 128 may be reflective of the status of any of the method flows or components in the FIG.'s illustrated or discussed herein (e.g., FIG. 5-FIG. 18, etc). Disclosed herein are messages and procedures of scheduling for broadcast and groupcast on new radio Uu interface. The messages and procedures may be extended to provide interface/API for users to request resources via an input source (e.g., speaker/microphone 124, keypad 126, or display/touchpad/indicators 128) and request, configure, or query scheduling for broadcast and groupcast on new radio Uu interface related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 32G:
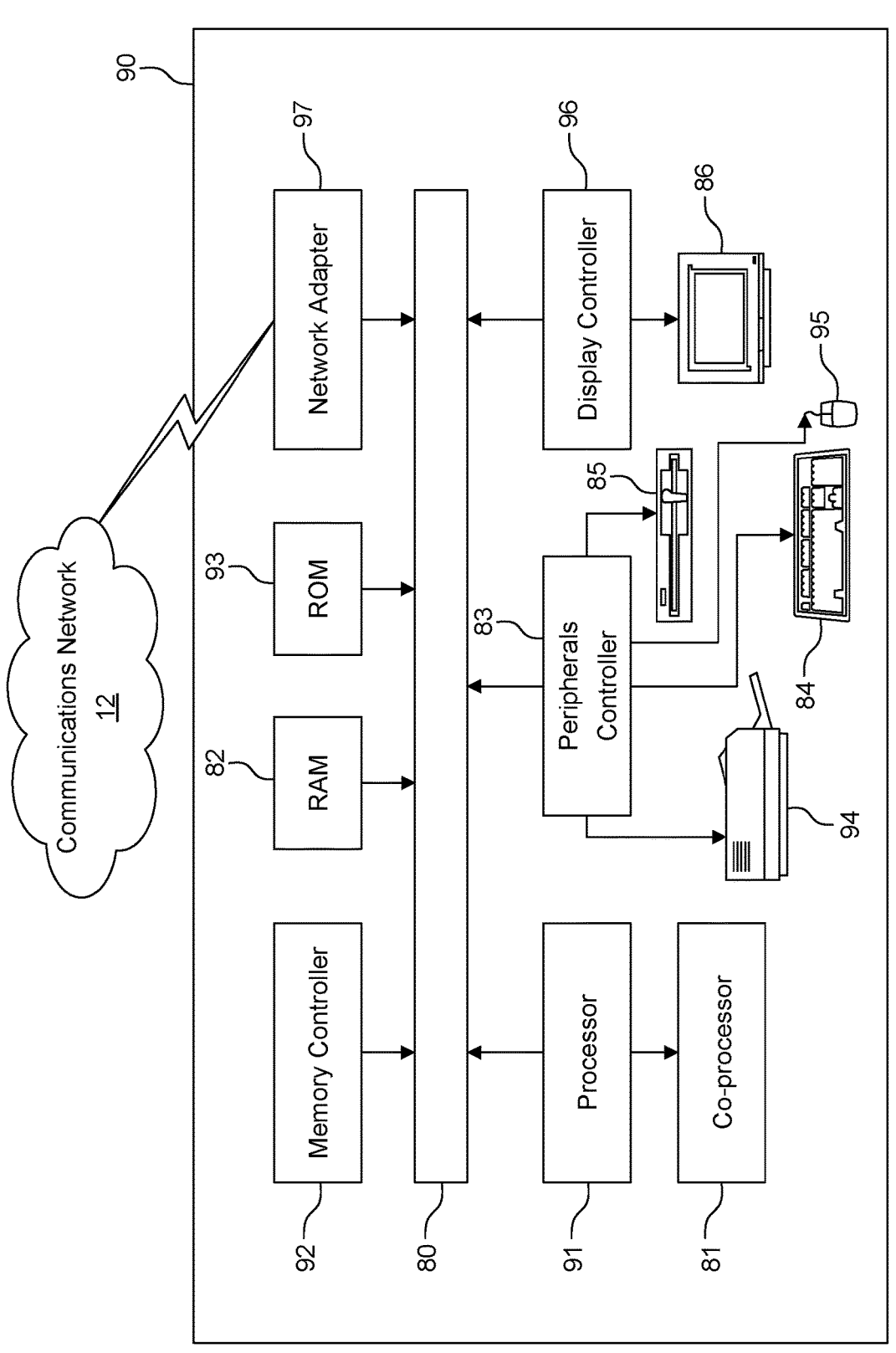
FIG. 32G is a block diagram of an exemplary computing system.

FIG. 32G is a block diagram of an exemplary computing system 90 in which one or more apparatuses of the communications networks illustrated in FIG. 32A, FIG. 32C, FIG. 32D and FIG. 32E as well as scheduling for broadcast and groupcast on new radio Uu interface, such as the systems and methods illustrated in FIG. 1 through FIG. 30 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for scheduling for broadcast and groupcast on new radio Uu interface, such as receiving or processing messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, key board 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 32A, FIG. 32B, FIG. 32C, FIG. 32D, or FIG. 32E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—scheduling for broadcast and groupcast on new radio Uu interface—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for scheduling for broadcast and groupcast on new radio Uu interface. A method, system, computer readable storage medium, or apparatus provides for configuring UE with multiple serving cells; the UE checks which cell is dedicated for broadcast and groupcast service; for the cell(s) configured to be dedicated for broadcast and groupcast service, the UE configured with the BWP, CORESET, or search space configuration; and attempting by the UE to blindly detect the scheduling DCI for groupcast and broadcast transmission within the configured CORESET or search space. The UE may check which cell is dedicated for broadcast and groupcast service by checking the RRC parameter cellforgroupcastservice-r17 or casttype-r17 in the ServingCellConfig information element. The UE configured with the BWP, CORESET, or search space configuration, by reusing the existing BWP, CORE-SET, or search space configuration. A value of the HARQ process number field in a DCI format may indicate an activation or deactivation for an MBS SPS configuration with a same value provided by the MBS-sps-ConfigIndex. Fields may be reused. All combinations in this paragraph and the following paragraph (including the removal or addition of steps) are contemplated in a manner that is consistent with the other portions of the detailed description.

Methods, systems, and apparatuses, among other things, as described herein may provide for scheduling for broadcast and groupcast on new radio Uu interface. A method, system, computer readable storage medium, or apparatus provides for receiving, by a user equipment (UE), a schedule associated with physical downlink shared channel (PDSCH) transmission, wherein the schedule associated with PDSCH transmission is for receiving a PDSCH transmission of multicast service or broadcast service through dynamic scheduling or semi-persistent scheduling; and monitoring, by the user equipment, for a transmission based on the schedule. The UE may receive the schedule through group common downlink control signaling when there is dynamic scheduling. The group common downlink control signaling may be scrambled by a group common multiple multicast broadcast service (MBS) radio network temporary identifier (RNTI) The UE may receive the schedule through UE specific downlink control signaling when there is dynamic scheduling, the UE specific downlink control signaling is scrambled by a UE specific radio network temporary identifier (RNTI) configure for the dynamic unicast scheduling. Dynamic unicast scheduling RNTI refers to the RNTI used be the legacy NE UE, i.e., C-RNTI. The aforementioned reuses the C-RNTI for the MBS dynamic scheduling The UE may receive the schedule through UE specific downlink control signaling when there is dynamic scheduling. The UE may be activated or deactivated through group common downlink control signaling when there is semi-persistent scheduling. The group common downlink control signaling is scrambled by another (e.g., different) group common multiple multicast broadcast service (MBS) radio network temporary identifier (RNTI). The group common downlink control signaling may be scrambled by another group common multiple multicast broadcast service (MBS) radio network temporary identifier (RNTI). The UE may be activated or deactivated through UE specific downlink control signaling when there is semi-persistent scheduling. The UE may be activated or deactivated through UE specific downlink control signaling when there is semi-persistent scheduling, wherein the UE specific downlink control signaling may be scrambled by a UE specific radio network temporary identifier (RNTI) for the unicast SPS scheduling. Unicast SPS scheduling refers to the RNTI used be the legacy NE UE, e.g., CS-RNTI. The idea claimed here is to reuse the C-RNTI for the MBS SPS activation/deactivation The UE specific downlink control signaling may be scrambled by a UE specific radio network temporary identifier (RNTI). All combinations in this paragraph (including the removal or addition of steps) are contemplated in a manner that is consistent with the other portions of the detailed description.

What is claimed is:

1. A method implemented by a wireless transmit/receive unit (WTRU) comprising:

receiving a radio resource control (RRC) message, the RRC message indicating a group radio network temporary identifier for semi-persistent scheduling (G-SPS-RNTI) and a group radio network temporary identifier (G-RNTI) for dynamic scheduling, wherein the RRC message comprises an indication of a data scrambling identity for receiving groupcast transmissions via a physical downlink shared channel (PDSCH);

receiving first downlink control information (DCI), wherein the first DCI comprises semi-persistent scheduling information for one or more groupcast transmissions, the first DCI being associated with a first cyclic redundancy check (CRC) scrambled with the G-SPS-RNTI;

receiving, via the PDSCH, the one or more groupcast transmissions in accordance with the first DCI associated with the first CRC scrambled with the G-SPS-RNTI;

receiving second DCI, wherein the second DCI comprises dynamic scheduling information for a dynamic groupcast transmission, the second DCI being associated with a second CRC scrambled with G-RNTI; and receiving, via the PDSCH, the dynamic groupcast transmission in accordance with the second DCI associated with the second CRC scrambled with the G-RNTI, wherein the dynamic groupcast transmission was scrambled using the data scrambling identity.

2. The method of claim 1, wherein the RRC message comprises an indication of a value for initializing a PDSCH demodulation reference signal (DM-RS) sequence for one or more DM-RSs of the one or more groupcast transmissions received via the PDSCH.

3. The method of claim 1, further comprising:

receiving second DCI, wherein the second DCI comprises dynamic scheduling information for a dynamic groupcast transmission, the second DCI being associated with a second CRC scrambled with a group radio network temporary identifier, G-RNTI.

4. The method of claim 1, wherein the first DCI comprises an indication of a physical uplink control channel (PUCCH) resource for sending hybrid automatic repeat request (HARQ) feedback for the one or more groupcast transmissions.

5. The method of claim 1, further comprising:

receiving a system information block (SIB), the SIB comprising control information for receiving one or more broadcast transmissions.

6. The method of claim 1, wherein the RRC message indicates a bandwidth part for receiving the one or more groupcast transmissions.

7. The method of claim 5, wherein the control information comprises an indication of a data scrambling identity for receiving the one or more broadcast transmissions and an indication of a value for initializing a PDSCH demodulation reference signal (DM-RS) sequence for the one or more broadcast transmissions.

8. The method of claim 1, wherein the one or more groupcast transmissions that were semi-persistently scheduled were scrambled using the data scrambling identity.

9. The method of claim 2, wherein the value for initializing the PDSCH DM-RS sequence for one or more DM-RSs applies to the dynamic groupcast transmission received via the PDSCH.

10. A wireless transmit/receive unit (WTRU) comprising:

a processor, the processor configured to:

receive a radio resource control (RRC) message, the RRC message indicating a group radio network temporary identifier for semi-persistent scheduling (G-SPS-RNTI) and a group radio network temporary identifier (G-RNTI) for dynamic scheduling, wherein the RRC message comprises an indication of a data scrambling identity for receiving groupcast transmissions via a physical downlink shared channel (PDSCH);

receive first downlink control information (DCI), wherein the first DCI comprises semi-persistent scheduling information for one or more groupcast transmissions, the first DCI being associated with a first cyclic redundancy check (CRC) scrambled with the G-SPS-RNTI;

receive, via the PDSCH, the one or more groupcast transmissions in accordance with the first DCI associated with the first CRC scrambled with the G-SPS-RNTI;

receive second DCI, wherein the second DCI comprises dynamic scheduling information for a dynamic groupcast transmission, the second DCI being associated with a second CRC scrambled with G-RNTI; and receive, via the PDSCH, the dynamic groupcast transmission in accordance with the second DCI associated with the second CRC scrambled with the G-RNTI, wherein the dynamic groupcast transmission was scrambled using the data scrambling identity.

11. The WTRU of claim 10, wherein the RRC message comprises an indication of a value for initializing a PDSCH demodulation reference signal (DM-RS) sequence for one or more DM-RSs of the one or more groupcast transmissions received via the PDSCH.

12. The WTRU of claim 10, the processor configured to:
receive second DCI, wherein the second DCI comprises dynamic scheduling information for a dynamic groupcast transmission, the second DCI being associated with a second CRC scrambled with a group radio network temporary identifier (G-RNTI).

13. The WTRU of claim 10, wherein the first DCI comprises an indication of a physical uplink control channel (PUCCH) resource for sending hybrid automatic repeat request (HARQ) feedback for the one or more groupcast transmissions.

14. The WTRU of claim 10, the processor configured to:
receive a system information block (SIB), the SIB comprising control information for receiving one or more broadcast transmissions.

15. The WTRU of claim 10, wherein the RRC message indicates a bandwidth part for receiving the one or more groupcast transmissions.

16. The WTRU of claim 14, wherein the control information comprises an indication of a data scrambling identity for receiving the one or more broadcast transmissions and an indication of a value for initializing a PDSCH demodulation reference signal (DM-RS) sequence for the one or more broadcast transmissions.

17. The WTRU of claim 10, wherein the one or more groupcast transmissions that were semi-persistently scheduled were scrambled using the data scrambling identity.

18. The WTRU of claim 11, wherein the value for initializing the PDSCH DM-RS sequence for one or more DM-RSs applies to the dynamic groupcast transmission received via the PDSCH.

* * * * *